(12) United States Patent
Ronzani et al.

(10) Patent No.: US 6,448,944 B2
(45) Date of Patent: *Sep. 10, 2002

(54) HEAD-MOUNTED MATRIX DISPLAY

(75) Inventors: Peter A. Ronzani, Los Gatos; Stephen Pombo, Sunnyvale; Jeffrey Jacobsen, Hollister, all of CA (US)

(73) Assignee: Kopin Corporation, Taunton, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/119,274

(22) Filed: Jul. 20, 1998

Related U.S. Application Data

(63) Continuation of application No. 08/579,448, filed on Dec. 27, 1995, now abandoned, which is a continuation of application No. 08/220,042, filed on Mar. 30, 1994, now abandoned, which is a continuation-in-part of application No. 08/141,133, filed on Oct. 22, 1993, now abandoned.

(51) Int. Cl.[7] .................................................. G09G 5/00
(52) U.S. Cl. .............................................. 345/8; 345/7
(58) Field of Search .............................. 345/87, 88, 89, 345/7, 8, 9, 76, 92, 103; 348/51, 52, 53, 54; 349/11, 15

(56) References Cited

U.S. PATENT DOCUMENTS

| | | | |
|---|---|---|---|
| 3,375,375 A | 3/1968 | Abbey et al. ............... 250/216 |
| 3,712,714 A | 1/1973 | Uyeda et al. | |
| 3,816,005 A | 6/1974 | Kirschner ................... 356/251 |
| 3,923,370 A | 12/1975 | Mostrom ..................... 350/55 |
| 4,010,322 A | 3/1977 | Nathanson .................. 358/233 |
| 4,028,725 A | 6/1977 | Lewis ......................... 358/103 |
| 4,034,401 A | 7/1977 | Mann .......................... 358/93 |
| 4,081,209 A | 3/1978 | Heller et al. ................ 350/174 |
| 4,109,145 A | 8/1978 | Graf ............................ 250/201 |
| 4,181,405 A | 1/1980 | Cohen ......................... 350/331 |
| 4,254,451 A | 3/1981 | Cochran, Jr. ................ 362/103 |
| 4,287,809 A | 9/1981 | Egli et al. ....................... 89/41 |
| 4,361,384 A | 11/1982 | Bosserman ................. 350/174 |
| 4,414,431 A | 11/1983 | McCartney .................. 381/48 |
| 4,636,866 A | 1/1987 | Hattori ....................... 358/236 |
| 4,695,129 A | 9/1987 | Faessen et al. ........... 350/96.25 |
| 4,704,740 A | 11/1987 | McKee et al. .............. 455/348 |
| 4,735,473 A | 4/1988 | Migozzi et al. .............. 350/3.7 |
| 4,737,972 A | 4/1988 | Schoolman ................. 378/41 |
| 4,751,691 A | 6/1988 | Perera ......................... 368/10 |
| 4,753,514 A | 6/1988 | Kubik ......................... 350/174 |

(List continued on next page.)

FOREIGN PATENT DOCUMENTS

| | | |
|---|---|---|
| CA | 2123461 | 11/1994 |
| DE | 27 15 446 | 10/1978 |
| EP | 0 344 881 A2 | 12/1989 |

(List continued on next page.)

OTHER PUBLICATIONS

"Hand–Held Videophone", Popular Science, Feb. 1992.
"Videophone Price Cut to $1,000", USA Today, Jan. 2, 1993.
"SA620 Integrated Front End", Philips Electronics North America Corp, 1993.
Katz, Warren, "Low Cost Helmet Mounted Display and Eye Tracking Concepts", MaK Technologies, Inc.

Primary Examiner—Xiao Wu
(74) Attorney, Agent, or Firm—Hamilton, Brook, Smith & Reynolds, P.C.

(57) ABSTRACT

A compact, light weight head mounted display in which a pair of matrix display elements are mounted within a housing. The display utilizes a pair of arms or stems that are rotatable mounted to the housing such that the user can pivot each arm from a folded position into an open position. The arms can be spring mounted onto the housing to secure the display to the user's head and can also incorporate earphones that can be retracted into each arm when not in use.

40 Claims, 57 Drawing Sheets

U.S. PATENT DOCUMENTS

| | | | | |
|---|---|---|---|---|
| 4,755,023 | A | 7/1988 | Evans et al. | 350/174 |
| 4,757,714 | A | 7/1988 | Purdy et al. | 73/597 |
| 4,761,056 | A | 8/1988 | Evans et al. | 350/174 |
| 4,814,876 | A | 3/1989 | Horio et al. | 358/160 |
| 4,837,817 | A | 6/1989 | Maemori | 358/224 |
| 4,856,088 | A | 8/1989 | Oliwa et al. | 455/349 |
| 4,869,575 | A | 9/1989 | Kubik | 350/174 |
| 4,870,396 | A | 9/1989 | Shields | 340/719 |
| 4,928,300 | A | 5/1990 | Ogawa et al. | 379/53 |
| 4,934,773 | A | 6/1990 | Becker | 350/6.6 |
| 4,977,456 | A | 12/1990 | Furuya | 358/213.13 |
| 4,997,263 | A | 3/1991 | Cohen et al. | 350/345 |
| 5,003,300 | A | 3/1991 | Wells | 340/705 |
| 5,023,931 | A | 6/1991 | Streck et al. | 455/21 |
| 5,034,809 | A | 7/1991 | Katoh | 358/88 |
| 5,050,966 | A | 9/1991 | Berman | 359/38 |
| 5,077,784 | A | 12/1991 | Fujita et al. | 379/53 |
| 5,079,627 | A | 1/1992 | Filo | 358/85 |
| 5,093,567 | A | 3/1992 | Staveley | 250/221 |
| 5,106,179 | A | 4/1992 | Kamaya et al. | 351/158 |
| 5,111,498 | A | 5/1992 | Guichard et al. | 379/53 |
| 5,122,880 | A | 6/1992 | Nagano | 358/209 |
| 5,138,312 | A | 8/1992 | Tsukamoto et al. | 340/825.44 |
| 5,153,569 | A | 10/1992 | Kawamura et al. | 340/705 |
| 5,162,828 | A | 11/1992 | Furness et al. | 353/122 |
| 5,164,833 | A | 11/1992 | Aoki | 358/224 |
| 5,164,980 | A | 11/1992 | Bush et al. | 379/53 |
| 5,189,632 | A | 2/1993 | Paajanen et al. | 364/705.05 |
| 5,220,366 | A | 6/1993 | King | 354/76 |
| 5,224,198 | A | 6/1993 | Jachimowicz et al. | 385/133 |
| 5,233,458 | A | 8/1993 | Moffitt et al. | 359/227 |
| 5,250,937 | A | 10/1993 | Kikuo et al. | 345/89 |
| 5,281,957 | A | 1/1994 | Schoolman | 345/8 |
| 5,307,085 | A | 4/1994 | Nakamura | 345/99 |
| 5,321,416 | A | 6/1994 | Bassett et al. | 345/8 |
| 5,323,189 | A | 6/1994 | Contreras | 351/118 |
| 5,347,400 | A | 9/1994 | Hunter | 359/815 |
| 5,381,179 | A | 1/1995 | Kashimura | 348/376 |
| 5,485,318 | A | 1/1996 | Lebby et al. | 359/811 |
| 5,485,504 | A | 1/1996 | Ohnsorge | 379/58 |
| 5,584,070 | A | 12/1996 | Harris et al. | 455/346 |

FOREIGN PATENT DOCUMENTS

| | | |
|---|---|---|
| EP | 0 352 914 A2 | 1/1990 |
| EP | 0 352 914 A3 | 1/1990 |
| EP | 0 424 880 A2 | 5/1991 |
| EP | 0 438 362 A1 | 7/1991 |
| EP | 0 454 443 A3 | 10/1991 |
| EP | 0 472 361 A2 | 2/1992 |
| EP | 0 472 361 A3 | 2/1992 |
| EP | 0 491 639 A1 | 6/1992 |
| EP | 0 526 802 A2 | 2/1993 |
| EP | 0 526 802 A3 | 2/1993 |
| EP | 0 539 699 A2 | 5/1993 |
| EP | 0 539 907 A3 | 5/1993 |
| EP | 0 547 493 A1 | 6/1993 |
| EP | 0 551 781 A1 | 7/1993 |
| EP | 0 626 773 A1 | 11/1993 |
| EP | 0 626 773 B1 | 11/1994 |
| FR | 2 522 804 | 9/1983 |
| FR | 2 612 351 | 8/1988 |
| GB | 1 438 789 | 6/1972 |
| GB | 2 149 140 A | 6/1985 |
| GB | 2 206 421 A | 1/1989 |
| JP | 54093378 | 7/1979 |
| JP | 60046019 | 3/1985 |
| JP | 1259580 | 10/1989 |
| JP | 2-113656 | 4/1990 |
| JP | 3-105383 | 5/1991 |
| JP | 6-123852 | 5/1994 |
| JP | 7-235892 | 9/1995 |
| WO | WO 88/02494 | 4/1988 |
| WO | WO 91/04508 | 4/1991 |
| WO | WO 93/01583 | 1/1993 |
| WO | WO 93/16550 | 8/1993 |
| WO | WO 93/18428 | 9/1993 |
| WO | WO 93/23783 | 11/1993 |
| WO | WO 94/01798 | 1/1994 |
| WO | WO 94/01958 | 1/1994 |
| WO | WO 94/14152 | 6/1994 |
| WO | WO 94/18595 | 8/1994 |
| WO | WO 96/21173 | 7/1996 |
| WO | WO 96/21205 | 7/1996 |

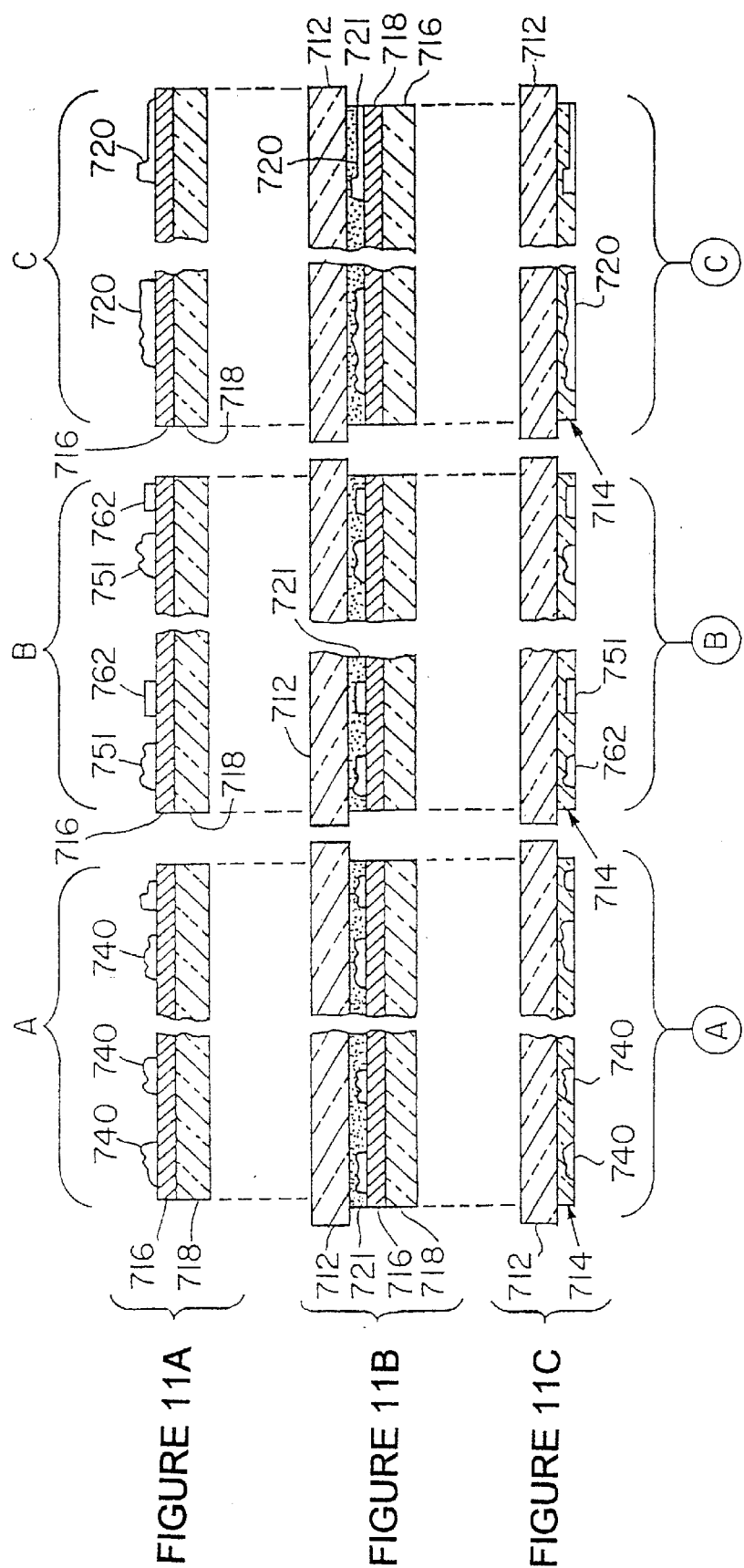

CROSS-SECTIONAL VIEW　　　　　　　TOP VIEW
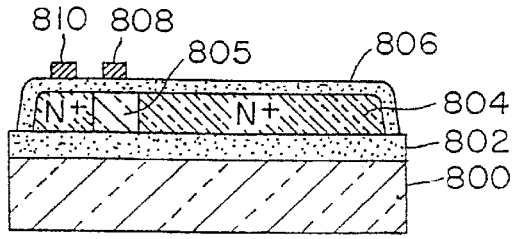 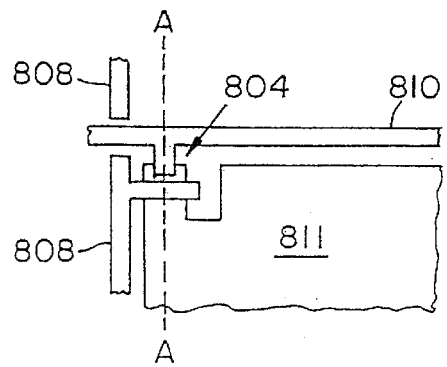
FIGURE 12A
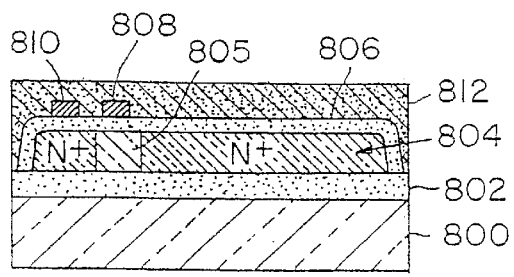 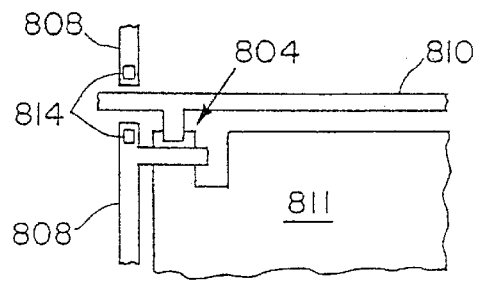
FIGURE 12B
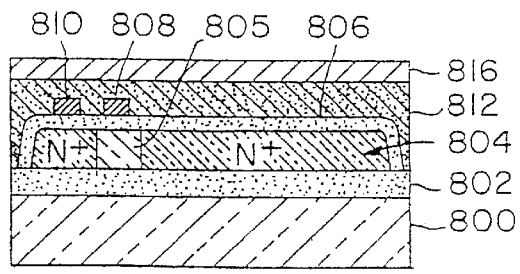 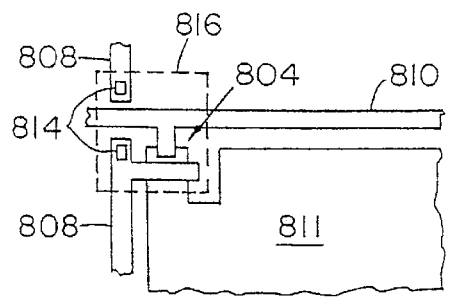
FIGURE 12C

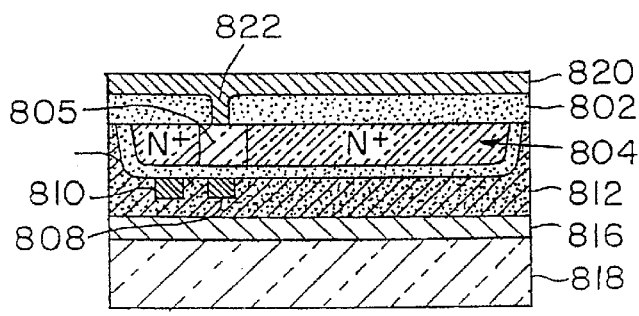
FIGURE 12D
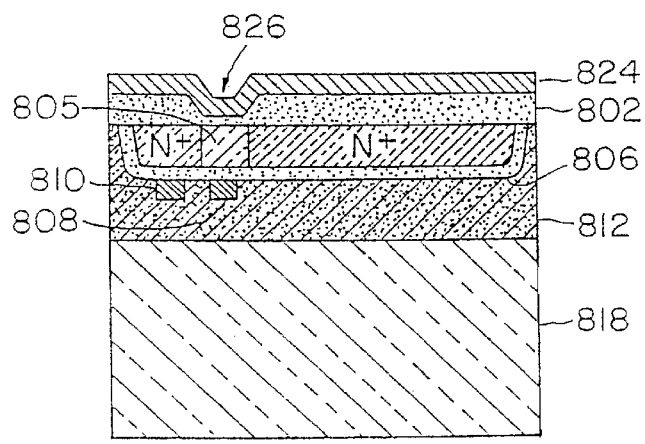
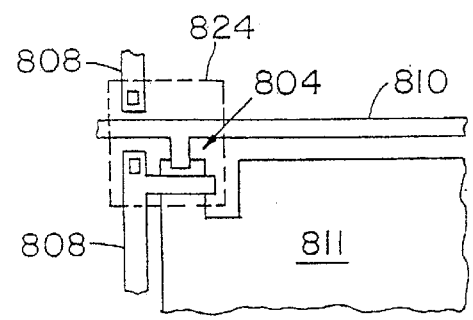
FIGURE 12E

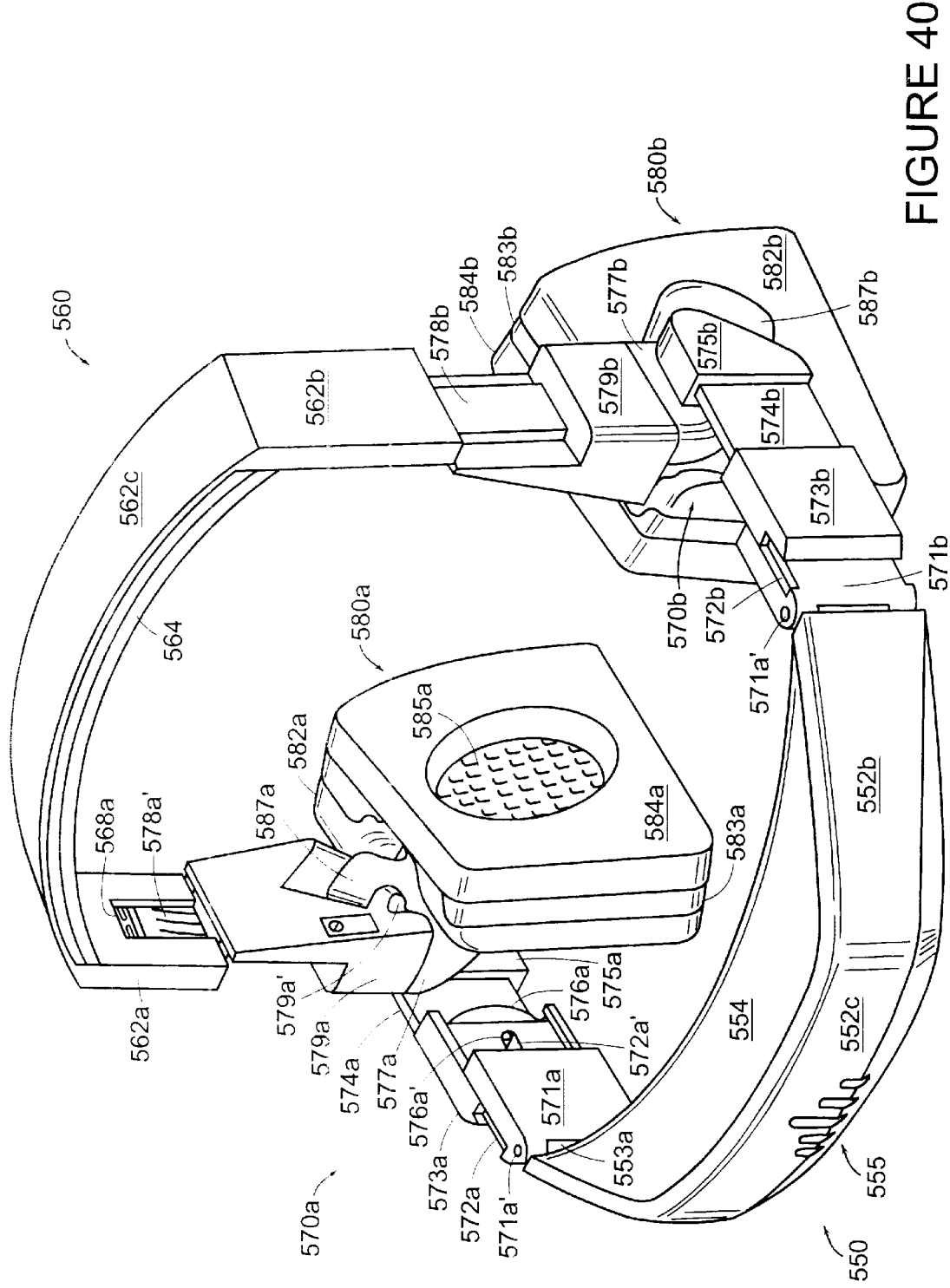

HEAD-MOUNTED MATRIX DISPLAY

RELATED APPLICATION

This is a continuation of application Ser. No. 08/579,448 which was filed Dec. 27, 1995, now abandoned, which was a file wrapper continuation of application Ser. No. 08/220,042, which was filed Mar. 30, 1994, now abandoned, which is a Continuation-in-Part of U.S. application Ser. No. 08/141,133, filed on Oct. 22, 1993, now abandoned, the contents of which are incorporated herein by reference.

BACKGROUND OF THE INVENTION

Head mounted display systems have been developed for a number of different applications including use by aircraft pilots and for simulation such as virtual imaging. Head mounted displays are generally limited by their resolution and by their size and weight.

Existing displays have relatively low resolution, and because of the size and weight of available systems, these displays are positioned at the relatively large distance from the eye. Of particular importance, it is desired to keep the center of gravity of the display from extending upward and forward from the center of gravity of the head and neck of the wearer, where it will place a large torque on the wearer's neck and may bump into other instruments during use.

There is a continuing need to present images to the wearer of a helmet mounted display in high-resolution format similar to that of a computer monitor. The display needs to be as non-intrusive as possible, leading to the need for lightweight and compact system. Existing head mounted displays have used analog cathode ray tube ("CRT") devices mounted above or to the side of the user's head which project an image onto a surface or visor mounted in front of the user's eyes. Often these displays utilize helmets which incorporate earphones into the helmet. Other head mounted display devices have contemplated the use of liquid crystal devices that could be mounted above or to the side of the user's head and employ reflective optics to direct an image within the field of view of the user.

SUMMARY OF THE INVENTION

In accordance with the present invention a head mounted display includes a housing in which a pair of matrix display elements are secured. These display elements are of a sufficiently light-weight and compact nature that the housing can be mounted onto the head of a user with a pair of hinge mounted arms or support elements that can be rotated relative to the housing from a closed position to an open position. When in the open position the arms extend about the opposite side of the user's head and serve to position audio transducers mounted on the arms into proximity with the ears of the user. The arms can also be double hinged in which each arm is folded once about its mid-point and then rotated about the hinge on each side of the housing to assume the closed position. System electronics and manually adjustable controls can be positioned within the housing or the rotating arms. Positioning of the electronics and controls within the arms permits a more desirable distribution of weight evenly about the sides of the user's head.

The inter-pupillary distance between the two displays can be adjusted such as by the use of a gear driven cam assembly mounted within the housing.

The direct view display can be a transmission type display with the light source directly adjacent the light valve active matrix and mounted within the display device. The transmission type display can, in a preferred embodiment, also receive light directly from the user's environment so that the display overlays an image over the users existing field of view.

In an alternative embodiment the display can be formed with a pivoting headband and an audio system.

Alternatively, the display can be an emission type device such as an active matrix electroluminescent display or an active matrix of light emitting diodes (LEDs), or a transmissive passive matrix display.

BRIEF DESCRIPTION OF THE DRAWINGS

The above and other features of the invention, including various novel details of construction and combinations of parts, will now be more particularly described with reference to the accompanying drawings and pointed out in the claims. It will be understood that the particular head mounted display embodying the invention is shown by way of illustration only and not as a limitation of the invention. The principles and features of this invention may be employed in varied and numerous embodiments without departing from the scope of the invention.

FIGS. 11A–11C are another preferred process and transfer sequence for fabricating a light valve matrix and transferring it to a support structure.

FIGS. 12A–12E are yet another preferred process and transfer sequence for fabricating a matrix and transferring it to glass substrate.

FIG. 40 is a perspective view of an alternative embodiment of the invention.

DETAILED DESCRIPTION OF THE INVENTION

Figure 1A:
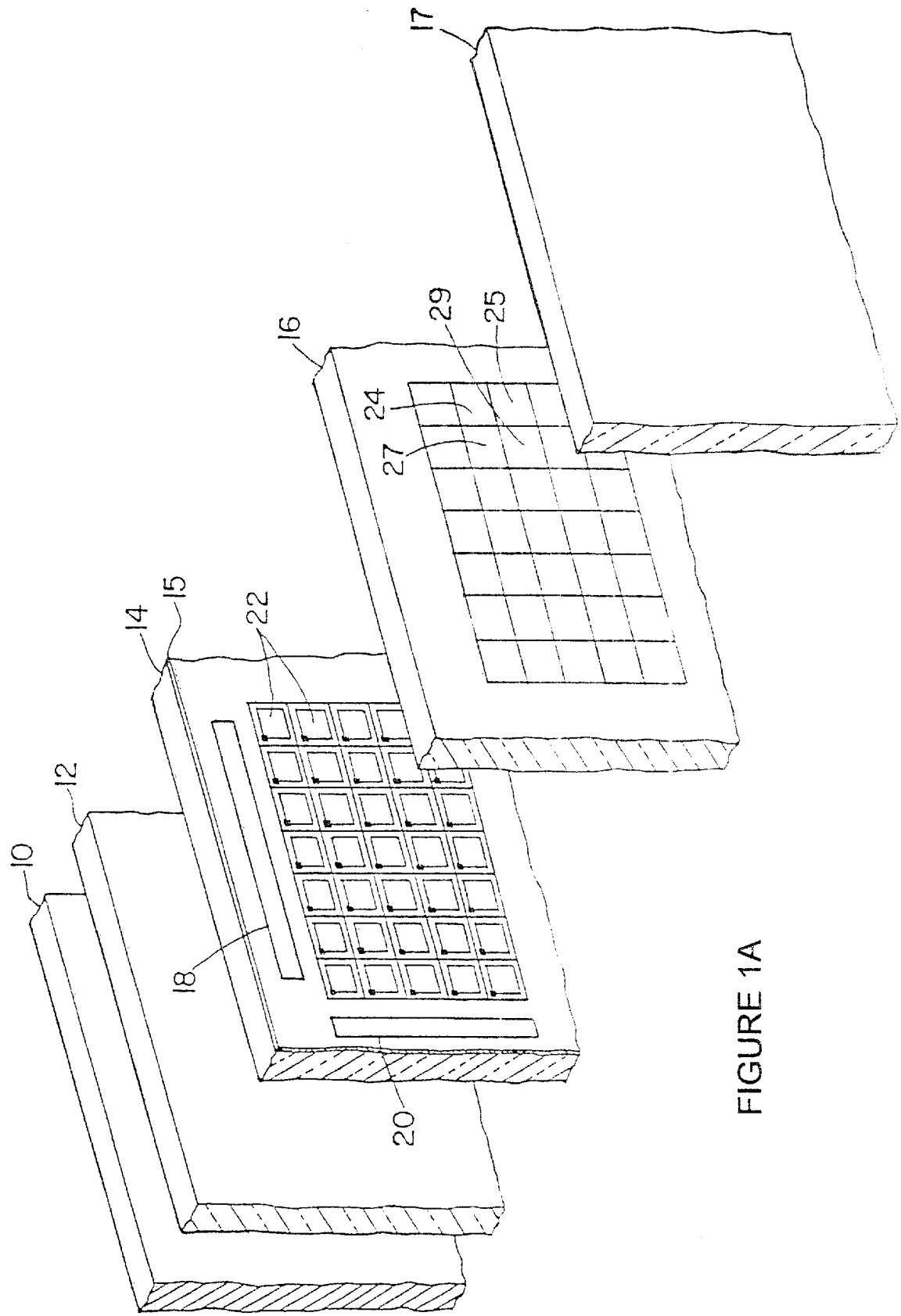
FIG. 1A is an exploded perspective view of a flat panel display in accordance with the invention.

A preferred embodiment of the invention is illustrated in the perspective view of a panel display in FIG. 1. The basic components of the display include a light source 10 that can be white or some other appropriate color, a first polarizing filter 12, a circuit panel 14, a filter plate 16 and a second polarizing filter 17, which are secured in a layered structure. A liquid crystal material (not shown) is placed in a volume between the circuit panel 14 and the filter plate 16. An array of pixels 22 on the circuit panel 14 are individually actuated by a drive circuit having first 18 and second 20 circuit components that are positioned adjacent the array such that each pixel can produce an electric field in the liquid crystal material lying between the pixel and a counterelectrode secured to the color filter plate 16. The electric field causes a rotation of the polarization of light being transmitted across the liquid crystal material that results in an adjacent color filter element being illuminated. The color filters of filter plate system 16 are arranged into groups of four filter elements such as blue 24, green 25, red 27, and white 29. The pixels or light valves associated with filter elements 24, 25, 27, 29 can be selectively actuated to provide any desired color for that pixel group.

Other preferred embodiments employ the use of a solid state material to form a light valve for each pixel. A light emitting material such as an electroluminescent film or any material whose optical transmission properties can be altered by the application of an electric field can be used to supply the light valves of the present invention.

Figure 1B:
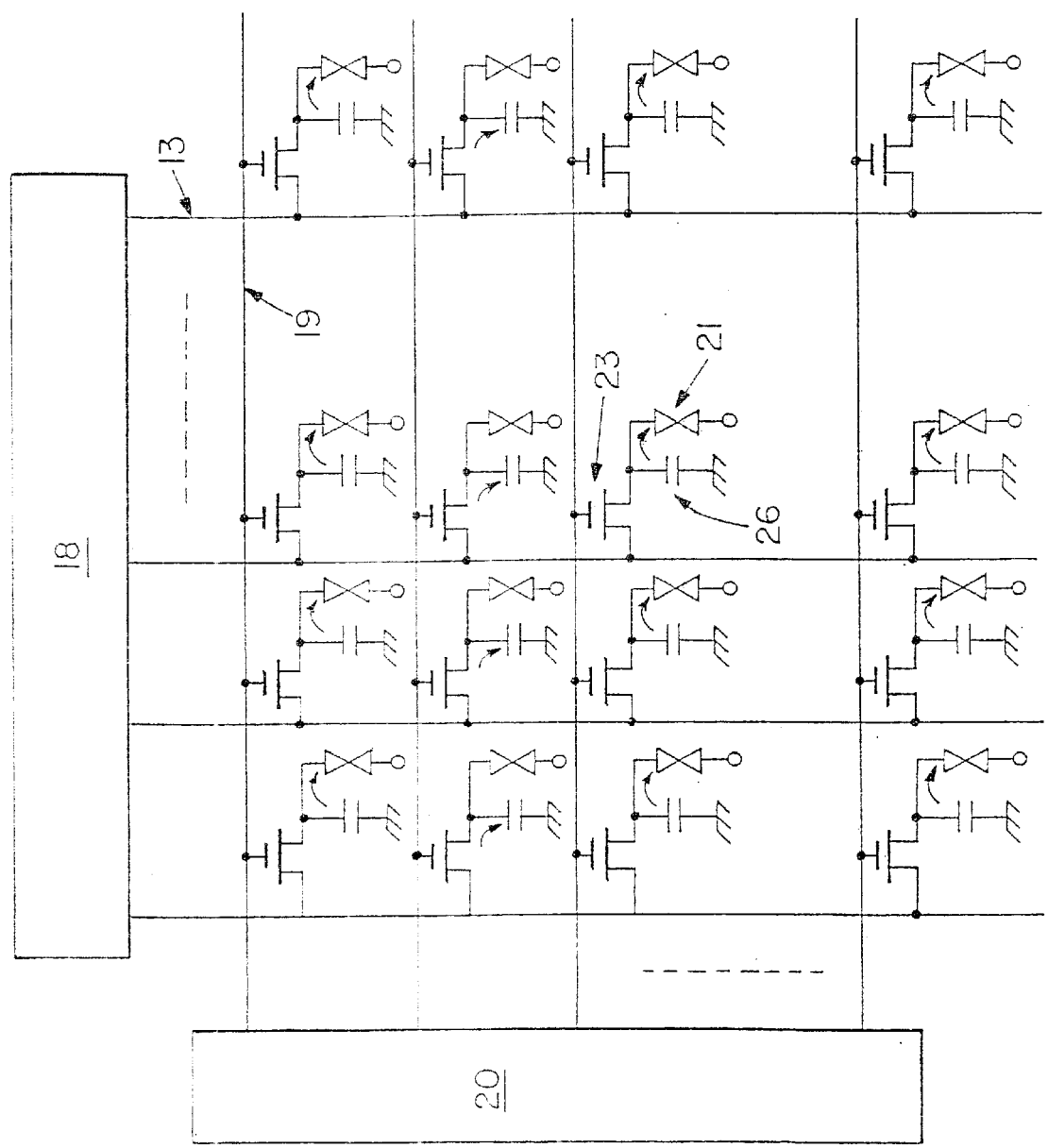
FIG. 1B is a circuit diagram illustrating the driver system for a preferred embodiment of the invention.

A drive circuit that can be used to control the display on the panel is illustrated in FIG. 1B. Circuit 18 receives an incoming signal and sends a signal to the pixels through buses 13. Circuit 20 will scan through buses 19 to turn on the individual transistors 23 which charges capacitor 26 in each pixel. The capacitor 26 sustains the charge on the pixel electrode and the liquid crystal 21 until the next scan of the array. The various embodiments of the invention may, or may not, utilize capacitors with each pixel depending upon the type of display desired.

FIGS. 2A–2L illustrate the use of an Isolated Silicon Epitaxy (ISE) process, to form silicon-on-insulator (SOI) films in which circuit panel circuitry is formed. Note that any number of techniques can be employed to provide a thin-film of single crystal Si. An SOI structure, such as that shown in FIG. 2A, includes a substrate 30 and an oxide 34 (such as, for example, $SiO_2$) that is grown or deposited on the substrate 30. A thin single crystal layer of silicon is formed over the oxide 34. The oxide (or insulator) is thus buried beneath the Si surface layer. For the case of ISE SOI structures, the top layer is a substantially single-crystal recrystallized Silicon, from which CMOS circuits can be fabricated. The use of a buried insulator provides devices having higher speeds than can be obtained in conventional bulk (Czochralski) material. Circuits containing in excess of 1.5 million CMOS transistors have been successfully fabricated in ISE material.

Figure 2A:
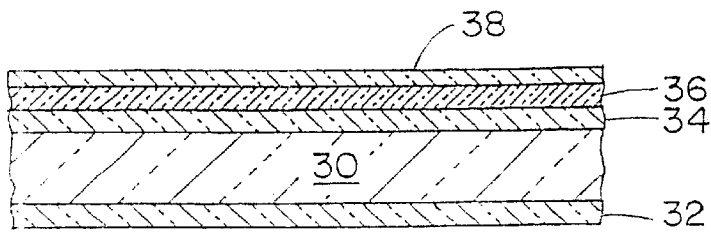
FIGS. 2A–2L is a preferred process flow sequence illustrating the fabrication of a circuit panel for a flat panel display.
Figure 2B:
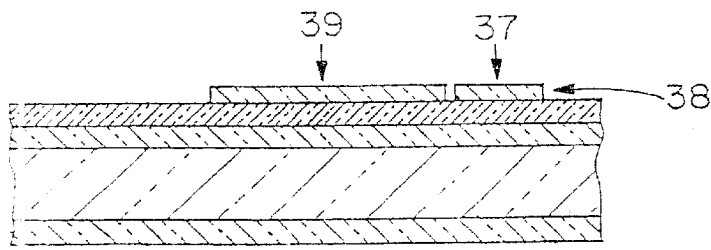
Figure 2C:
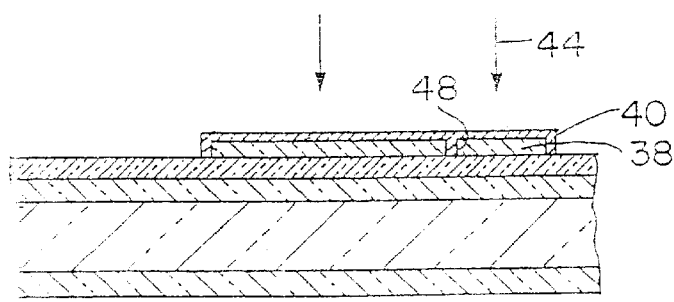

As shown in FIG. 2B, the film 38 is patterned to define a transistor region 37 and a pixel electrode region 39 for each pixel. An oxide layer 40 is then formed over the patterned regions including channel 48 between the two regions 37, 39 of each pixel. The intrinsic crystallized material 38 is than implanted 44 (at FIG. 2C) with boron or other p-type dopant to provide a n-channel device (or alternatively, an n-type dopant for an p-channel device).

Figure 2D:
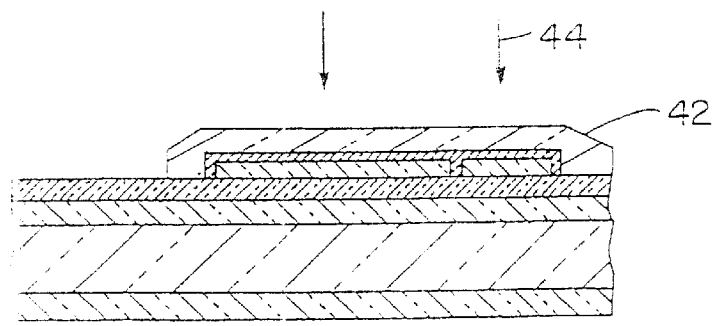
Figure 2E:
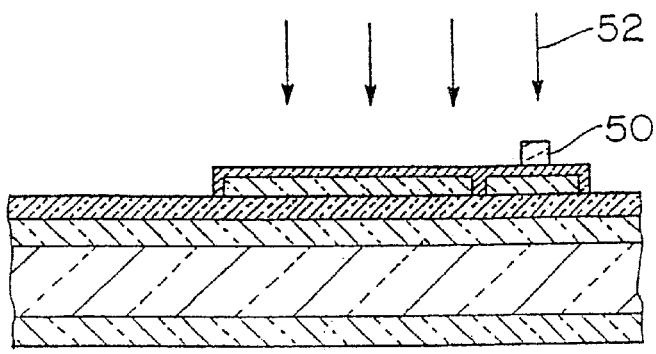
Figure 2F:
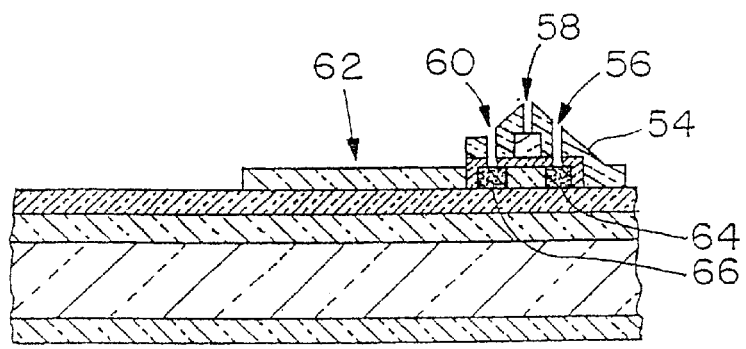
Figure 2G:
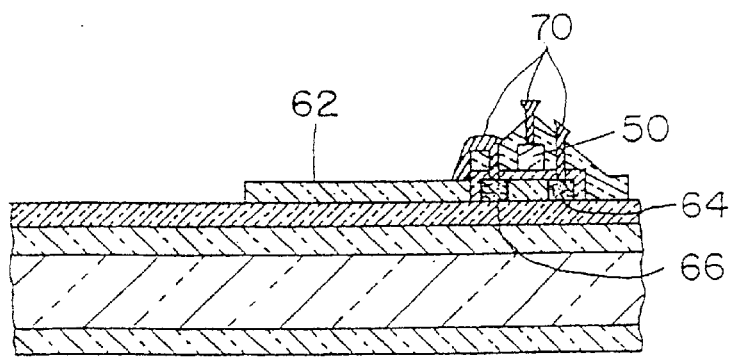
Figure 2H:
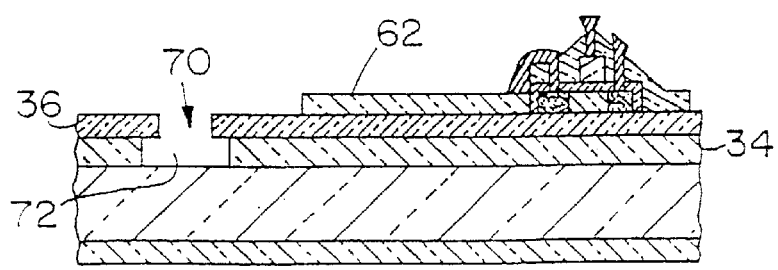

A polycrystalline silicon layer 42 is then deposited over the pixel and the layer 42 is then implanted 46, as seen in FIG. 2D, with an n-type dopant to lower the resistivity of the layer 42 to be used as a gate. The polysilicon is patterned to form the gate 50, as seen in FIG. 2E, which is followed by a large implant 52 of boron to provide p+ source and drain regions for the transistor. As shown in FIG. 2F, an oxide 54 is formed over the transistor and openings 60, 56, 58 are formed through the oxide 54 to contact the source 66, the drain 64, and the gate, respectively. A patterned metalization 70 of aluminum, tungsten or other suitable metal is used to connect the exposed pixel electrode 62 to the source 60 (or drain), and to connect the gate and drain to other circuit panel components.

A second fabrication procedure is one of the substrate release processes that have been developed to form thin (1 to 5 micron) films of processed silicon bonded to glass; these films contain active semiconductor devices such as FETs that are partially of completely fabricated prior to transfer. The crystallization and release procedures including the cleavage of laterally grown epitaxial films for transfer (CLEFT) approach are described more fully in U.S. Pat. No. 4,727,047 incorporated herein by reference. The chemical epitaxial lift-off (CEL) approach is described more fully in U.S. Pat. Nos. 4,846,931 and 4,883,561. Both of the CLEFT and CEL techniques permit the reuse of the substrate, leading to reduced cost compared to other approaches in which the substrates are consumed. By combining thin film release techniques with SOI wafers, we will be able to form the required high quality films and circuits on glass.

The foregoing indicates that CEL processes can be limited by the lateral distance that is required for the HF (or other etchant) undercut of the release layer. The key to large area panels using CEL is the release layer. The key to large area panels using CEL is the release of patterned devices and/or circuits rather than complete large-area films, because the circuits or devices have unused areas that can be used as vertical channels through the film to allow the etch to reach the release layer. This approach is illustrated in FIGS. 2H–2L. To remove the circuit from the release substrate a first opening 70 (in FIG. 2H) is formed in an exposed region of layer 36 that occurs between pixels. A second larger portion of layer 34 is than removed to form cavity 72 such that a portion of layer 36 extends over the cavity 72.

Figure 2I:
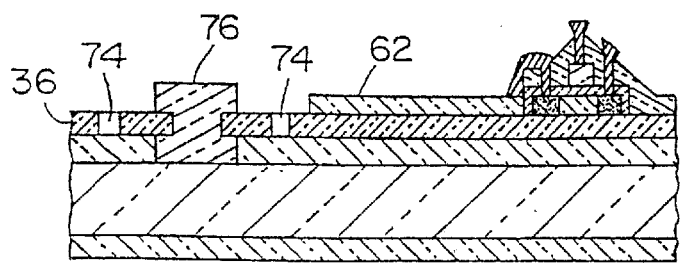
Figure 2J:
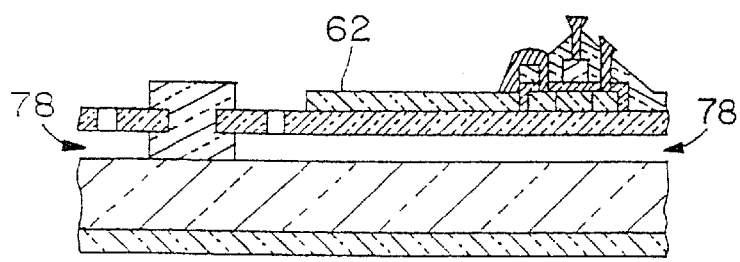
Figure 2K:
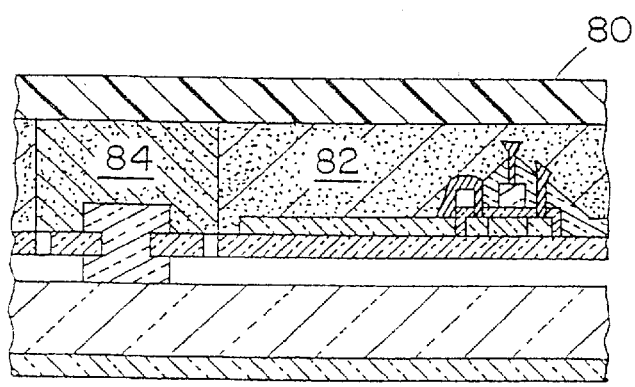

In FIG. 2I, a support post 76 is formed to fill cavity 72 and opening 70, and which extends over a portion of layer 36. Openings or via holes 74 are then provided through layer 36 such that an etchant can be introduced through holes 74, or lateral openings 78, to remove layer 34 (see FIG. 2J). The remaining insulating layer 36 and the circuitry supported thereon is now held in place relative to substrate 30 with support posts 76.

An epoxy that can be cured with ultraviolet light is used to attach an optically transmissive substrate 80 to the circuitry, and layer 36. The substrate 80 is than patterned such that regions of epoxy 82 is cured (see FIG. 2K. The subtrate 30 and posts 76 are removed to provide the structure shown in FIG. 2L, which is than processed to provide the desired display panel.

Note that the UV-cured adhesive (or tape) can be patterned to protect the circuits where necessary, and HF can be used to reach the remaining the release layer.

Note that where the tape is used, tape provides support to the circuits after release. Large area GaAs devices containing films have been fabricated in this way, and these have been released to form devices from entire wafers on one tape. The released circuits can be remounted on the glass and the other elements of the liquid crystal display panel. Transparent adhesives are the preferred method of mounting.

Figure 2L:
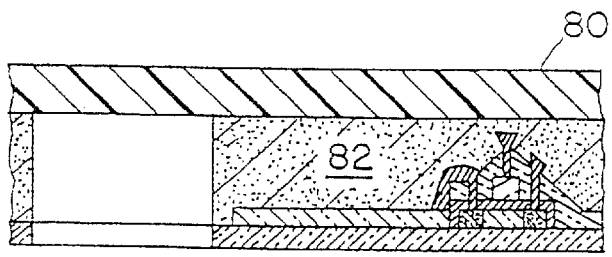

To form the final display panel the circuit panel shown in FIG. 2L is etched leaving the desired pixel elements exposed. Insulation and alignment layers, spacers, a sealing border and bonding pads for connections as added onto the circuit panel. A screen printing process can be used to prepare the border. The plate containing the color filters and the counterelectrode is sealed to the circuit panel with the sealing border after insertion of spacers. The display is filled with the selected liquid crystal material via a small filling hole or holes extending through the border. This filling hole is then sealed with a resin or epoxy. First and second polarizer films or layers are than bonded to both sides and connectors are added. Finally, a white light source 114, or other suitable light source, is coupled to polarize 112.

Figure 3:
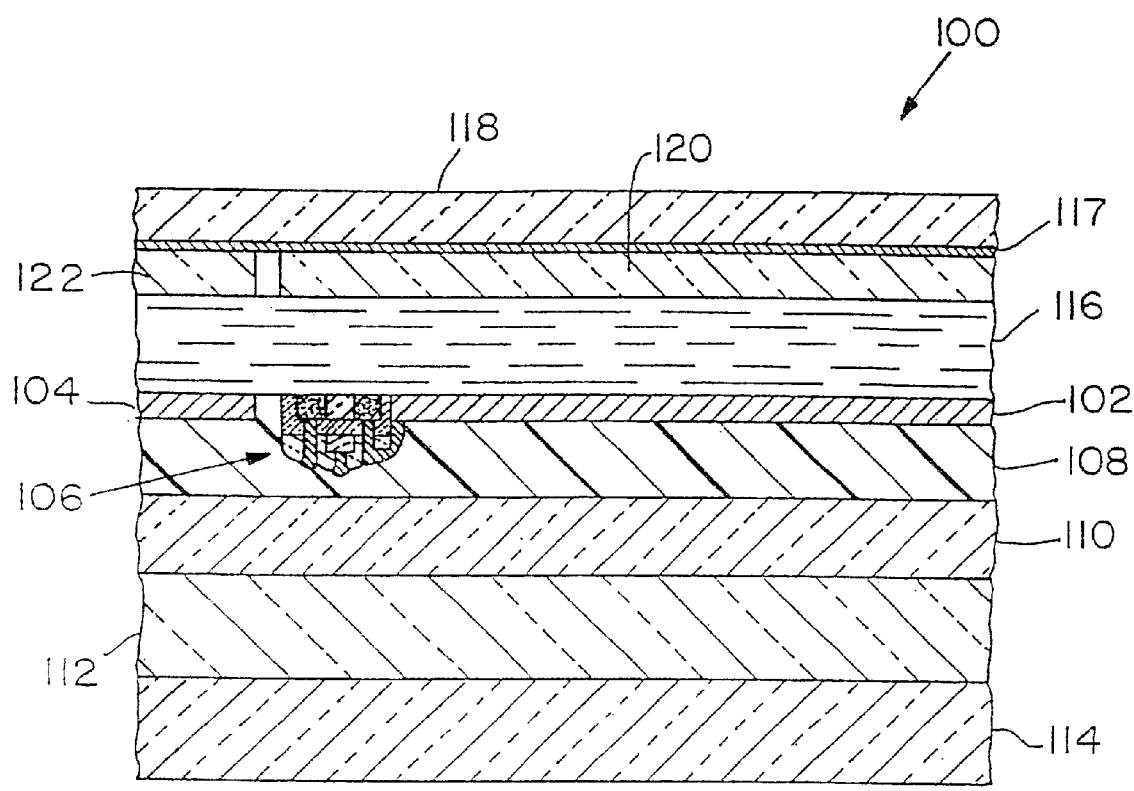
FIG. 3 is a cross-sectional view of a preferred embodiment of the display panel.

A cross-sectional view of the resulting device is shown in FIG. 3 wherein pixel electrodes 102 and 104 are laterally spaced from each other. Each pixel 102, 104 will have a transistor 106 and a color filter 120, 122 associated therewith. Polarizing elements 112, 118 are positioned on opposite sides of the structure which also includes bonding element or adhesive 108 and optically transmissive substrate 110, such as glass or plastic. Layer 108 can be a transparent epoxy or a low temperature glass that can have a thickness of 2–10 microns.

The CLEFT process permits the separation of a thin single-crystal films, grown by chemical vapor deposition (CVD), from a reusable homoepitaxial substrate. Unlike the CEL process, in the CLEFT process the circuits or devices are first bonded to glass and after mounting the separation is made between the circuits and the substrate.

The films removed from the substrate by CLEFT are essentially single-crystal, of low defect density, are only a few microns thick, and consequently the circuit panel has little weight and good transmission characteristics. For the purposes of the present application, the term "essentially single crystal" means a film in which a majority of crystals extend over a cross sectional area in a plane of the film of at least 0.1 cm$^2$, and preferably in the range of 0.5–1.0 cm or more.

The CLEFT process, illustrated in U.S. Pat. No. 4,727,047 involves the following steps: growth of the desired thin film over a release layer (a plane of weakness), formation of metallization and other coatings, formation of a bond between the film and a second substrate such as glass (or superstrate), and separation along the built-in-plane of weakness by cleaving. The substrate is then available for reuse.

The CLEFT process is used to form sheets of essentially single crystal material using lateral epitaxial growth to form a continuous film on top of a release layer. For silicon the lateral epitaxy is accomplished by the ISE process or other recrystallization procedures. Alternatively, other standard deposition techniques can be used to form the necessary thin-film essentially single crystal material.

One of the necessary properties of the material that forms the release layer is the lack of adhesion between the layer and the semiconductor film. Since a weak plane has been created by the release layer, the film can be cleaved from the substrate without any degradation. The release layers can comprise multi-layer films of $Si_3N_4$ and $SiO_2$. Such an approach permits the $SiO_2$ to be used to passivate the back of the CMOS logic. (The $Si_3N_4$ is the layer that is dissolved to produce the plane of weakness.) In the CLEFT approach, the circuits are first bonded to the glass, or other transfer substrate, and then separated resulting in simpler handling as compared to W-cured tape.

In the ISE process, the oxide film is strongly attached to the substrate and to the top Si film which will contain the circuits. For this reason, it is necessary to reduce the strength of the bond chemically. This technique involves a release layer that is preferentially dissolved with an etchant without complete separation, to form a plane of weakness in the release layer. The films can then be separated mechanically after the glass is bonded to the circuits and electrodes.

Mechanical separation is accomplished as follows: The upper surface of the film is bonded with a transparent epoxy to a superstrate such as glass. The film and glass are then bonded with wax to glass plates about 5 mm thick that serve as cleaving supports. A metal wedge is inserted between the two glass plates to force the surfaces apart. Since the mask has low adhesion to the substrate, the film is cleaved from the substrate but remains mounted on the glass. The substrate can then be used for another cycle of the CLEFT process, and the device processing is completed on the back surface of the film. Note that since the device remains attached to a superstrate, the back side can be subjected to standard wafer processing, including photolithography.

The method further involves the preparation of single crystal films, with seeding in the case of an Si substrate and without seeding for the case of foreign substrates. For the case of seeded Si films, the standard recrystallization process is employed. In either case, the bottom oxide or nitride layer can be optimized for release purposes.

Figure 4:
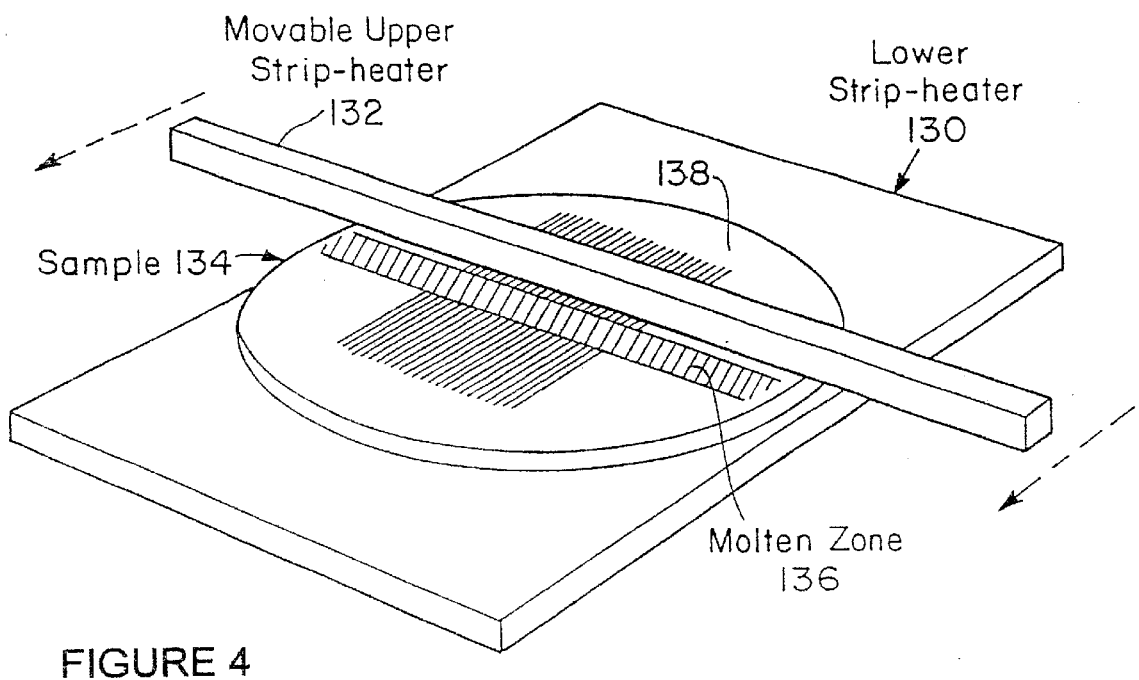
FIG. 4 illustrates in a perspective view a preferred embodiment of a system used for recrystallization.

In one embodiment of the recrystallization system, shown schematically in FIG. 4 the substrate temperature is elevated to near the melting point by a lower heater 130. An upper wire or graphite strip heater 132 is then scanned across the top of the sample 134 to cause a moving melt zone 136 to recrystallize or further crystallize the polycrystalline silicon. In the standard process on Si, the lateral epitaxy is seeded from a small opening through the lower oxide, and the resultant single crystal film has the orientation of the substrate. Capping layer 138 is deposited over the polycrystalline material prior to crystallization.

Figure 5A:
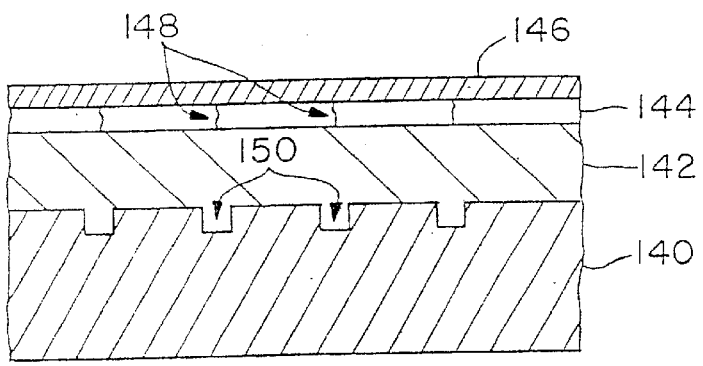
FIG. 5A illustrates the use of a patterned release layer to entrain boundaries in a crystallized material.

The use of foreign substrates precludes seeding. In this case, essentially single crystal Si is obtained by grain boundary entrainment techniques. Grain boundary entrainment can be used by patterning either the release oxide or the cap layer to introduce a modulation in the thermal gradients in the regrowth region. This modulation in the temperature field changes the location of the melt front and entrains the boundaries in predictable locations. Patterning of the release oxide 142 is shown in FIG. 5A. In this embodiment the substrate 140 has grooves 150 which are filled with the release oxide 142. Owing to this entrainment of boundaries 148 in the crystallized material 144 that can extend between the cap 146 and the release layer 142, the Si circuits or electrodes can be located in regions of high quality. Metallization and other features can be located over subgrain boundaries.

As shown, a preferable technique is to pattern the reusable substrate with the necessary entrainment structure. Once patterned in this way, the reusable substrate would not require repatterning. In such a scheme the entraining grooves are provided with a material of sufficient thickness to entirely fill the grooves. The material in the grooves could for example, comprise planarized $Si_3N_4$, while the release layer could comprise further deposition of $SiO_2$. Alternatively, the grooves could be filled entirely with $SiO_2$; the grooves could then function as channels for the release etch.

Figure 5B:
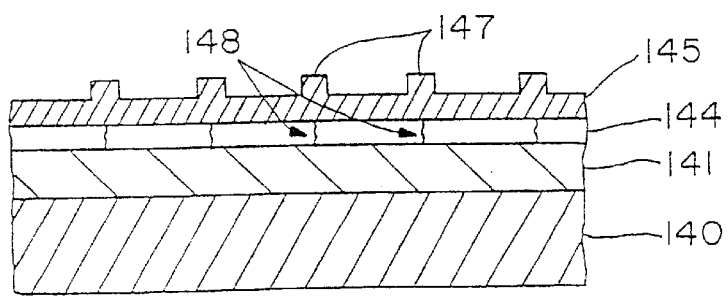
FIG. 5B illustrates the use of a patterned capping layer to entrain boundaries.

A second approach involves patterning the cap layer 145 after cap deposition, as shown in FIG. 5B. Patterned ridges 147 of the cap 145 overlie boundaries 148 in the recrystallized material that can extend between the cap 145 and release layer 141. A third approach would be to pattern the polycrystalline silicon layer.

Capping layers can be used with foreign substrates. The capping layer must be adherent throughout the thermal cycle, but must be removable for device processing. A cap works well for smooth Si substrates, but the patterned layers necessary for entrainment can require new films.

Figure 6A:
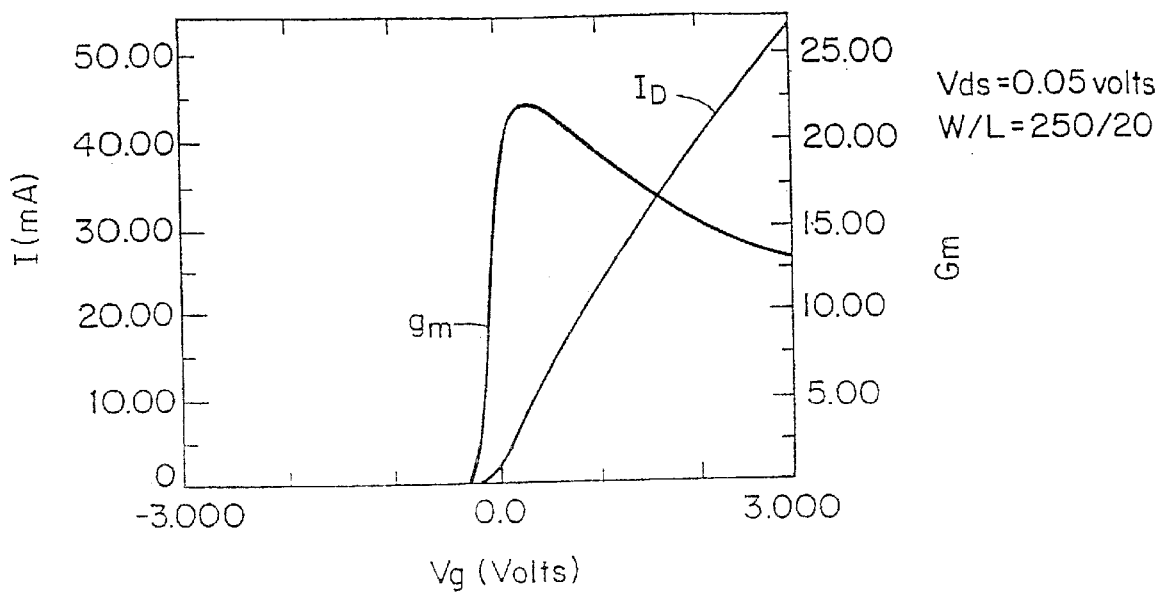
FIG. 6A illustrates the drain current and transconductance characteristics for a MOSFET prior to transfer to glass in accordance with the invention.
Figure 6B:
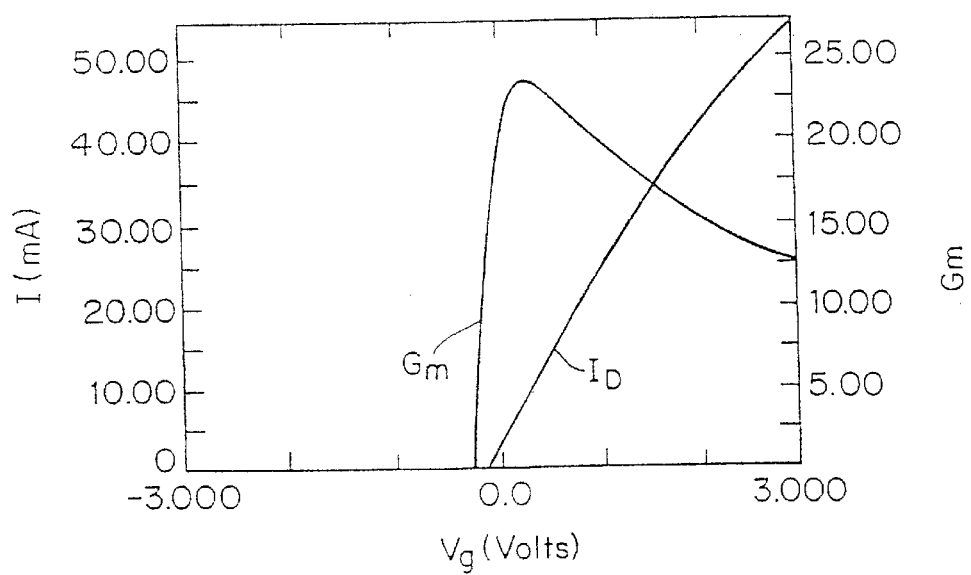
FIG. 6B illustrates the drain current and transconductance characteristics for the MOSFET of FIG. 6A after transfer to glass.

FIGS. 6–8 illustrate the electrical characteristics of a MOSFET made in accordance with the invention before and after transfer onto a glass substrate. FIG. 6A graphically depicts the drain current $I_D$ and the transconductance $G_M$ as a function of gate voltage $V_G$ in the linear region, where the drain-source voltage is 50 mV, for a MOSFET prior to transfer to glass. The MOSFET has a width-to-length ratio of 250 $\mu$m/20 $\mu$m and a gate oxide thickness of 890 A in a 0.5 $\mu$m thick recrystallized silicon material. FIG. 6B shows the drain current $I_D$ and transconductance $G_M$ of the same device after transfer to glass.

Figure 7A:
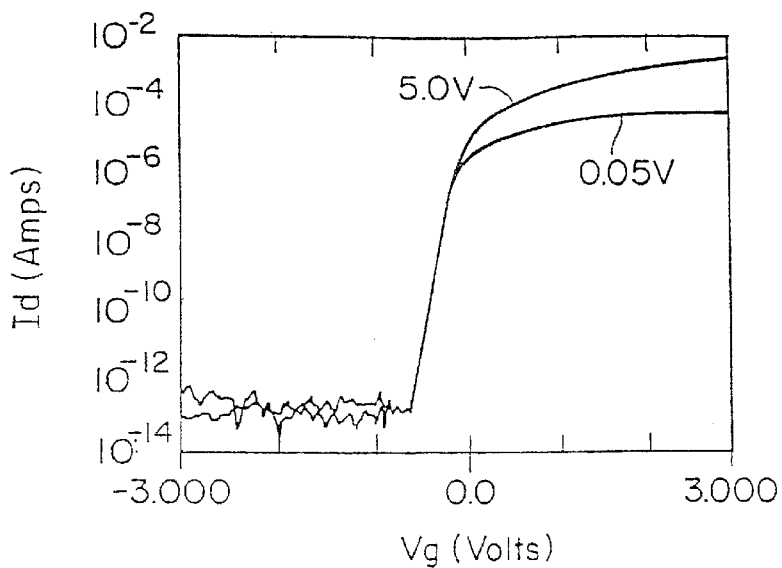
FIG. 7A illustrates the drain current of the device in FIG. 6A plotted on a logarithmic scale at two different drain voltages.

FIG. 7A graphically illustrates the drain current of the device of FIG. 6A plotted on a logarithmic scale at two drain-source voltages $V_{DS}$=50 mV and $V_{DS}$=5V.

Figure 7B:
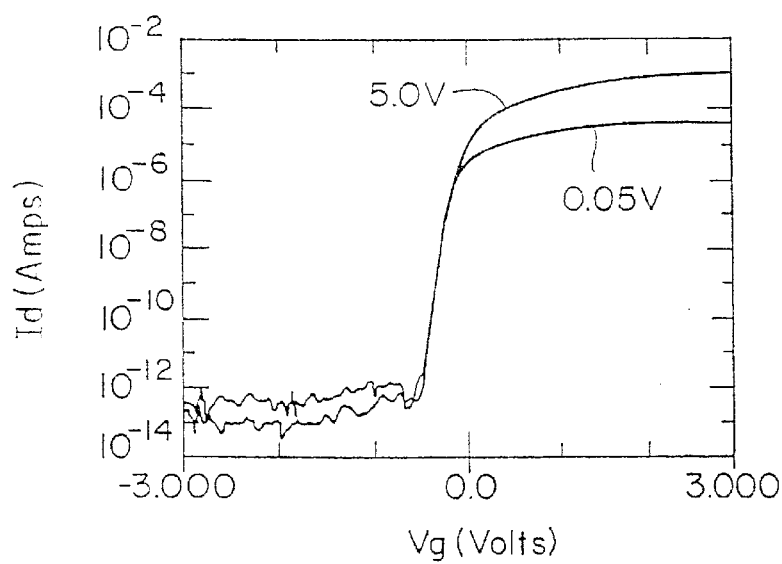
FIG. 7B illustrates the drain current of the device in FIG. 6B plotted on a logarithmic scale at two different drain voltages.

FIG. 7B graphically illustrates the drain current of the device in FIG. 6B plotted on a logarithmic scale at drain-source voltages of $V_{DS}$=50 mV and $V_{DS}$=5V.

Figure 8A:
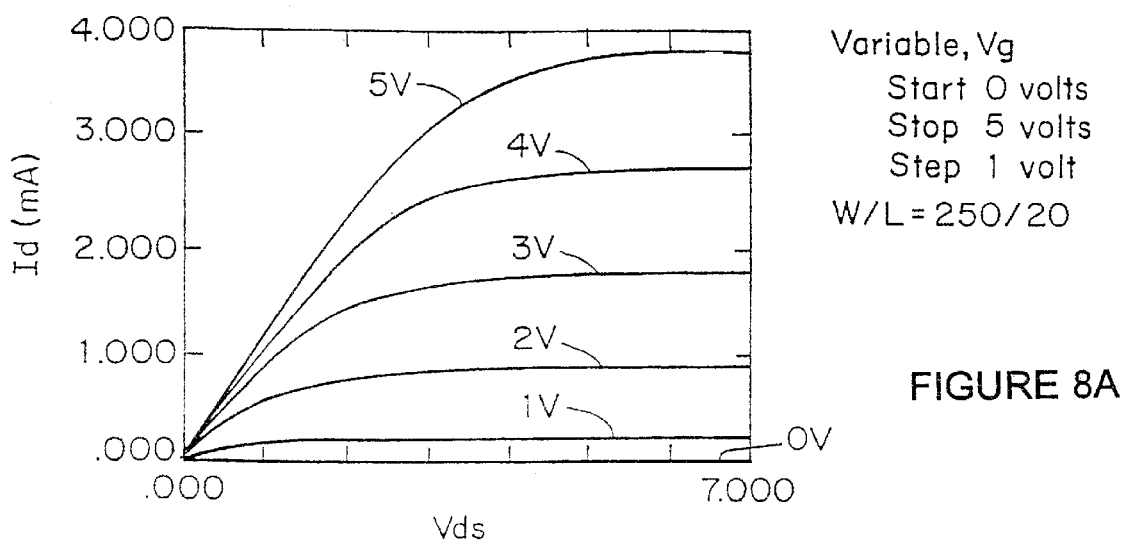
FIG. 8A illustrates the drain current output of the device of FIG. 6A with the gate voltage varying between 0 and 5 volts.

FIG. 8A graphically illustrates the drain current $I_D$ as a function of drain-source voltage of the device of FIG. 6A at gate voltages of $V_{GS}$=0, 1, 2, 3, 4 and 5 volts.

Figure 8B:
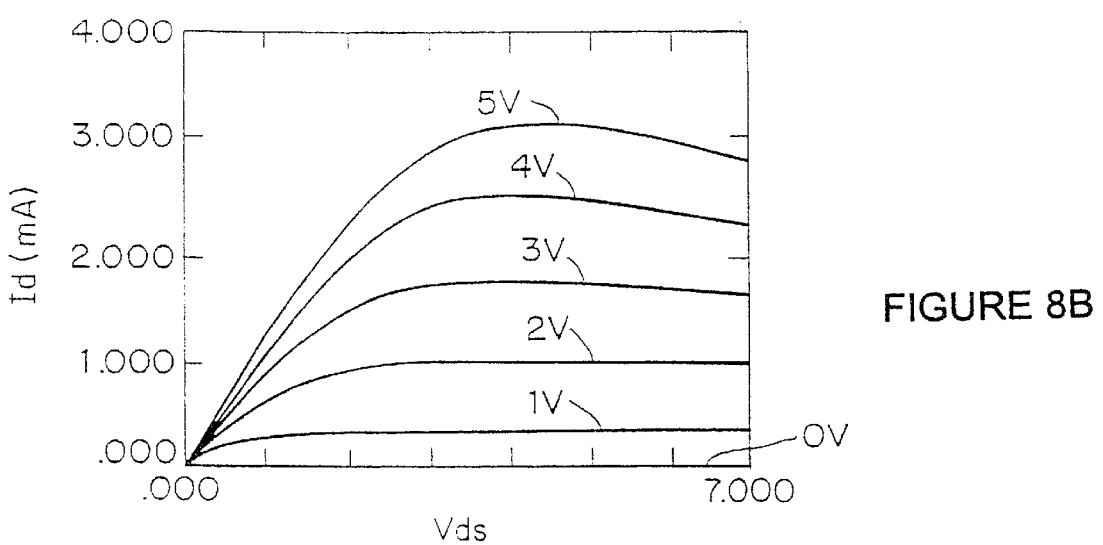
FIG. 8B illustrates the drain current output of the device of FIG. 6B with the gate voltage varying between 0 and 5 volts.
Figure 9:
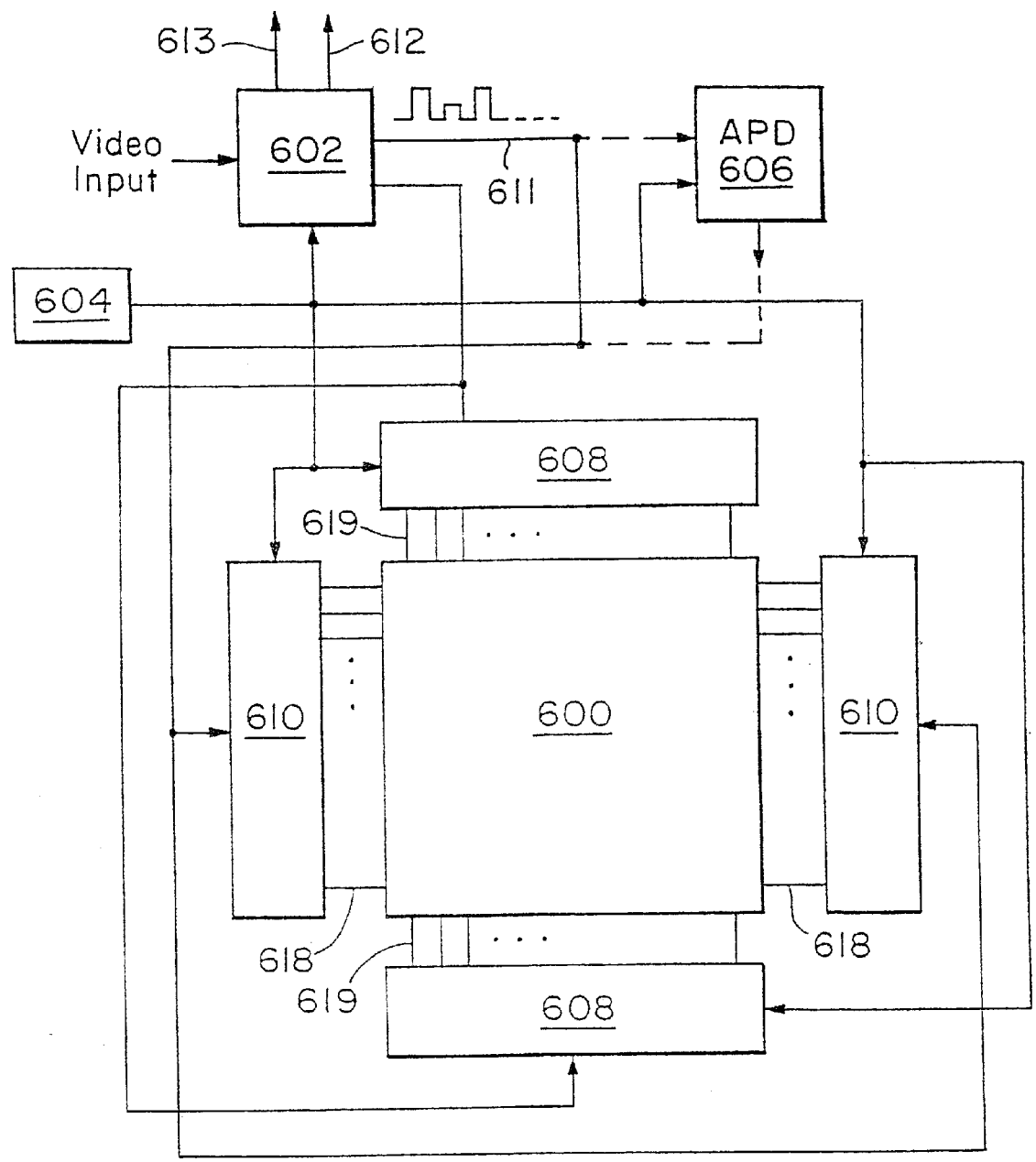
FIG. 9 is a circuit diagram illustrating the driver system for a projection device of the present invention.

FIG. 8B graphically illustrates the drain current $I_D$ as a function of drain-source voltage of the device of FIG. 6B at gate voltages of $V_{GS}$=0, 1, 2, 3, 4 and 5 volts. Referring to FIG. 9, an active matrix 600 comprises a plurality of light valves which are individually actuated by colocated driver circuitry (see FIG. 1B). The colocated driver circuitry is controlled by supporting driver circuitry which includes a video conditioning circuit 602, a system clock 604, an optional amplitude to pulse duration (APD) converter 606, column drivers 608, and a row drivers 610.

The video conditioning circuit 602 receives a video input signal which may be an RGB signal, an NTSC signal or other video format signal, or any digital or analog signal. The conditioning circuit processes the incoming signal producing separate video output signals (on lines, 611, 612 and 613) for each primary color and a synchronization signal (on line 615) for the column and row drivers 608 and 610. The video output signal on line 611 is a serial data stream wherein the amplitude of each signal of the data stream determines the intensity of light transmitted through each light valve.

If the APD convertor is not employed, the serial data stream on line 615 is received by the row drivers 610. The row drivers 610 send each of the signal data streams to the light valves through buses 618. The column drivers receive the sync signal on line 615 and, responsive to the sync signal, will be sent through buses 619 to turn on individual transistors allowing the associated signal of the data stream to charge the capacitor in each pixel. The capacitor sustains a charge, which is proportioned to the amplitude of the associated signal, on the light valve until the next scan of the array.

Alternately, the ADP converter may be employed such that each signal of the video output data stream is converted to a pulse having a pulse width which is proportional to the signal's amplitude. In any case, the driver circuit operates in the same manner as previously described.

Projection display devices of the present invention can employ light valve matrices having pixel densities which satisfy any of a wide range of the following existing computer display format requirements:

| Application | Display Format (Column x Row) |
|---|---|
| 1) Common Personal Computer | 1024 x 768 |
|  | 1280 x 1024 |
| 2) Workstation (Advanced Personal Computer) | 1280 x 1024 |
|  | 1580 x 1280 |
|  | 2048 x 2048 |
| 3) Other Workstations (Non-Standard) | 1152 x 900 |
|  | 1280 x 1024 |
|  | 1600 x 1280 |

Thus, a display monitor employing one or more single crystal silicon light valve matrices having any of the above-described pixel densities may be provided in accordance with the present invention.

One feature of the present invention is that projection devices employing single crystal light valve matrices provide high resolution images. High resolution images are possible because high density light valve arrays may be formed in single crystal silicon films. Referring to Table 1, the light valve diagonal is shown for various array sizes and pixel densities. Note that the diagonal dimensions followed by an asterisk indicate the array is compatible with 35 mm optics. The use of 35 mm optics is a key feature in minimizing the size, weight and cost of the described optics requiring the light valve image designed dimension to be no greater than 42 mm (1.654 inches). Therefore, it is desirable to use a light valve imaging technology that provides the highest density of information content. It is likely that the light valve technology discussed herein is compatible with as-fabricated densities of 2000 dots-per-inch. This allows projection of high resolution images using compact, low cost and widely available optical components. The small size of the light valve allows the use of small format condenser lens assembly dichroic mirrors and prisms and projection lens. Subsequently, the package size of the described projector and monitor can be maintained at small dimensions and component weight is similarly minimized. Appropriate 35 mm format optical components are widely available and can be obtained at low cost relative to large and/or custom optical components. For projector and monitor requirements that cannot be met with a 35 mm compatible light valve, larger conventional or custom optical components may be employed. Due to the minimum size of a particular light valve format afforded by the described light valve technology, similar cost, size and weight advantages are translated to the procurement of custom optical components.

As has been described, the light valve technology described herein can be used to implement projection arrays of 1024×768 through 2048×2048 pixels using 35 mm format optical components. This will permit the execution of high resolution color and monochrome image projectors and monitors at relatively compact dimensions and low weight.

One implementation of the monitor is to form a 17.5 inch×11.5 inch image suitable for the display of two side-by-side 8.5 inch×11 inch pages with additional screen room for data window access. The use of the described light valve and projection technology would allow the physical format of the monitor to be less than 22 inches high, less than 20 inches wide, and less than 10 inches deep. The use of a single 150 to 300 watt metal-halogen lamp in this implementation would provide the rear-proportion screen image at a brightness of 25 foot-Lamberts or greater. The choice of screen material could include a simple diffuser for maximum viewing angle or a lenticular configuration for maximum brightness over a reduced solid viewing angle.

TABLE 1

DIAGONAL ARRAY DIMENSION - INCHES/(MM)
Fabricated dots/inch (DPI) on light valve matrix

| ARRAY SIZE | 800 | 1000 | 1200 | 2000 |
|---|---|---|---|---|
| 1024 x 768 | 1.600* | 1.280* | 1.137* | 0.640* |
|  | (40.64) | (32.51) | (28.88) | (16.26) |
| 1280 x 1024 | 2.049 | 1.639* | 1.366* | 0.820* |
|  | (52.04) | (41.63) | (34.70) | (20.82) |
| 1580 x 1280 | 2.542 | 2.033 | 1.695 | 1.017* |
|  | (64.56) | (51.65) | (43.05) | (25.82) |
| 2048 x 2048 | 3.620 | 2.896 | 2.414 | 1.448* |
|  | (91.96) | (73.57) | (61.32) | (36.78) |

Another feature of the present invention is that a projection display device employing single crystal silicon light valve matrices provides images with high brightness. To accomplish this, each single crystal silicon light valve matrix employed in a projection display device has a high optical aperture which is defined as the percentage of transparent area to total matrix area. Table 2 provides the optical aperture for various light valve arrays. It is noted that in general the minimum acceptable optical aperture for an array is 40%. As indicated by Table 2, as pixel density increases, which increases image resolution, optical aperture decreases. However, reducing the switching device size and/or the interconnect size for a given pixel density will increase the optical aperture.

TABLE 2

OPTICAL APERTURE COMPUTATIONS

| Transistor length (um) | 3 | 3 | 3 | 3 |
|---|---|---|---|---|
| Transistor width (um) | 6 | 6 | 6 | 6 |
| Line width (um) | 2 | 4 | 6 | 8 |
| lines per inch | 1000 | 1000 | 1000 | 1000 |
| pixel size (um) | 25.4 | 25.4 | 25.4 | 25.4 |
| grid shadow (sq. m) | 97.6 | 187.2 | 268.8 | 342.4 |
| trans. shadow (sq. um) | 18 | 18 | 18 | 18 |
| pixel area (sq. um) | 645 | 645 | 645 | 645 |
| Packing Factor (%) | 85 | 85 | 85 | 85 |
| OPTICAL APERTURE (%) | 69.8 | 58.0 | 47.2 | 37.5 |
| Transistor length (um) | 3 | 3 | 3 | 3 |
| Transistor width (um) | 6 | 6 | 6 | 6 |
| Line width (um) | 2 | 4 | 6 | 8 |
| lines per inch | 800 | 800 | 800 | 800 |
| pixel size (um) | 31.8 | 31.8 | 31.8 | 31.8 |
| grid shadow (sq. um) | 123 | 238 | 345 | 444 |
| trans. shadow (sq. um) | 18 | 18 | 18 | 18 |
| pixel area (sq. um) | 1008 | 1008 | 1008 | 1008 |
| Packing Factor (%) | 85 | 85 | 85 | 85 |
| OPTICAL APERTURE (%) | 73.1 | 73.1 | 73.1 | 73.1 |
| Transistor length (um) | 3 | 3 | 3 | 3 |
| Transistor width (um) | 6 | 6 | 6 | 6 |
| Line width (um) | 2 | 4 | 6 | 8 |
| lines per inch | 1200 | 1200 | 1200 | 1200 |
| pixel size (um) | 21.2 | 21.2 | 21.2 | 21.2 |
| grid shadow (sq. um) | 80.7 | 153.3 | 218.0 | 247.7 |
| trans. shadow (sq. um) | 18 | 18 | 18 | 18 |
| pixel area (sq. um) | 448 | 448 | 448 | 448 |
| Packing Factor (%) | 85 | 85 | 85 | 85 |
| OPTICAL APERTURE (%) | 66.3 | 52.5 | 40.2 | 29.5 |
| Transistor length (um) | 3 | 3 | 3 | 3 |
| Transistor width (um) | 6 | 6 | 6 | 6 |
| Line width (um) | 2 | 4 | 6 | 8 |
| lines per inch | 2000 | 2000 | 2000 | 2000 |
| pixel size (um) | 12.7 | 12.7 | 12.7 | 12.7 |
| grid shadow (sq. um) | 46.8 | 85.6 | 116.4 | 139.2 |
| trans. shadow (sq. um) | 18 | 18 | 18 | 18 |
| pixel area (sq. um) | 161.3 | 161.3 | 161.3 | 161.3 |
| Packing Factor (%) | 85 | 85 | 85 | 85 |
| OPTICAL APERTURE (%) | 50.9 | 30.4 | 14.2 | 2.2 |

Figure 10A:
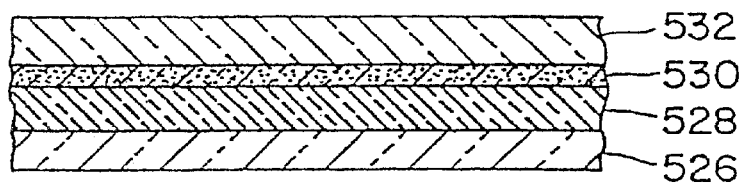
FIGS. 10A–10D are a preferred process and transfer sequence for fabricating a light valve matrix and transferring it to a support structure.

In another preferred embodiment, a growth and transfer process is employed to provide a thin-film of single crystal silicon positioned on glass as shown in FIGS. 15A–15D. Referring to FIG. 10A, a buffer (insulator) layer 528 of silicon is epitaxially grown on a silicon substrate 526. A strained GeSi layer 530 is epitaxially grown on the buffer layer 528 and an upper layer 532 of single crystal silicon is epitaxially grown on the GeSi layer. The strained layer 530 should be thin, on the order of a few hundred angstroms, to avoid misfit defect formation that would thread into the upper silicon layer 532.

Figure 10B:
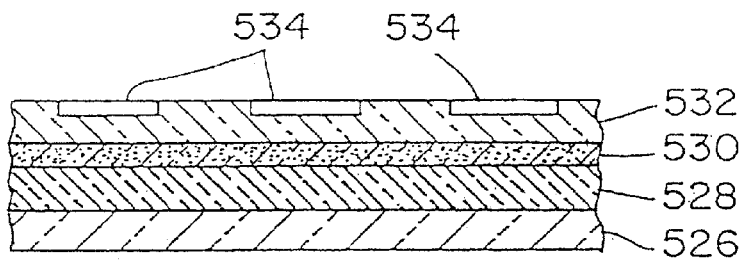
Figure 10C:
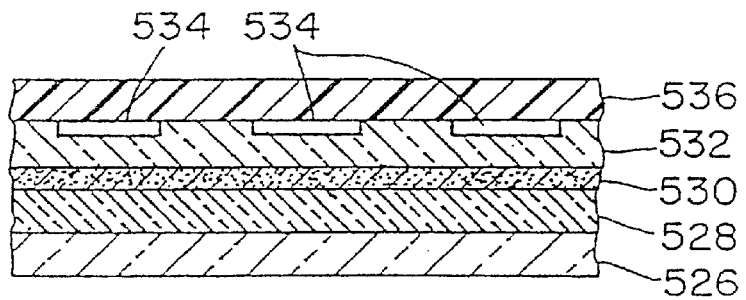
Figure 10D:
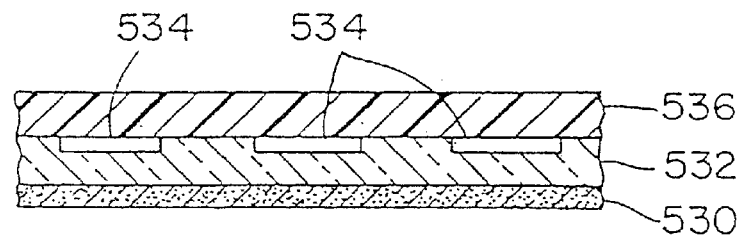

Referring to FIG. 10B, integrated circuit processing techniques, such as any of the techniques previously described herein, are employed to form light valve matrix circuitry 534 in the single crystal silicon layer 532. Next, the processed wafer is mounted with an epoxy adhesive of the type described below to a glass or plastic support 536 (FIG. 10C). The epoxy fills in the voids formed by the processing and adheres the front face to the support 536. The silicon substrate 526 and buffer layer 528 are etched off with the GeSi layer 530 serving as an etch stop layer (FIG. 10D). The GeSi layer could then be selectively etched away without effecting the silicon film 532.

FIGS. 11A–11C illustrate another preferred process for transferring and adhering circuits of thin films of silicon to a glass substrate. The starting structure is a silicon wafer 718 upon which an oxide layer 716 and a thin film of poly-Si, a-Si or x-Si 714 is formed using any of the previously described processes such as ISE or CLEFT. A plurality of circuits, such as pixel electrodes, TFT's, Si drivers and Si logic circuits, are then formed in the thin film. FIG. 11A shows three such wafers, A, B, C. In wafer A, logic circuits 740 are formed. In wafer B, pixel electrodes 762 and TFT's 751 are formed. In wafer C, driver circuits 720 are formed. A wafer is attached to a superstrate transfer body 712, such as glass or other transparent insulator, using an adhesive 721. Preferably the adhesive is comprised of an epoxy, such as, a cycloaliphatic anhydride; for example; for example, EP-112 LS made by Masterbond Inc. The adhesive must satisfy the following criteria:

Excellent spectral transmission in the visible range;

Good adhesion to glass, oxides, metals, nitrides;

No reactions with glass, metals, oxides, nitrides;

Low shrinkage;

Low warp/stress;

Able to tolerate acids or bases at 100 C for extended periods without lifting, losing adhesion, or degrading;

Able to withstand 180 C for 2 hours with no optical change;

Good resistance to acids and solvents;

Able to tolerate dicing and heating step (including an acid etch step with no lifting);

Low viscosity to allow thin adhesive films; and

Ability to be vacuum degassed to eliminate all bubbles.

In general, the cycloaliphatic anhydrides meet most of the above criteria. The epoxy preferably has a low cure temperature to minimize shrinkage, a very low ion content (<5 ppm) and spectral stability over extended time periods.

The wafer is attached, using the adhesive 721, to a glass superstrate 712. The adhesive is vacuum degassed to eliminate all bubbles. The sandwich structure is then cured at a low temperature of about 100 C for 4–8 hours which causes the adhesive to gel and minimizes the shrinkage characteristics. Then the adhesive is fully cured at a higher temperature of about 160° C. for about 8 hours. This cure assures that the bonds are fully matured. Without this cure, the adhesive will not stand up to the subsequent acid etching step.

The wafer, is then cleaned and the native oxide 716 is etched off the back surface. The wafer is put into a solution (KOH or equivalent) of 25 grams to 75 ml H20 at 100 C. Depending on the thickness of the wafer, it may take up to 5 hours to etch the Si 718 and oxide 716 layers. The solution etches silicon very rapidly, i.e. 2 to 3 microns/min., and uniformly if the wafers are held horizontally in the solution with the etching surface face up. The etchant has a very low etch rate on oxide, so that as the substrate is etched away and the buried oxide is exposed, the etching rate goes down. The selectivity of the silicon etch rate in KOH versus the oxide etch rate in KOH is very high (200:1). This selectivity, combined with the uniformity of the silicon etching, allows the observer to monitor the process and to stop the etch in the buried oxide layer 716 without punching through to the thin silicon layer 714 above it. Wafers up to 25 mils thick and oxides as thin as 4000 A have been successfully etched using this process. An alternative etchant is hydrazine, which has a much higher etch rate selectivity or ethylene diamine pyrocatacol (EDP).

When the silicon is completely gone, the vigorous bubbling, which is characteristic of silicon etching in KOH, abruptly stops, signalling that the etching is complete.

The thin films 714 transferred to the respective glass superstrates 712 are now rinsed and dried. If not already provided with circuits 740, 751, 762, or 720, the films 714 can be backside circuit processed if desired, since the epoxy adhesive 720 has very good resistance to chemicals. In addition, the epoxy is very low in stress, so that the thin film is very flat and can go through conventional photolithography steps.

In the aforementioned light valve matrix fabrication processes, disclination defects in the liquid crystal material may be induced by non-planar circuit topography formed in the film resulting in irregular stacking and subsequent image aberration. Planarized circuitry would eliminate the disclination problem. An option is to use the oxide layer after transfer of the film to the optically transmissive substrate to provide a planar surface. The oxide layer is planar or substantially planar (i.e. uniformities of <1 micron across its surface) such that an even topography is provided. Then any necessary shielding or pixel circuitry can be formed to produce a planarized circuit substantially free of disclination.

In the aforementioned embodiments, it is noted that light valve matrices having a diagonal of 1–2 inches do not require spacers in the liquid crystal volume (see FIG. 1A). Since spacers are non-transmissive elements, eliminating them from the volume results in an improved optical aperture and thus increased brightness for the matrix. Also prevents optical aberration caused by spacers at small pixel geometries.

Due to the higher intensities of light used in projection systems that are necessary to provide the desired brightness, the sensitivity of the single crystal pixel transistors to the light source can impair performance. The light source can be a halogen lamp that produces between 100 and 1000 watts and preferably operates in the range of 150–300 watts. Other lights such as discrete lasers (RGB), cathodoluminescent light sources, and arc-lamps producing similar levels of power per unit area can also be used. It is therefore desirable to reduce the sensitivity of the active matrix to the light source. This is accomplished by shielding one or both sides of each transistor in the array with a light shield that will substantially attenuate the light directed or scattered toward each transistor. A metal or other optically opaque material can be used as a shield. When the shield is a metal it can also serve as an interconnect or a gate to the transistor being shielded. At normal incidence, a metal shield can completely attenuate light from the source at wavelengths at or above the silicon bandgap with thicknesses in the range of 2000–10,000 angstroms. Shielding can also be employed around the edge of the active matrix to attenuate or block light directed towards the peripheral circuitry.

In FIGS. 12A–12E a process for fabricating a double shielded active matrix array for a projection system is illustrated. The left figure shows a cross-sectional view of a pixel transistor of each step or embodiment. The right side illustration in FIGS. 12A–12C and 12E show a top view including the transistor 804, pixel area 811, and interconnect lines 808 and 810. In FIG. 12A there is shown the silicon substrate 800, oxide layer 802, source and drain 804 regions, a channel region 805, a second oxide layer 806, and portions of the interconnect lines 808 and 810 that serve as the gate and source connector for the transistor 804. FIG. 12B shows a third oxide layer 812 and holes 814 formed therein to provide a bridge interconnect between portions of line 808. In FIG. 12C is shown the formation of the first metal shield 816 over the oxide 812 and through holes 814 to interconnect lines 808. The first shield 816 has a surface area to substantially block normally incident light from reaching transistor 804 from one side of the circuit panel. The area of shield 816 should be minimized to maintain the optical aperture of the array. FIG. 12D illustrates the use of a body contact 822 fabricated after the transfer of the panel onto glass substrate 818 and formation of the second shield 820. The fabrication of such a body contact is described more fully in U.S. Ser. No. 07/823,858 filed on Jan. 22, 1992, which is incorporated herein by reference. In FIG. 12E there is illustrated the use of a portion of the second shield 824 as a second back side gate 826. Gate 826 can be used to control the opposite side of the channel from the front side gate region 808. The present transfer process thus provides for additional back side processing to provide optical interconnects, optical shielding interconnects, and double sided gating of each or selected transistors in the array.

The light valve image projector and monitor configurations can be used for the applications beyond image presentation. These include image generation/projection for electronic printing and photographic image recording. In the former, the light valve and image projection optics can be used to form an image on an electrophotographic media (as in the imaging drum of xerographic or laser printer processors). The key advantage is that the entire two-dimensional image can be exposed at once. For photographic applications, the image can be projected onto photographic film or paper.

Color can be implemented in the projector or monitor through the use of color filters instead of dichroic mirrors. In one implementation, white light from a single or multiple lamps could be passed through each of red, green and blue filter to its incidence onto the appropriate color-assigned light valve. Alternatively, color filters can be fabricated directly on the light valve assembly. This could be done with a single color filter (e.g.,red, green or blue) on a light valve or the specific alignment of color filters on the discrete elements constituting the light valve. The latter would allow a color image to be obtained using a single light valve but forces a factor of 3 or 4 reduction in color pixel density as the elements are assigned a red, green, or blue filter or a red, green blue and white filter respectively. Alternatively, subtractive color filters (yellow, cyan and magenta) would be similarly used.

A key criterion in the projector/monitor design is the management of heat generated by the lamp light source. A significant portion of this heat is in the form of infrared (IR) radiation emanating from the lamp. Methods of controlling this IR radiation are its absorption by an IR filter or its reflection by an IR "heat mirror" that allows high transmission of visible light to the subsequent optics. Another method is the use of a dichroic mirror that separates the IR radiation from the visible light path and directs the IR to directly exit the projector or monitor housing.

A light valve panel formed by the described technology is compatible with 35 mm format optics. Therefore, this imaging device can be fabricated such that the assembled device has equivalent physical dimensions as a standard 35 mm photographic transparency whose image is projected via a conventional and generally available 35 mm "slide projector". Thus, an embodiment of the light valve projector is to use a single light valve matrix panel with integral drive electronics, as described herein, that is packaged to be size equivalent with a standard mounted 35 mm transparency and insert this modular electronic imaging device into a 35 mm "slide projector" without modification in order to generate the projected image. The light valve imaging device is connected by a cable to control electronics as are described herein. In this embodiment, a single light valve panel could generate a monochrome image or a color image through the use of applied color filters as described elsewhere herein. The light valve panel used for this embodiment can have the same fabricated element/pixel density as described for the other embodiments.

Figure 13:
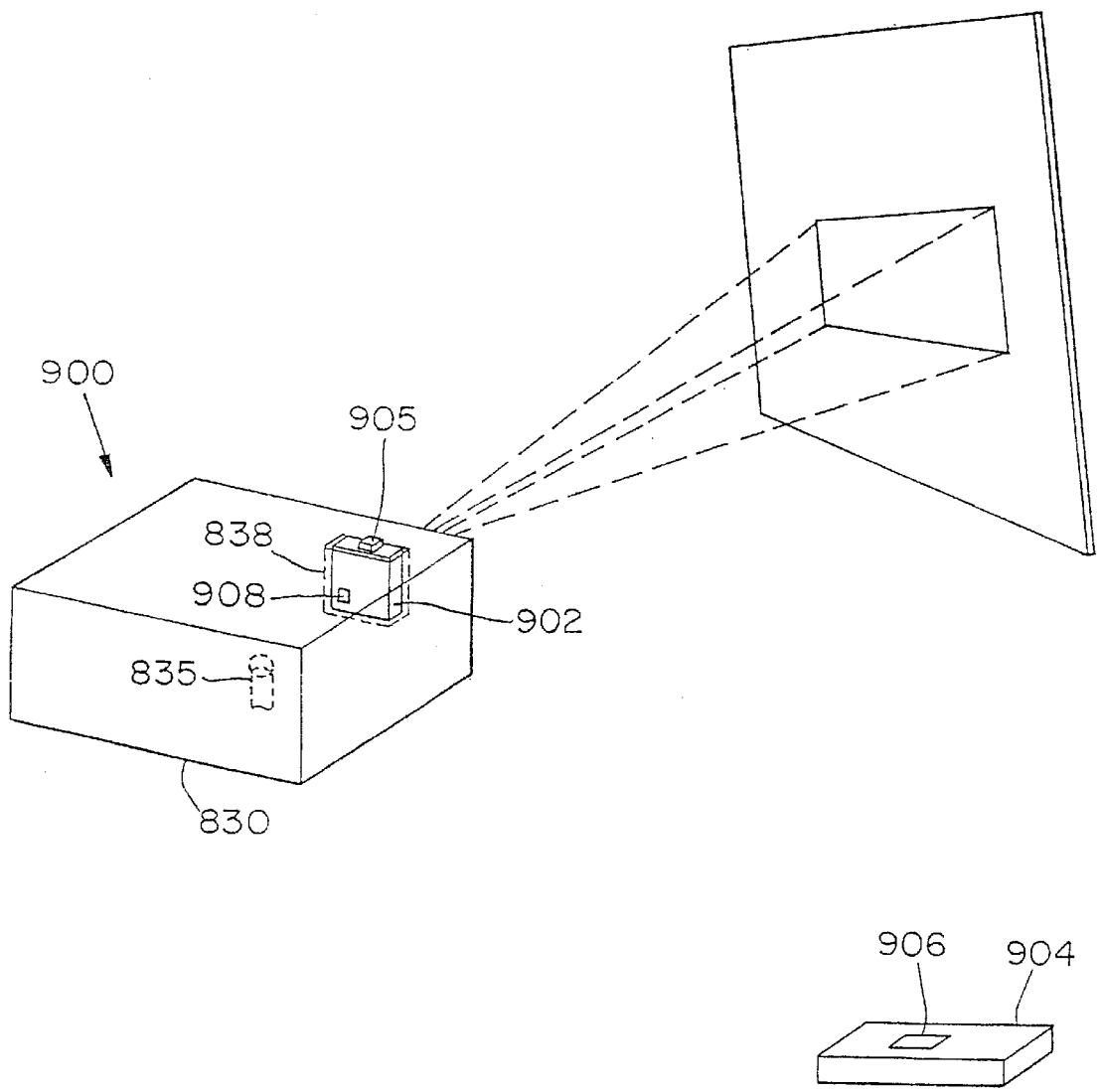
FIG. 13 is a perspective view of another embodiment of an active matrix slide assembly of the present invention.

In preferred embodiment shown in FIG. 13, an active matrix slide assembly 900 includes an Active Matrix (AM) slide 902 and a remote electronics housing 904. The slide 902 is dimensioned to be positioned in the chamber 838 of a 35 mm slide projector 830. In contrast to previously described embodiments, the slide 902 is not physically connected to the electronics housing 904. Instead, the slide and the electronics in the housing communicate with each other via antennas elements 905 and 906 respectively. In preferred embodiments, the antennas can be a pair of RF antennas or an infrared transmitter element such as an infrared LED paired with an infrared receiver element which can be a photodiode elements. The antenna 905 can be integrated into a handle (not shown) to provide for manual insertion and removal from chamber 838.

Figure 14:
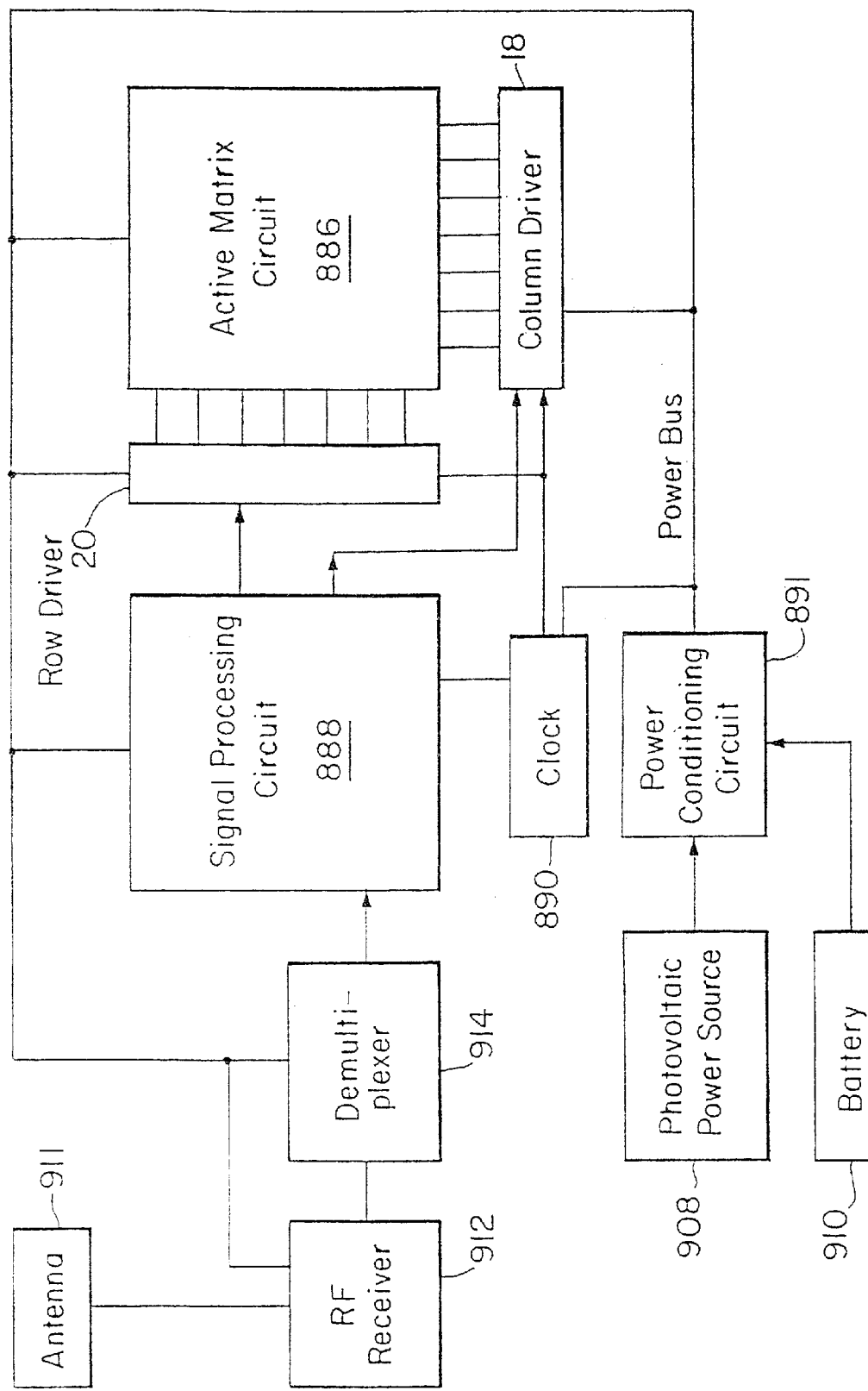
FIGS. 14 and 15 are circuit diagrams illustrating two preferred driver systems for the active matrix slide assembly of FIG. 13.
Figure 15:
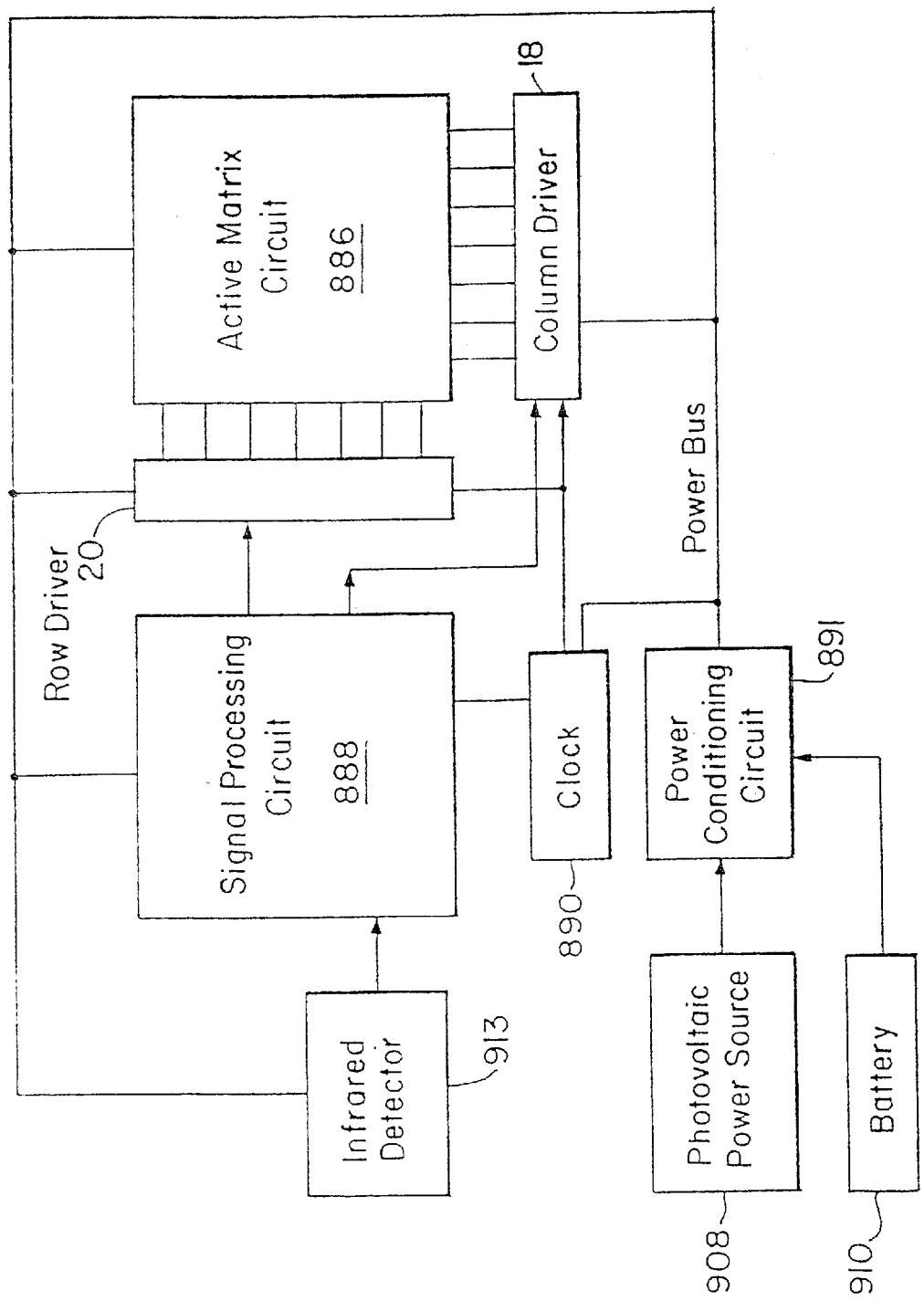

Driver circuitry for the active matrix slide assembly of FIG. 13 is illustrated in FIGS. 14 and 15. Referring to FIG. 14, the driver circuitry includes the signal processing circuit 888, the system clock 890, the power conditioning circuit 891, column drivers 18, row drivers 20, a photovoltaic power source 908, a battery 910, an RF receiver 912 and an demultiplexer 914. The RF receiver 912 receives a stream of RF signals from the antenna 911. A demultiplexer 914 formats the RF signal stream such that it is can be processed by the previously-described signal processing circuit 888. The battery 910 and the photovoltaic power source 908, either individually or together, provide power to support the operations of the active matrix slide circuitry. The photovoltaic power source 908 can use slide projector light source energy to provide power to the active matrix slide and is therefore mounted onto the slide outer surface facing the light source (shown in FIG. 13).

Referring to FIG. 15, the driver circuitry includes the signal processing circuit 888, the system clock 890, the power conditioning circuit 891, column drivers 18, row drivers 20, a photovoltaic power source 908, a battery 910 and an infrared detector photodiode 913. The photodiode 913 receives infrared signals from the electronics (not shown) which are processed by the signal processing circuit 888.

Figure 16:
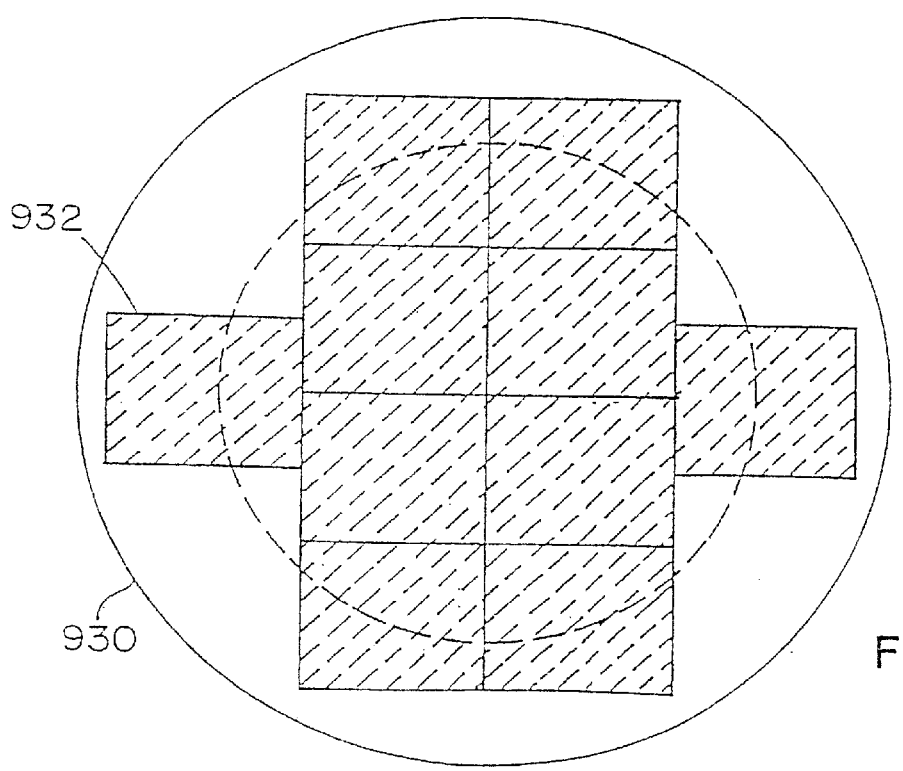
FIG. 16 is a top view of a semiconductor wafer which can be processed to provide a plurality of active matrices for use in active matrix slide assemblies.

As noted previously, an active matrix slide can be fabricated which has equivalent dimensions as a standard 35 mm slide. This can be accomplished because the previously described fabrication processes can produce a plurality of small active matrix circuit panels from a single wafer as shown in FIG. 16. Using a 6 inch silicon wafer 930, a number of active matrices can be produced from the wafer using any of the aforementioned processing techniques.

Figure 17:
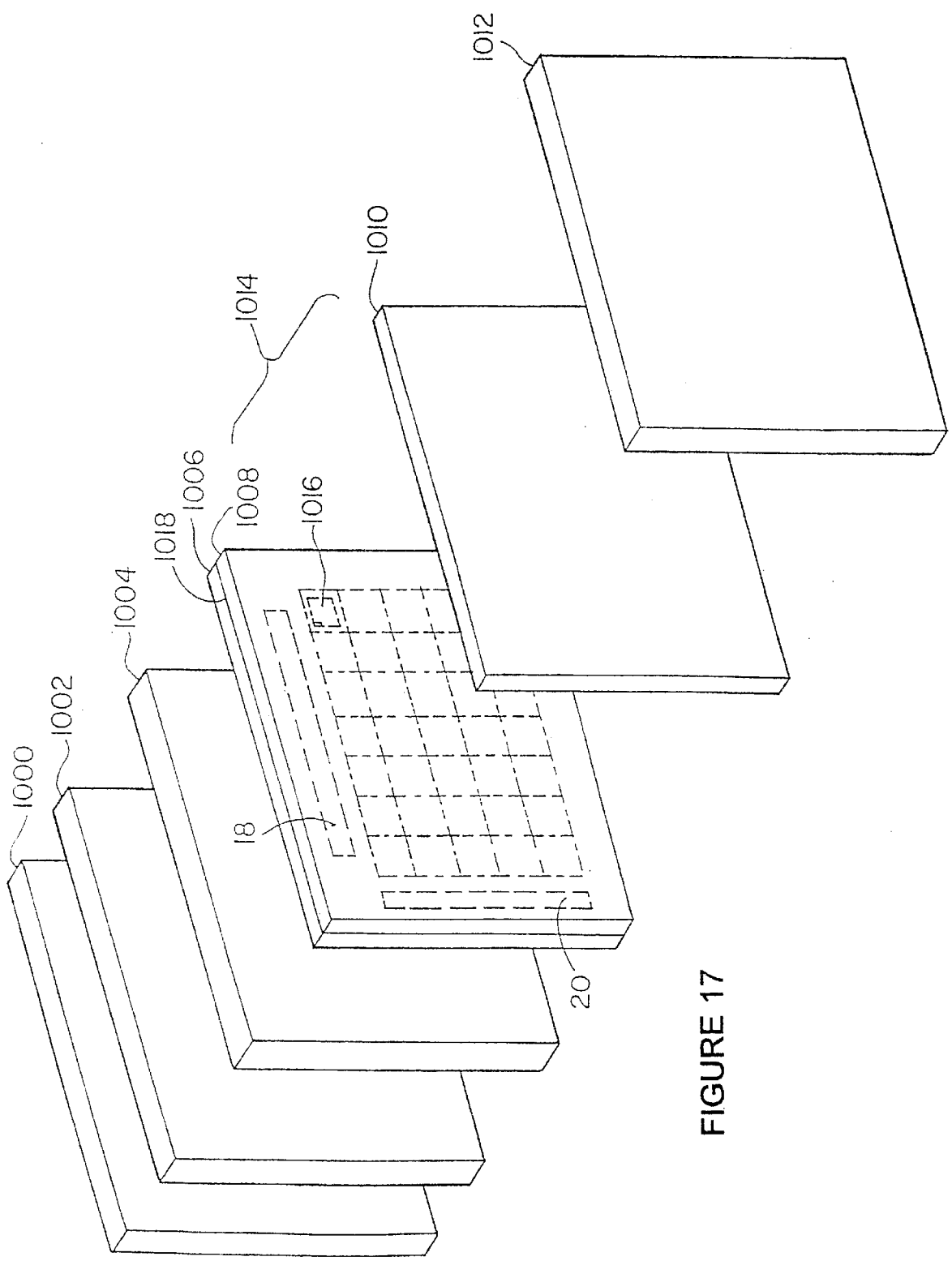
FIG. 17 is an exploded perspective view of an active matrix transmission display employing a color filter system of the present invention.

Another preferred embodiment of the invention is illustrated in the perspective view of a liquid crystal transmission display in FIG. 17. The basic components of the display include a light source 1000 that can be white or some other appropriate color, a first polarizing filter 1002, an optically transparent substrate 1004, a color filter array 1006, an active matrix circuit panel 1008, a counterelectrode 1010 and a second polarizing filter 1012, which are secured in a layered structure. A liquid crystal material 1014 is placed in a volume between the active matrix circuit panel 1008 and the counterelectrode 1010.

The circuit panel 1008 comprises an array of pixel elements 1016 formed in a surface 1018 of a thin film of essentially single crystal silicon. The pixel elements 1016 are individually actuated by a drive circuit having first 18 and second 20 circuit components that are positioned adjacent the pixel array such that each pixel can produce an electric field in the liquid crystal material lying between the pixel 1016 and the counterelectrode 1010 secured to the polarizer 1012. The electric field causes a rotation of the polarization of light being transmitted across the liquid crystal material that results in an adjacent color filter element being illuminated. The color filter array 1006 is located adjacent to the circuit panel 1008 such that each color filter element is associated with a pixel element. The individual elements of color filter array 1006 can be grouped into an arrangement of three (or four) colors that can have any one of a number of geometric configurations such as a triad arrangement, a stripe arrangement or a quad arrangement. The three colors can be, for example, blue, green and red, or alternatively yellow, cyan and magenta, or any other group of colors that will provide the desired colors to be produced by the display. The four colors can be, for example, blue, green, red and white or yellow, cyan, magenta and white/ black or any other group of four colors. The pixel elements 1016 or light valves associated with each filter element can be selectively actuated to provide any desired color for that pixel group.

A drive circuit that can be used to control the display is illustrated in FIG. 1B and was discussed previously or as described in U.S. Ser. No. 07/815,684, filed on Dec. 31, 1991.

The active matrix circuit panel is formed in or on a layer of essentially single crystal semiconductor material such as silicon. It is noted that any number of fabrication techniques, including those previously described herein, can be employed to provide thin films or layers of single crystal silicon.

Figure 18A:
FIGS. 18A–18C is a preferred process flow sequence illustrating the SIMOX process for fabricating a single crystal silicon layer.
Figure 18B:
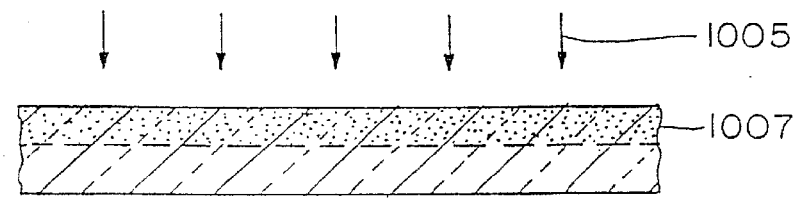
Figure 18C:
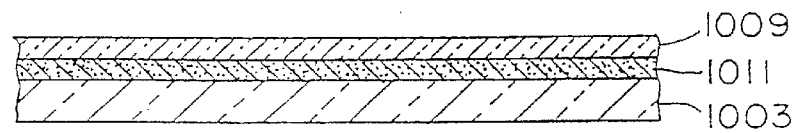

The present invention includes other fabrication techniques which can be employed to provide thin layers of single crystal silicon. In one embodiment, the SIMOX fabrication process shown in FIGS. 18A–18C can be used. A single crystal silicon substrate 1003 shown in FIG. 18A receives an implant of $5*10^{17}/cm^2$ to $2*10^{18}/cm^2$ of oxygen atoms 1007 (FIG. 18B). The implant process can be performed at temperatures exceeding 650 C. Next, the wafer is subjected to a high temperature annealing process 1005 (at about 1300 C) for about six hours. Referring to FIG. 18C, the resulting structure has a buried oxide layer 1011 (thickness of about 4000 angstroms) below a single crystal layer 1009 (thickness of about 2000 angstroms). It is noted that a multiple implant and anneal procedure can be employed to further improve the crystallinity of the silicon layer.

Figure 19:
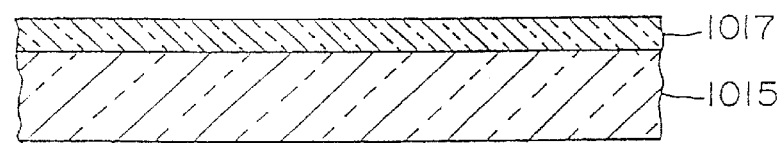
FIG. 19 illustrates the Van der Waals bonding approach for providing a single crystal silicon layer.

In another embodiment, a thin film or layer of single crystal silicon can be secured on a quartz substrate by Van der Waals bonding. Referring to FIG. 19, a silicon thin film 1017 is located on a quartz substrate 1015. The film 1017 is secured to the substrate 1015 by an electrostatic force known as a Van der Waals force, which is an attractive force between two different atoms or nonpolar molecules. The Van der Waals force arises because a fluctuating dipole moment in one molecule-type (either silicon or quartz) induces a dipole moment in the other molecule-type, and the two dipole moments interact.

Figure 20A:
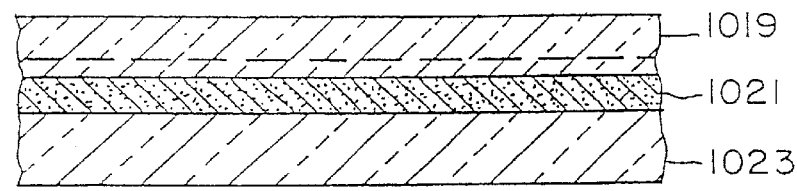
FIGS. 20A–20B is a preferred process flow sequence illustrating the bonded wafer process for forming a single crystal silicon layer.
Figure 20B:
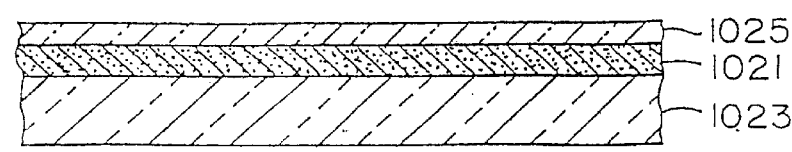

In another embodiment, a bonded wafer approach can be employed to provide a layer of single crystal silicon. Referring to FIG. 20A, an oxide layer 1021 is formed on a single crystal silicon wafer 1023 by known techniques. A second single crystal silicon wafer 1019 is positioned on the oxide layer 1021. The wafer 1019 is then processed to obtain a thin layer of single crystal silicon (dashed lines). Any known processing techniques, such as lapping or etching, can be used to obtain the thin layer of single crystal silicon 1025 (FIG. 20B). Active matrix circuitry can be formed in the single crystal silicon layer 1025.

Figure 21A:
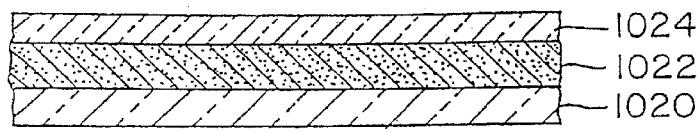
FIGS. 21A–21G is a preferred process flow sequence illustrating the fabrication of a transmissive active matrix color display.

FIGS. 21A–21G illustrate a preferred fabrication process for forming an active matrix color display. Referring to FIG. 21A, an SOI structure includes a substrate 1020 and an oxide 1022 (such as, for example, $SiO_2$) that is grown or deposited on the substrate 1020. A thin single crystal layer 1024 of silicon is formed over the oxide 1022. The oxide (or insulator) is thus buried beneath the Si surface layer. For the case of ISE SOI structures, described previously, the top layer is a substantially single-crystal recrystallized silicon, from which CMOS circuits can be fabricated. The use of a buried insulator provides devices having higher speeds than can be obtained in conventional bulk (Czochralski) material. However, it is noted that any number of techniques can be employed to provide a thin-film of single crystal Si.

Figure 21B:
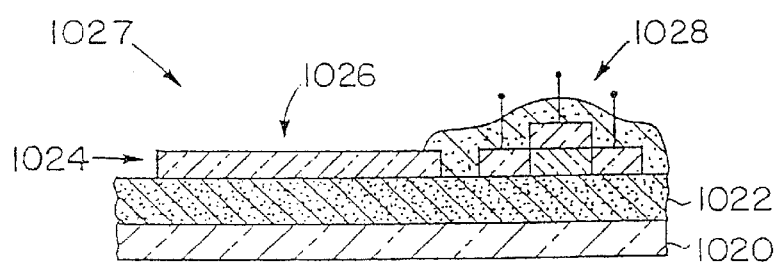
Figure 21C:
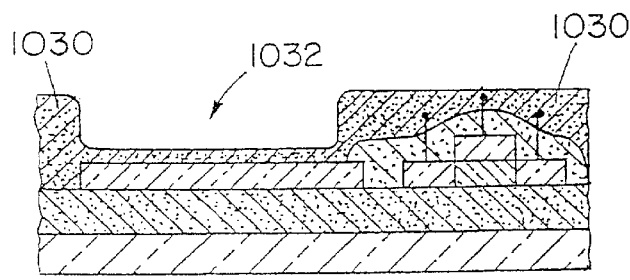

As shown in FIG. 21B, the film 1024 is patterned to define a pixel electrode region 1026 and a transistor region 1028 for each pixel element 1027. In one embodiment, the pixel electrode is formed of single crystal silicon. In another embodiment, the silicon is removed and indium tin oxide (ITO) is applied and patterned to form the pixel electrode. A transistor 1028 is then formed in accordance with any number of fabrication techniques, including those previously described herein. A thin layer of $SiN_2$ (not shown) is then formed over each pixel element. Next, a thin layer 1030 of optically transmissive material, such as $SiO_2$, is also formed over each pixel element 1027 and patterned to provide a well 1032 adjacent to each pixel electrode 1026 (FIG. 21C).

Figure 21D:
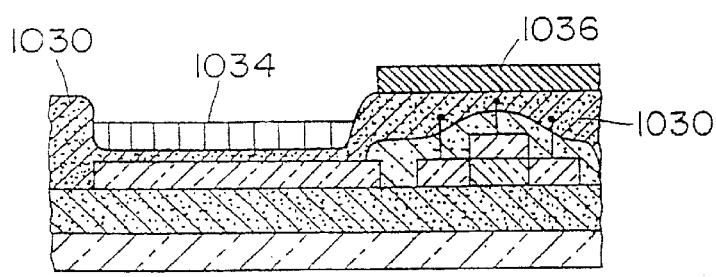

Referring to FIG. 21D, a color filter element 1034 is formed in the well 1032 adjacent to the thin film of essentially single crystal semiconductor material. Each color filter element 1034 is correlated with a pixel element 1027. The color filter elements can be formed by processing an emulsion or a photoresist carrier, as explained below, or by processing conventional filter materials. The individual color filter elements can be processed to provide an arrangement of three or four different color pixel elements in any of the previously described geometries. A matrix of opaque (or black) elements 1036 can also be formed adjacent to the thin film. Each opaque element 1036 is correlated with a pixel element 1027 serves to absorb light. A light shield for reflecting incident light and preventing the incident light from impinging upon the transistor 1028 associated with the pixel element can also be used. Such light shields are described in U.S. Ser. No. 07/823,858 filed on Jan. 22, 1992, which is incorporated herein by reference.

Figure 21E:
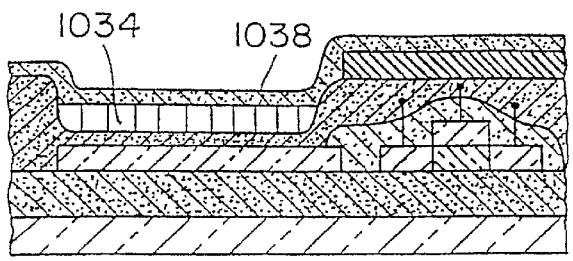
Figure 21F:
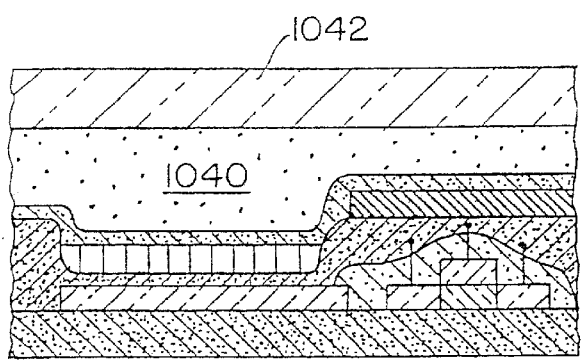

A thin optically transmissive layer 1038, which can be $SiO_2$, polyimide or sputtered glass, is formed over each pixel element (FIG. 21E). Referring to FIG. 21F, the active matrix structure is then transferred to an optically transmissive substrate 1042. To that end, an epoxy 1040 is used to attach an optically transmissive substrate 1042 to the active matrix and the color filter array. However, the optically transmissive layer 1038 isolates the color filter array from the epoxy 1040. The substrate 1020 (and optionally the oxide layer 1022) is removed and the epoxy 1040 is cured by heating the structure at about 160° C. for 24 hours.

Figure 21G:
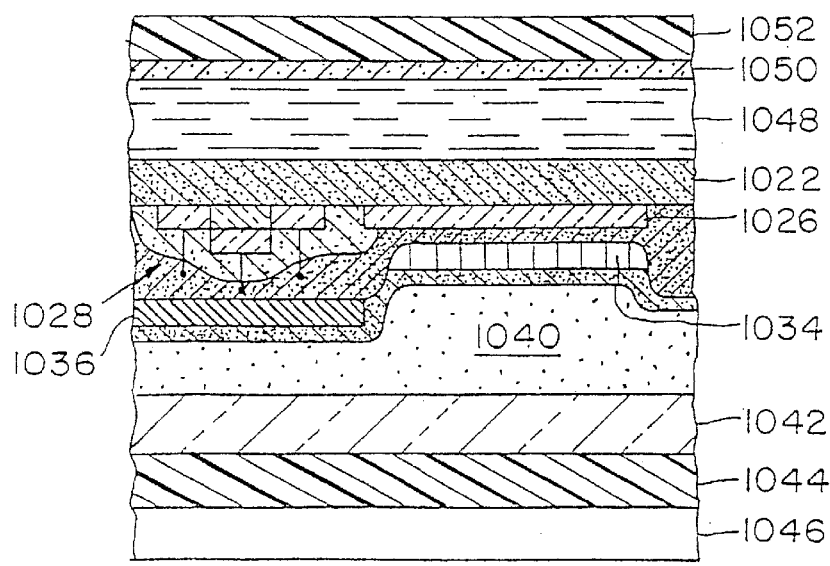

Referring to FIG. 21G, a cross-sectional view of the resulting display device is shown. Each pixel electrode 1028 and counterelectrode 1050 are laterally spaced from each other. Each pixel element 1027 will have a transistor 1028, a pixel electrode 1026 and an adjacent color filter element 1036 associated therewith. Polarizing elements 1052, 1044 are positioned on opposite sides of the structure which also includes the bonding element or adhesive 1040 and the optically transmissive substrate 1042, such as glass or plastic. The structure is completed by positioning a back light source 1046 adjacent to the polarizing element 1044.

Figure 22A:
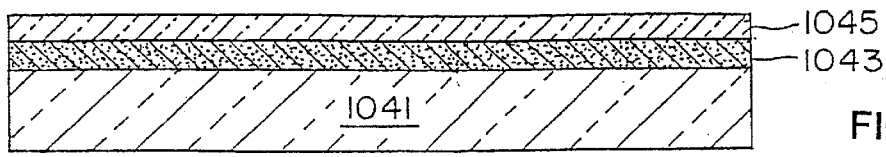
FIGS. 22A–22K is another preferred process flow sequence illustrating the fabrication of a transmissive active matrix color display.

FIGS. 22A–22K illustrate another preferred fabrication process for forming an active matrix color display. Referring to FIG. 22A, an SOI structure includes a silicon substrate 1041 and an insulating oxide layer 1043 (such as, for example, one micron of $SiO_2$) that is grown or deposited on the substrate 1041. A thin (i.e. 300 nm) single crystal layer 1045 of silicon is formed over the oxide 1043. The oxide is thus buried beneath the silicon surface layer, such that higher speed devices can be fabricated as explained previously. However, it is noted that any number of techniques can be employed to provide a thin film of single crystal silicon.

Figure 22B:
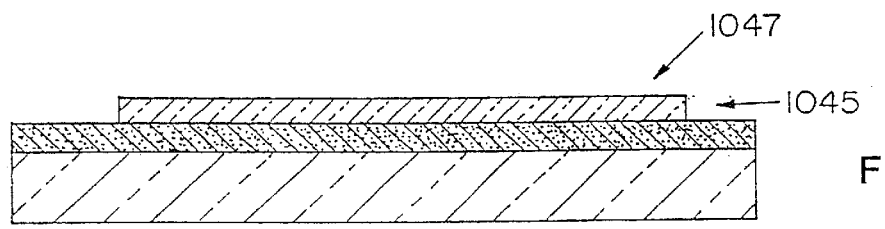
Figure 22C:
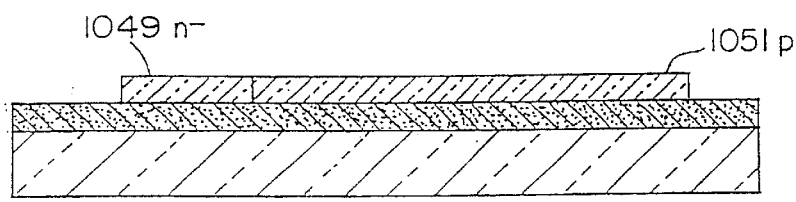

As shown in FIG. 22B, the film 1045 is patterned into islands to define each pixel element 1047. As explained below, the pixel elements are then processed to form a transistor and an electrode for each pixel. To that end, the pixel elements are masked (not shown) and subjected to deep and shallow implants to form an n-well region 1049 (FIG. 22C). Another masked is formed over the pixel elements, and the elements are subjected to deep and shallow implants to form an p-well region 1051.

Figure 22D:
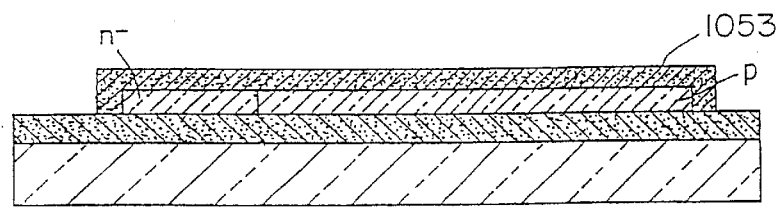
Figure 22E:
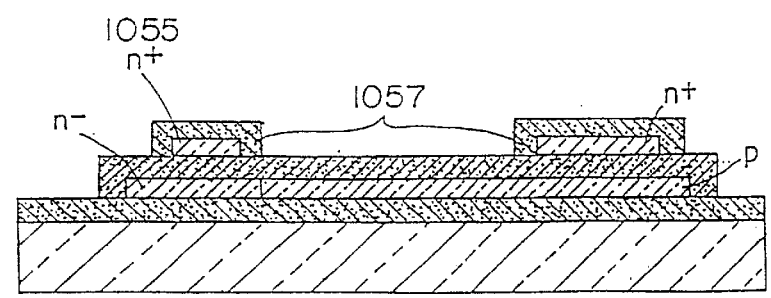

Referring to FIG. 22D, an $SiO_2$ layer 1053 having a thickness on the order of 70 nm is formed over each silicon island 1047. A layer of polysilicon having a thickness of about 500 nm is formed on the oxide layer 1053, doped to provide an n+ region and patterned to form a transistor gate 1055 (FIG. 22E). Another oxide layer 1057 having a thickness of about 70 nm is formed over the polysilicon.

Figure 22F:
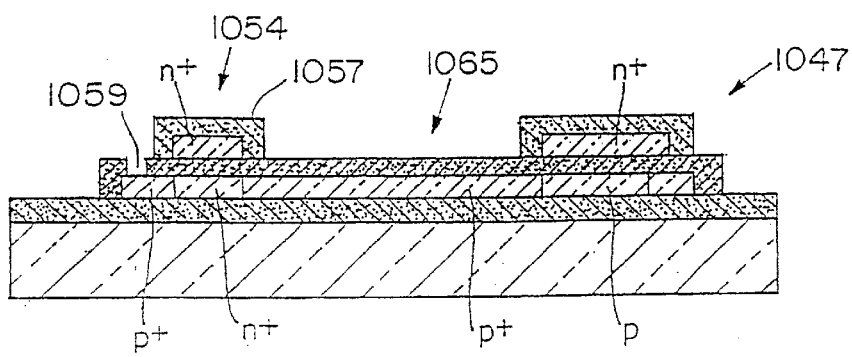

The pixel elements 1047 are masked (not shown) and doped with $2*10^{15}$ of phosphorus to provide an n+ source/drain implantation (FIG. 22F). After the mask is removed, the pixel elements are again masked and doped with $4*10^{15}$ of boron to provide a p+ source/drain implantation. As such, a transistor 1054 and a pixel electrode 1065 have been formed for each pixel element 1047.

Figure 22G:
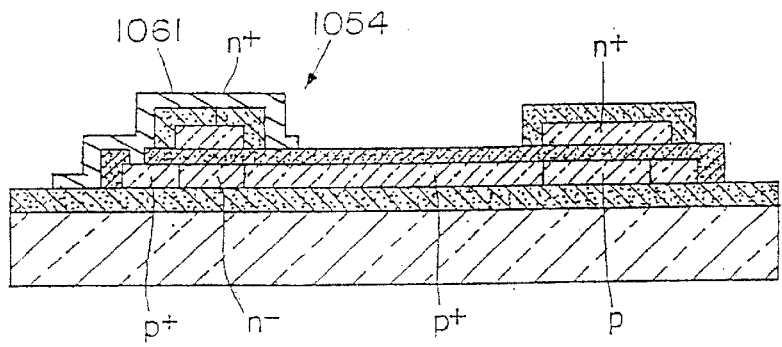

A portion 1059 of the oxide layer is then removed to form a contact for the transistor 1054. Referring to FIG. 22G, a metallization deposition is then performed to form a layer 1061 over the transistor 1054. The layer can comprise aluminum and has a thickness of about one micron. The layer 1061 serves as a pixel light shield as well as a contact for the transistor 1054.

Figure 22H:
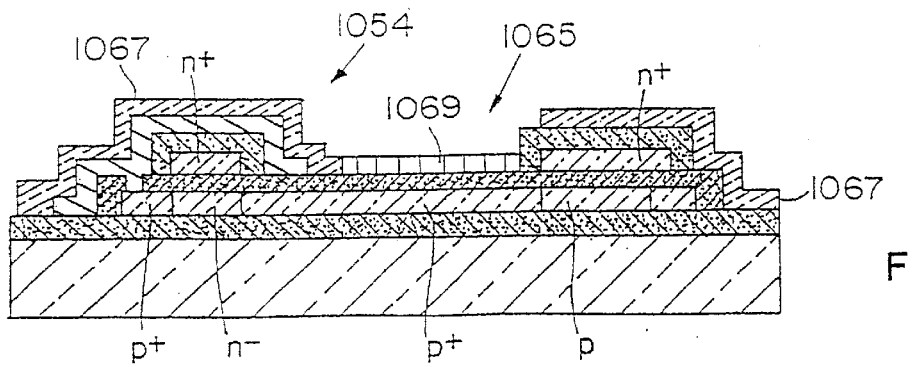

Referring to FIG. 22H, the entire pixel can be coated with a thin (about 150 nm) layer of silicon nitride (not shown). Next, a layer of amorphous silicon having a thickness of about 500 nm is deposited over each pixel element. The layer is then patterned to provide a matrix of black elements 1067, each black element associated with a transistor. A color filter element 1069 is formed over the pixel electrode 1065. The color filter elements can be formed by processing an emulsion or a photoresist carrier, as explained below, or by processing conventional filter materials. The individual color filter elements can be processed to provide an arrangement of three or four different color pixel elements in any of the previously described geometries.

Figure 22I:
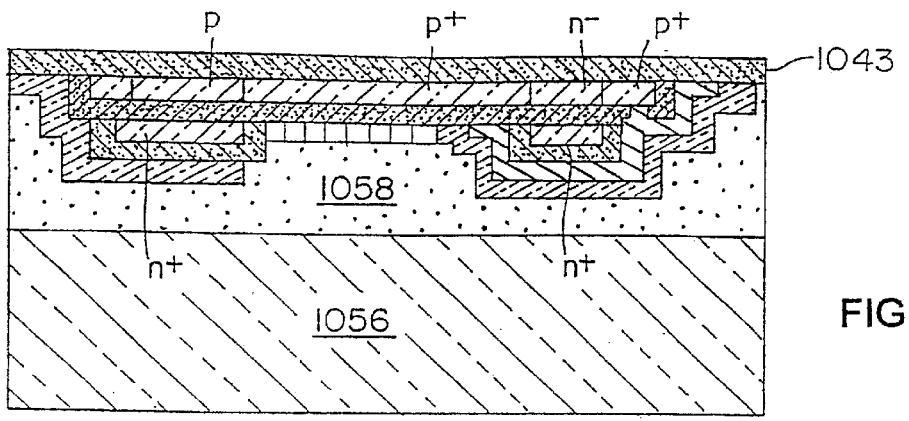

Referring to FIG. 22I, the active matrix structure is then transferred to an optically transmissive substrate 1056 such as glass or plastic. To accomplish this, an epoxy adhesive 1058 is used to attach an optically transmissive substrate 1056 to the active matrix structure. A thin optically transmissive layer (not shown), which can be $SiO_2$, polyimide or sputtered glass, can be formed over each pixel element (not shown) to isolate the color filter array from the epoxy 1058. The substrate 1041 (and optionally the oxide layer 1043) is removed and the epoxy 1058 is cured by heating the structure at about 160° C. for 24 hours.

Figure 22J:
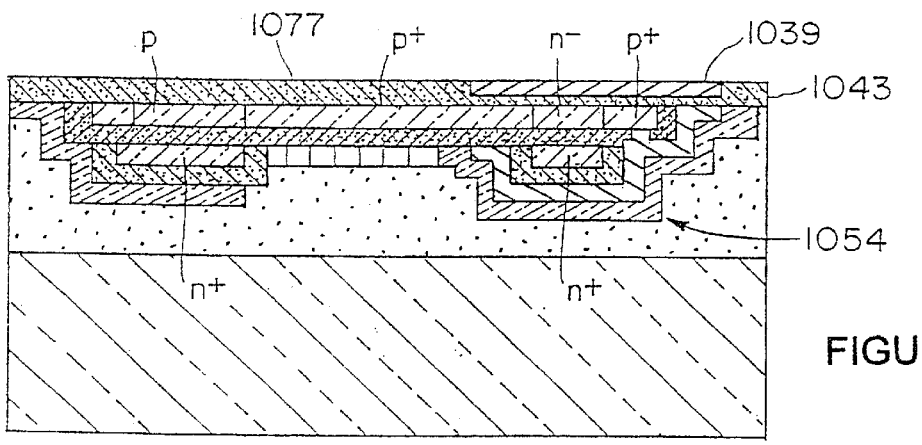

A second light shield 1039 is formed in or on the oxide layer 1043 as shown in FIG. 22J. In one embodiment, a metallization layer is formed on the oxide layer 1043 and patterned to form a light shield adjacent each transistor 1054. In another embodiment, the oxide layer 1043 is thinned adjacent to each transistor 1054. A light shield 1039 is formed in the thinned regions such that a substantially planar surface 1077 is provided adjacent to the liquid crystal material 1079 (FIG. 22K).

Figure 22K:
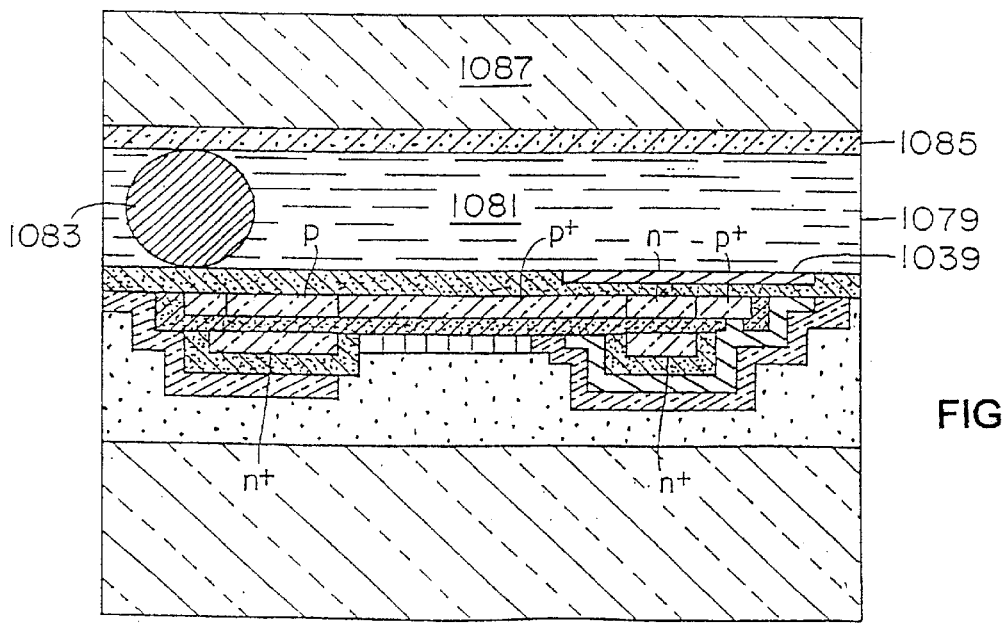

Referring to FIG. 22K, a liquid crystal material 1079 is disposed in a cavity 1081 along with spacers 1083. An ITO layer 1085, which serves as the counterelectrode, is formed adjacent to the cavity 1081. An optically transmissive layer 1087, such as glass or plastic, is positioned over the ITO layer.

Figure 23:
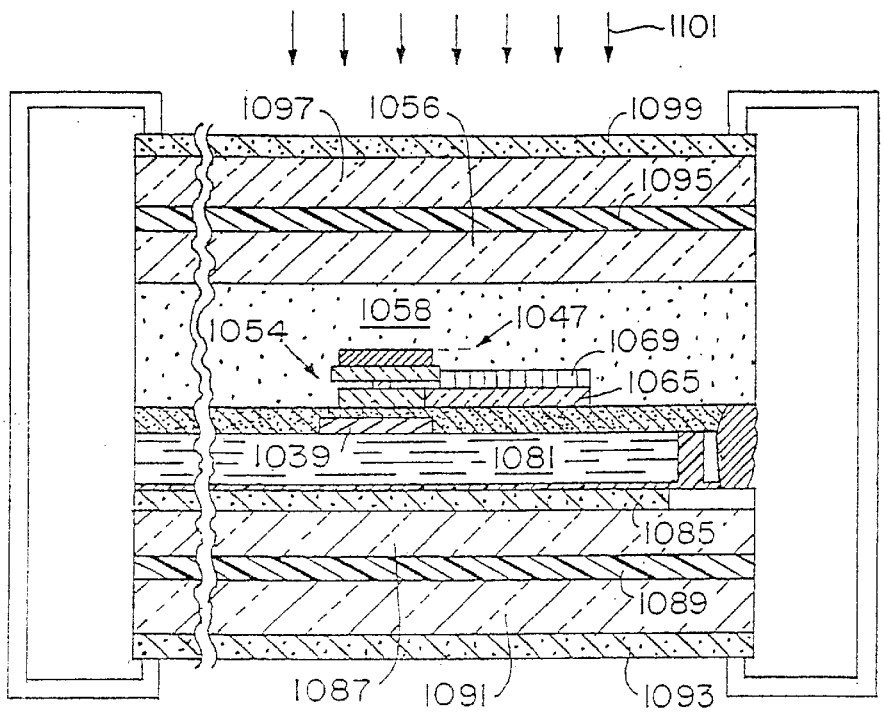
FIG. 23 is a cross-sectional view of the active matrix color display structure fabricated in accordance with FIGS. 22A–22K.

A partial cross-sectional view of the resulting active matrix color display device is shown in FIG. 23. Each pixel electrode 1065 is laterally spaced from the counterelectrode 1085. Each pixel element 1047 will have a transistor 1054, a pixel electrode 1065 and an adjacent color filter element 1069 associated therewith. Polarizing elements 1089, 1095 are positioned on opposite sides of the structure. The display also includes the bonding element or adhesive 1058, the optically transmissive substrate 1056, optically transmissive layers (1087, 1091, 1097) and ITO layers (1093, 1099). The structure is completed by positioning a light source for providing light 1101 adjacent to the ITO layer 1099.

In accordance with the present invention, an array of the color filter elements is formed adjacent to the array of pixel elements prior to transfer and subsequently transferred with the thin film and further processed to form an active matrix transmission display. In one preferred embodiment, a filter fabrication process using negative photoresist materials is employed to form an array of color filter elements.

FIGS. 24A–24H are sectional views illustrating the steps of forming an array of color filter elements in accordance with the this fabrication process.

Figure 24A:
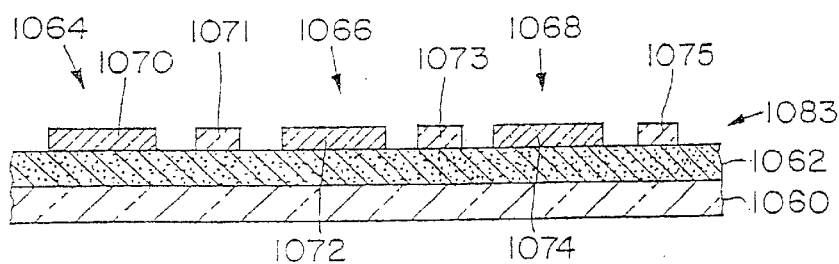
FIGS. 24A–24H is a process flow sequence using negative photoresist materials for fabrication of an array of color filter elements.
Figure 24B:
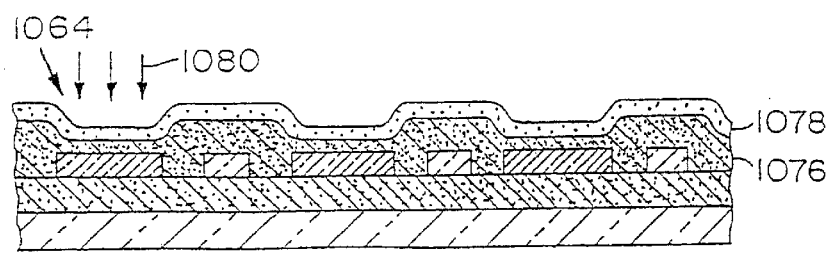

Referring to FIG. 24A, an SOI structure includes a substrate 1060 and an oxide 1062 (such as, for example, $SiO_2$) that is grown or deposited on the substrate 1060. A thin single crystal layer 1054 of silicon is formed over the oxide 1062. The film 1063 is patterned into an array of pixel elements 1064, 1066, 1068. Each pixel element includes a pixel electrode region 1070, 1072, 1074 and a transistor region 1071, 1073, 1075 respectively for each pixel element.

Figure 24C:
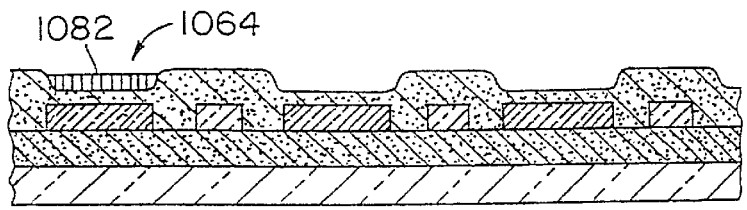

To form a first color filter on each of a first pixel element 1064, a pigment is dispersed in a negative resist material and applied as a film 1078 across an isolation layer 1076 (such as, for example, $SiO_2$) as shown in FIG. 249. Such colored negative photoresist materials are commercially available. A portion of the film 1078 is exposed to a light 1080. The remainder of the film is masked (not shown) such that it is not exposed to the light 1080. The exposed portion of the film is developed in the presence of the light to form a first color filter element. The undeveloped portion of the film is removed, leaving a pattern of first color filter elements 1082 adjacent to each pixel 1064 (FIG. 24C).

Figure 24D:
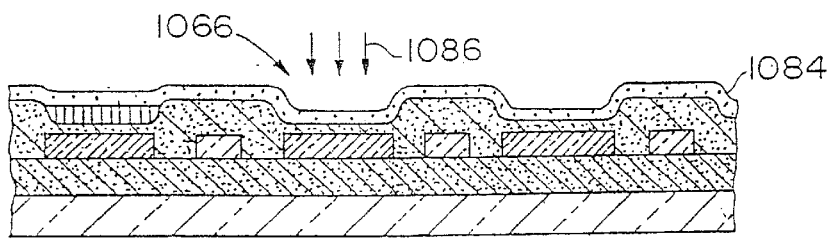
Figure 24E:
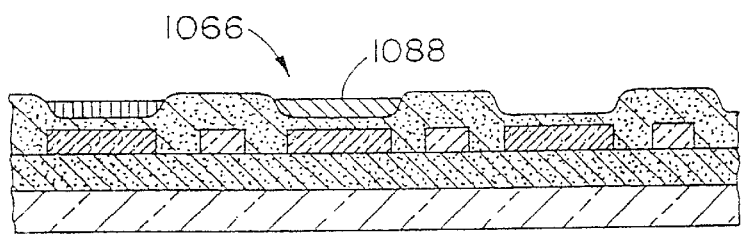

A second color filter element is formed in a similar manner as the first color filter elements 1082. Referring to FIG. 24D, a pigment is dispersed in a negative resist material and applied as a film 1084 across the isolation layer 1076 and the elements 1082. A portion of the film 1084 is exposed to a light 1086, while the remainder of the film is masked (not shown). The exposed portion of the film is developed in the presence of the light to form a second color filter element. The undeveloped portion of the film 1084 is removed, leaving a pattern of second color filter elements 1088 adjacent to each pixel 1066 (FIG. 24E).

Figure 24F:
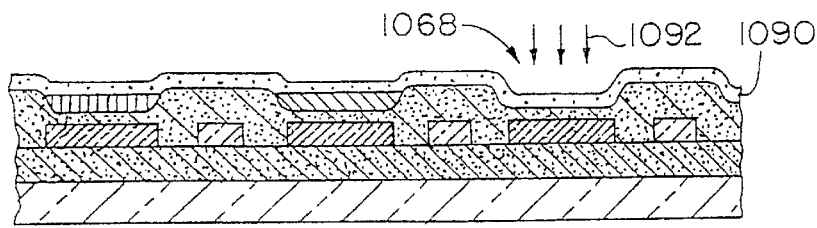
Figure 24G:
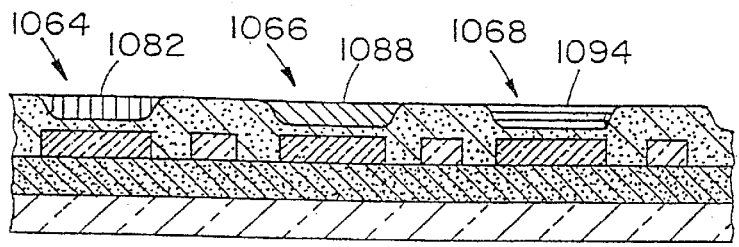
Figure 24H:
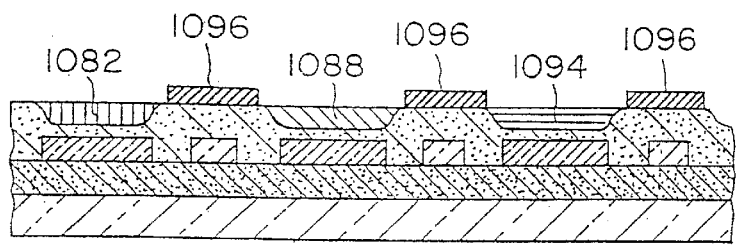

A third color filter element is formed in a similar manner as the first and second color filter elements 1082, 1088. Referring to FIG. 24F, a pigment is dispersed in a negative resist material and applied as a film 1090 across the isolation layer 1076 and the elements 1082, 1088. A portion of the film 1090 is exposed to a light 1092, while the remainder of the film is masked (not shown). The exposed portion of the film 1090 is developed in the presence of the light, and the undeveloped portion of the film 1084 is removed, leaving a pattern of third color filter elements 1094 adjacent to each pixel 1068 (FIG. 24G). Optionally, a matrix array of opaque (or black) elements 1096 can be formed over or adjacent the transistor region of each pixel element 1064, 1066, 1068 as well as over the interprise spaces. Each opaque element 1096 serves to absorb light and provide a uniform background.

Figure 25A:
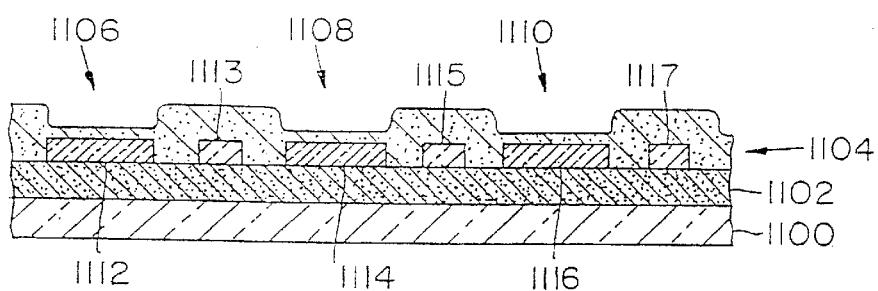
FIGS. 25A–25J is a preferred process flow sequence illustrating in cross-sectional views a photographic development process for fabricating an array of color filter elements.

In other preferred embodiments, a color filter array is formed adjacent to the active matrix circuitry by applying a color photographic development process for each color. FIGS. 25A–25I illustrate in cross-sectional views a photographic development process which uses color-coupler containing developers. Referring to FIG. 25A, an SOI structure includes a substrate 1100 and an oxide 1102 (such as, for example, $SiO_2$) that is grown or deposited on the substrate. A thin single crystal layer 1104 of silicon is formed over the oxide 1102. The film 1104 is patterned into an array of pixel elements 1106, 1108, 1110. Each pixel element includes a pixel electrode region 1112, 1114, 1116 and a transistor region 1113, 1115, 1117 respectively for each pixel element.

Figure 25B:
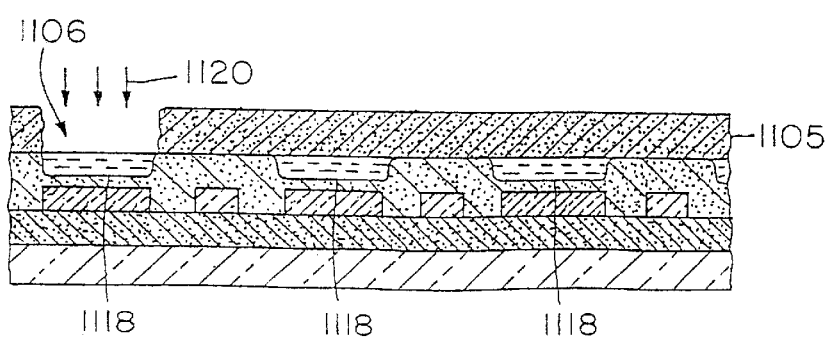
Figure 25C:
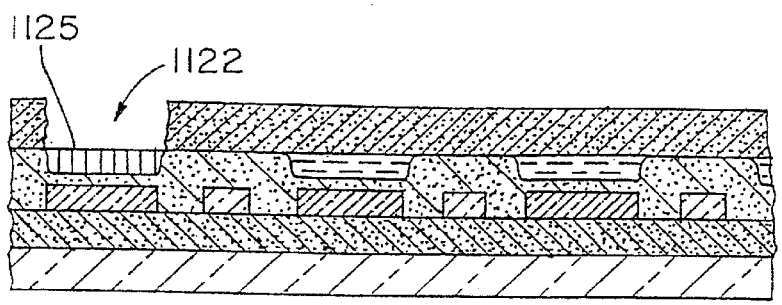
Figure 25D:
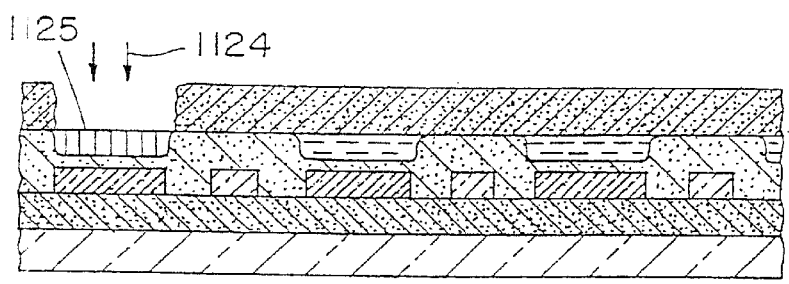

Referring to FIG. 25B, a black and white silver halide emulsion layer 1118 is formed adjacent to each pixel electrode of the active matrix. The formation of color filter elements utilizing a silver halide emulsion can be reviewed in greater detail in U.S. Pat. No. 4,400,454. An isolation layer 1105, such as $SiO_2$, is formed over the active matrix and patterned to expose the portion of the emulsion layer adjacent each first pixel 1106. This portion of the emulsion layer is exposed to light 1120 to provide silver particles. A first developer 1122 containing a color coupler is added to each exposed region 1125 of the emulsion layer (FIG. 25C). As such, a dye of a first color is then formed in each region 1125. Next, the silver is removed by bleaching or rehalogenating 1124 for each region 1125 as shown in FIG. 25D.

Figure 25E:
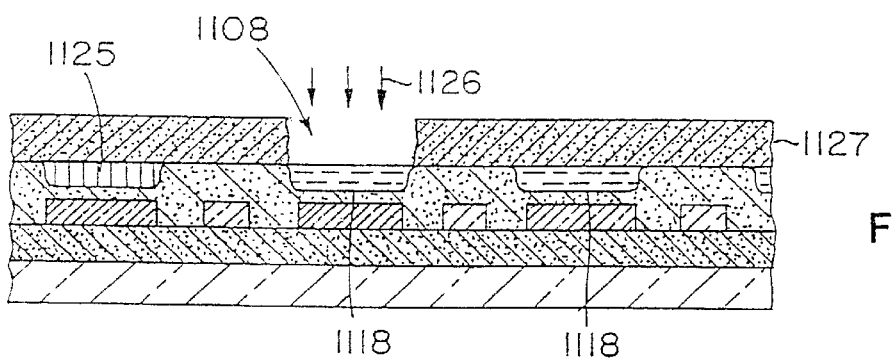
Figure 25F:
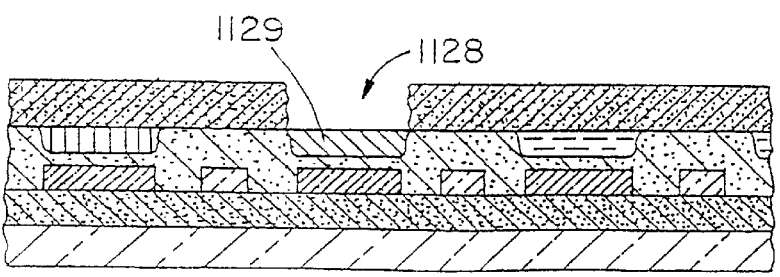
Figure 25G:
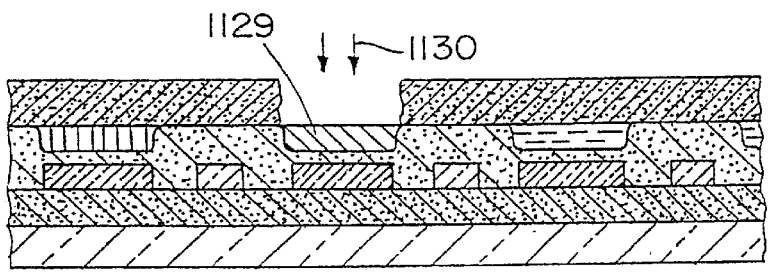

Referring to FIG. 25E, portions of the unexposed silver halide emulsion layer 1118 adjacent to each pixel 1108 are then exposed to light 1126 through a patterned isolation layer 1127 formed over the active matrix. A second developer 1128 containing a color coupler is added to each exposed region 1129 of the emulsion layer to form a dye of a second color in each region 1129 (FIG. 25F). Next, the silver is removed by bleaching or rehalogenating 1130 for each region 1129 as shown in FIG. 25G.

Figure 25H:
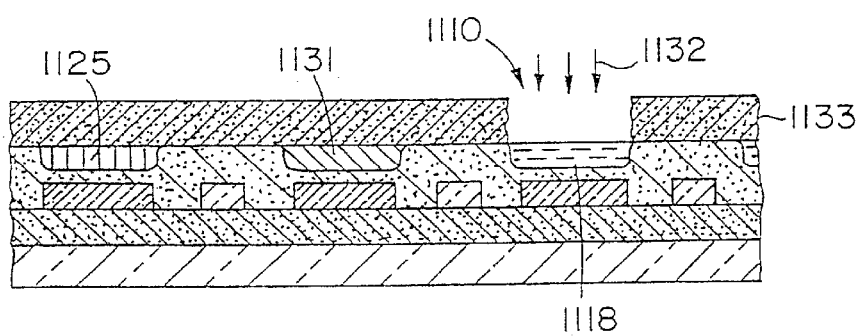
Figure 25I:
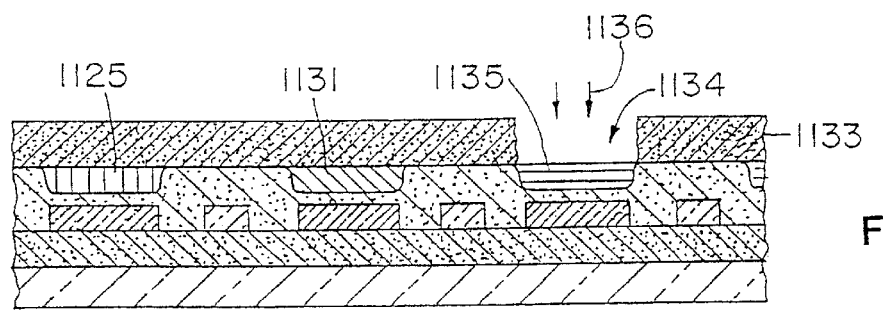
Figure 25J:
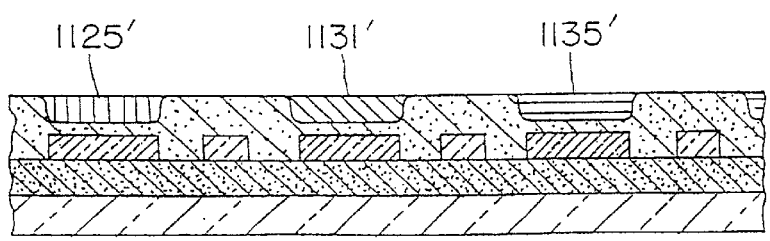

The remaining portions of the unexposed silver halide emulsion layer 1118 adjacent to pixels 1110 are then exposed to light 1132 through a patterned isolation layer 1133 (FIG. 25H). A third developer 1134 containing a color coupler is added to each exposed region 1135 of the emulsion layer to form a dye of a third color in each region 1135 (FIG. 25I). Next, the silver is removed by bleaching or rehalogenating 1130 for each region 1135. The layer 1133 is removed and any silver halide remaining in the emulsion layer is removed by fixing. As shown in FIG. 25J, an array of color filter elements 1125', 1131', 1135' are thus formed adjacent to each pixel.

Alternatively, a color filter array can be formed by applying a color photographic development process which uses developers containing dye developers. To accomplish this, the above-described process is performed using developers containing dye developers instead of developers containing color couplers. After processing such as that described in FIGS. 21–23, the thin film with the formed color filter elements can than be transferred, if necessary, for further processing prior to final display fabrication.

Figure 26A:
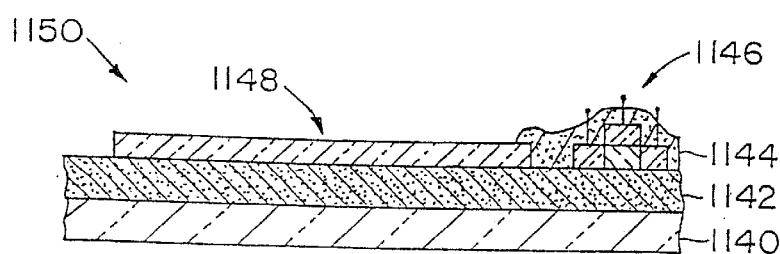
FIGS. 26A–26D is another preferred process flow sequence illustrating the fabrication of a transmissive active matrix color display.

FIGS. 26A–26D illustrate another preferred fabrication process for forming an active matrix color display. Referring to FIG. 26A, an SOI structure includes a substrate 1140 and an oxide 1142 (such as, for example, $SiO_2$) that is grown or deposited on the substrate 1140. A thin single crystal layer 1144 of silicon is formed over the oxide 1140 using any of the aforementioned fabrication techniques. For the case of ISE SOI structures, which were described previously, the top layer is a essentially single-crystal recrystallized silicon, from which CMOS circuits can be fabricated. The silicon thin film 1144 is patterned to define an array of pixel elements 1150. Each pixel element includes a pixel electrode region 1148 and a transistor 1146, formed in accordance with any number of fabrication techniques, including those previously described herein.

Figure 26B:
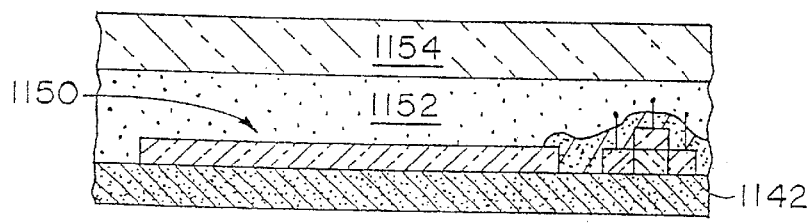

Referring to FIG. 26B, the active matrix structure is then transferred to an optically transmissive substrate 1154. To that end, an epoxy 1152 is used to attach an optically transmissive substrate 1154 to the active matrix. The substrate 1140 (and optionally the oxide layer 1142) is removed, and the epoxy 1152 is cured by heating the structure at about 160° C. for 24 hours.

Figure 26C:
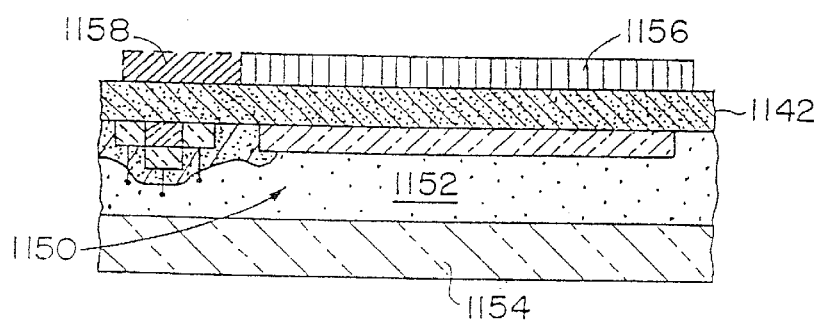

An array of color filter elements 1156 is formed on the oxide layer 1142 adjacent to planar surface of the thin film 1144 (FIG. 26C). Each color filter element 1156 is correlated with a pixel element 1150. The color filter elements 1156 are formed by processing, in accordance with the aforementioned processing techniques, an emulsion or photoresist carrier. The individual color filter elements can be processed to provide a display having a triad pixel arrangement of three primary (or non-primary) color filter elements. Alternatively, the color filter elements can be arranged into groups of four pixel elements. As noted previously, a primary color is defined herein to correspond to one of a group of colors which can be used to provide a spectrum of colors. An opaque (or black) element 1158 can also be formed adjacent to the thin film. Each opaque element 1158 is correlated with a pixel element 1150 and serves to prevent incident light from impinging upon the transistor 1146 associated with the pixel element.

Figure 26D:
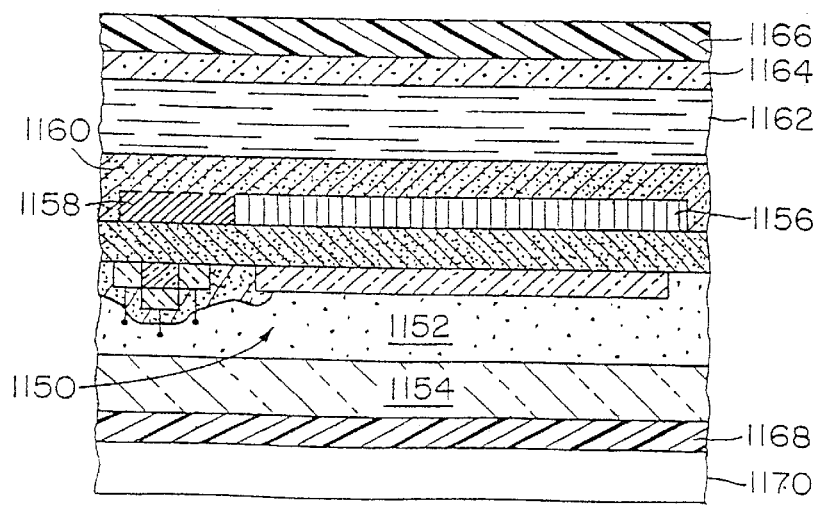

A cross-sectional view of the resulting active matrix display is shown in FIG. 26D. A liquid crystal material 1162 is positioned in close proximity to the pixel elements 1150. An insulating layer 1160, which can be $SiO_2$, polyimide or sputtered glass, is formed over each pixel element for passivating the pixel elements from the liquid crystal material 1162. A counterelectrode 1164 is laterally spaced from the pixel electrodes 1148. Each pixel element 1150 has a transistor 1146, a pixel electrode 1148 and an adjacent color filter element 1156 associated therewith. Polarizing elements 1164, 1168 are positioned on opposite sides of the structure. The structure is completed by positioning a back light source 1170 adjacent to the polarizing element 1168.

Figure 27:
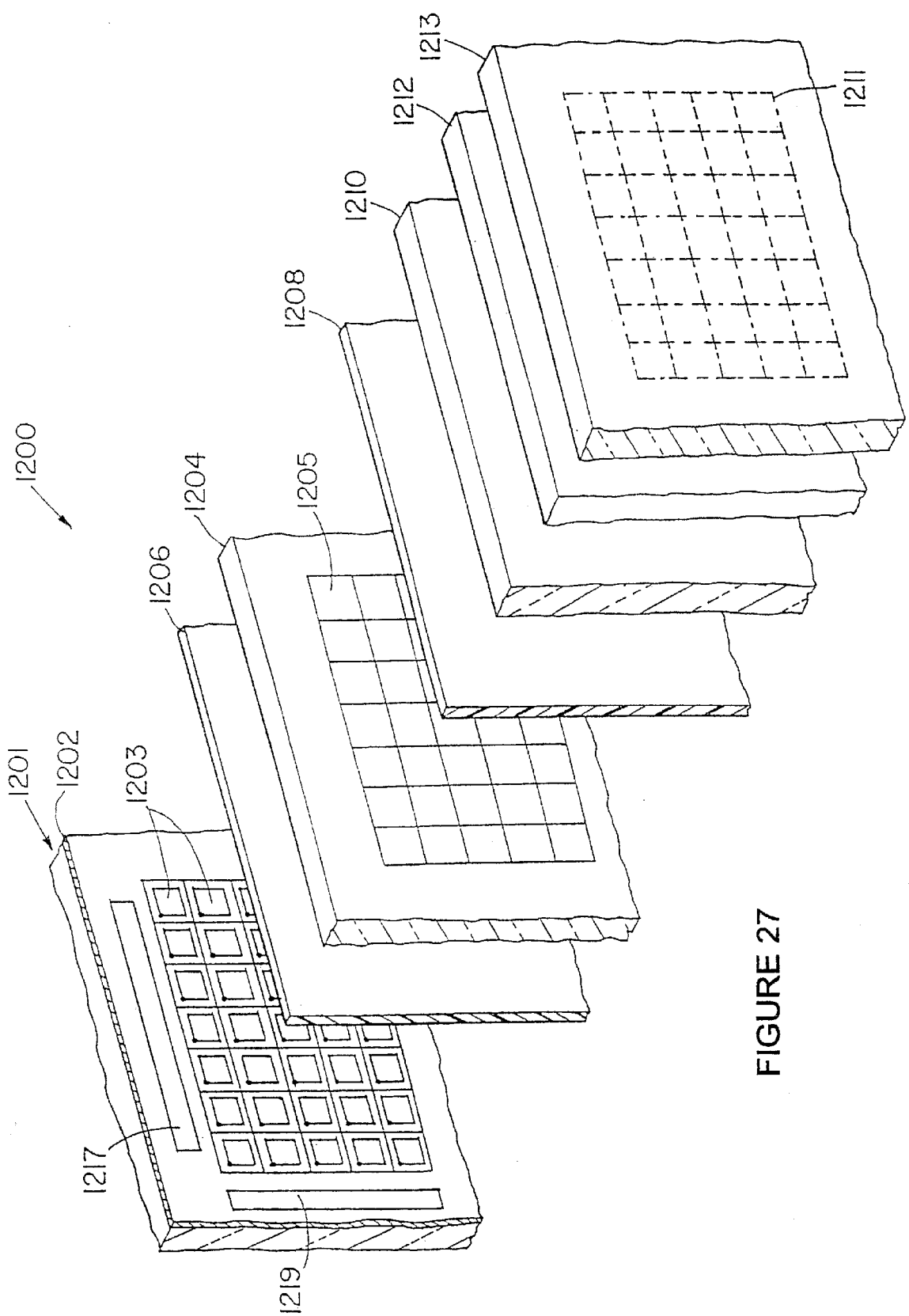
FIG. 27 is an explode perspective view of an electroluminescent color display in accordance with the present invention.

Other preferred embodiments employ an emissive material (an electroluminescent film, light emitting diodes, porous silicon or any other light emitting material) in combination with a color filter array to form an emissive active matrix color display. To that end, an electroluminescent (EL) color display is shown in FIG. 27. The EL display 1200 is a layered structure which includes an active matrix circuit panel 1201, a bottom insulator 1206, an EL structure 1204, a top insulator 1208, an optically transmissive electrode 1210, a color filter array 1212 and an optically transparent superstrate 1213.

The EL structure is positioned between the two insulating layers 1206, 1208 for preventing destructive electrical breakdown by capacitively limiting direct current flow through the EL structure and for enhancing reliability. The insulators have a high electrical breakdown so that they can remain useful at high fields which are required to create hot electrons in the EL phosphor layers. The capacitive structure is completed by a pair of electrodes. One of these electrodes is pixel electrodes formed on the active matrix 1201 and the other electrode is the optically transmissive electrode 1210.

The EL structure 1204 is formed of a single phosphor layer which produces a white (or other multi-line spectrum) light in the presence of an applied field. The layer is patterned to provide an array of individual phosphor elements 1205. Each EL element 1205 is associated with a pixel element 1203. The color filter array 1212 is located in close proximity to the EL structure 1204 such that each color filter element 1211 is associated with an EL element 1205 and a pixel element 1203. The individual elements 1211 of color filter array can be arranged in a triad arrangement of three primary (or non-primary) color filter elements such as red, green and blue or yellow, cyan and magenta. Alternatively, the color filter elements can be arranged into groups of four different color filter elements such as red, green, blue and white or yellow, cyan, magenta and black/white.

The pixel elements 1203 of the active matrix 1201 are individually actuated by a CMOS/DMOS drive circuit, described previously herein or in a related application previously incorporated by reference, having first 1217 and second 1219 circuit components that are positioned adjacent the pixel array such that each pixel element can produce an electric field in an associated element 1205 of the EL structure 1204 between the pixel electrode and the transparent electrode 1210. The electric field causes the EL element 1205 to emit white light or other multi-line spectrum light. The light passes through the associated color filter element 1211 to produce a colored light which is illuminated from the display through the optically transmissive electrode 1210.

The active matrix pixel array employs transistors (TFTs) colocated with each pixel in the display to control the function of the pixel. As applied to EL displays, the active matrix approach offers significant advantages including reduced power dissipation in the circuit panel and increased frequency in which the AC resonant driver can operate. The formation of a useful EL active matrix requires TFTs that can operate at high voltages and high speeds. Single crystal silicon is preferred for achieving high resolution in a small (6 in×6 in or less) active matrix EL display.

In an EL display, one or more pixels are energized by alternating current (AC) which is provided to each pixel by row and column interconnects connected to the drive circuitry. The efficient conduction of AC by the interconnects is limited by parasitic capacitance. The use of an active matrix, however, provides a large reduction of the interconnect capacitance and can enable the use of high frequency AC to obtain more efficient electroluminescence in the pixel phosphor and increased brightness. In accordance with the present invention, the TFTs that provide this advantage are formed in a single crystal wafer, such as bulk Si wafers, or thin films or layers of single crystal or essentially single crystal silicon in accordance with the previously described fabrication techniques. These high quality TFTs are employed in an EL panel display, providing high speed and low leakage as well as supporting the high voltage levels needed for electroluminescence.

In preferred embodiments, single crystal silicon formed on an insulator (SOI) is processed to permit the formation of high voltage circuitry necessary to drive the EL display. More specifically, thin film single crystal silicon formed by the ISE process, or any of the other fabrication processes described herein, allows for fabrication of high voltage DMOS circuitry for the TFTs as well as low voltage CMOS circuitry for the drivers and other logic elements.

Figure 28A:
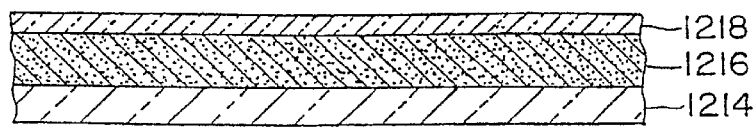
FIGS. 28A–28E is a preferred process flow sequence illustrating the fabrication of an electroluminescent active matrix color display.

A preferred fabrication sequence for the formation of an EL color display is shown in FIGS. 28A–28E. Referring to FIG. 28A, an SOI structure includes a substrate 1214 and an oxide 1216 (such as, for example, $SiO_2$) that is grown or deposited on the substrate 1214. A thin single crystal layer 1218 of silicon is formed over the oxide 1214. For the case of ISE SOI structures, the top layer is a substantially single-crystal recrystallized silicon, from which CMOS and DMOS circuits can be fabricated. The use of a buried insulator provides devices having better isolation than can be obtained in conventional bulk (Czochralski) material. However, it is noted that any number of techniques can be employed to provide a thin-film of single crystal silicon for an EL color display.

Figure 28B:
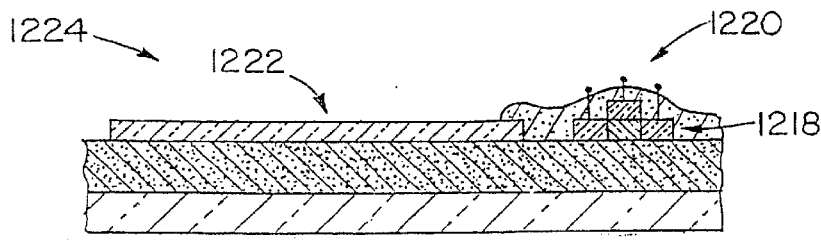
Figure 28C:
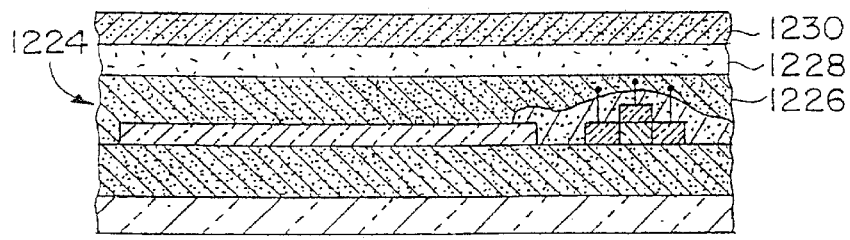

As shown in FIG. 28B, the film 1218 is patterned to define a pixel electrode region and a transistor region for each pixel element 1224. In one embodiment, the pixel electrode 1222 is formed of single crystal silicon. In another embodiment, the silicon is removed and ITO is applied and patterned to form the pixel electrode 1222. A transistor 1218 is then formed in accordance with any number of fabrication techniques, including those previously described herein. Next, the EL structure is formed (FIG. 28C). To that end, a thin layer 1226 of insulating material is deposited and patterned over each pixel element 1224. A white phosphor layer 1228 is deposited and patterned over the bottom insulator 1226, and a top insulator 1230 is deposited and patterned over the phosphor material.

Figure 28D:
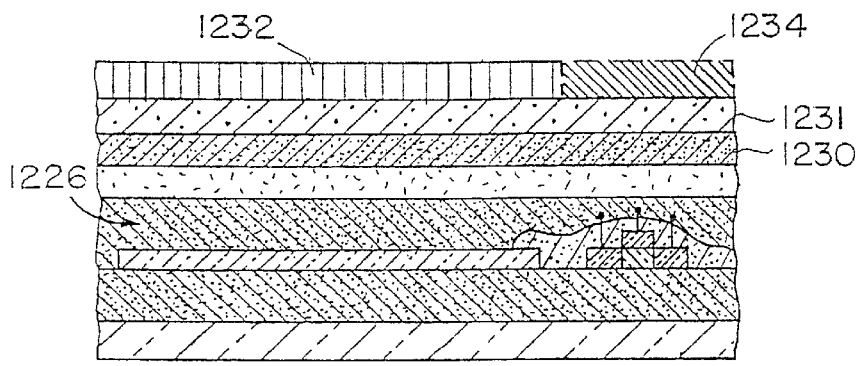
Figure 28E:
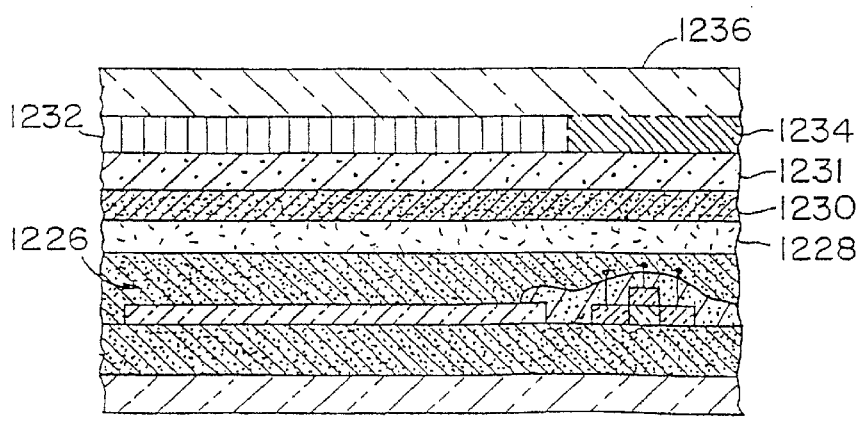

Referring to FIG. 28D, a top electrode 1231 is formed on the EL structure. Next, a color filter element 1232 is formed. Each color filter element 1232 is correlated with a phosphor element 1228 and a pixel element 1224 such that each pixel is capable of producing light of a primary color. As explained previously, the color filter elements are formed by processing an emulsion or a photoresist carrier. The individual color filter elements 1232 can be processed to provide a triad arrangement of primary color pixels such as blue, green and red or yellow, cyan and magenta. In another embodiment, the color filter elements can be processed to provide a triad (or quad) arrangement of non-primary color pixels. In yet another embodiment, the color filter elements can be arranged into groups of four pixel elements. An opaque element 1234 can also be formed adjacent to the EL material. Each opaque element 1234 is correlated with a pixel element 1224 and absorbs light for preventing incident light from impinging upon the transistor 1220 associated with the pixel element. A optically transmissive superstrate 1236 such as glass or plastic is formed over the EL structure to complete the EL color display (FIG. 28E).

Figure 29A:
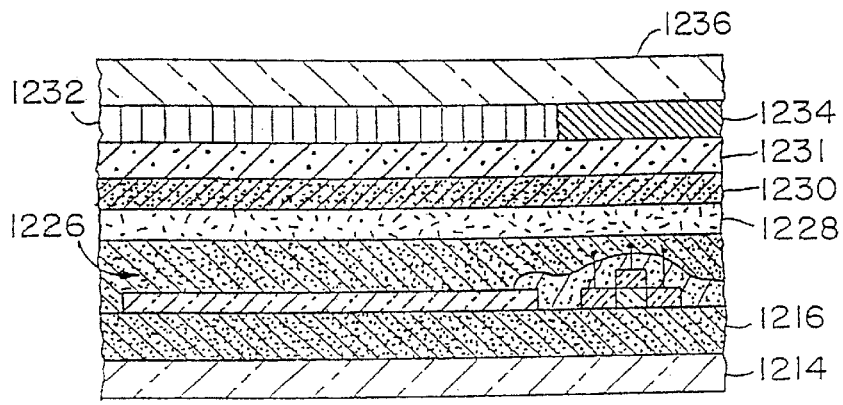
FIGS. 29A–29C is a preferred process flow sequence illustrating the transfer of an electroluminescent active matrix color display to an optically transmissive substrate.
Figure 29B:
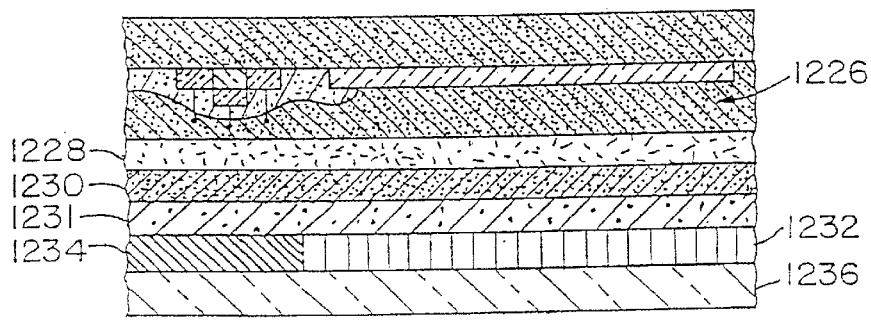
Figure 29C:
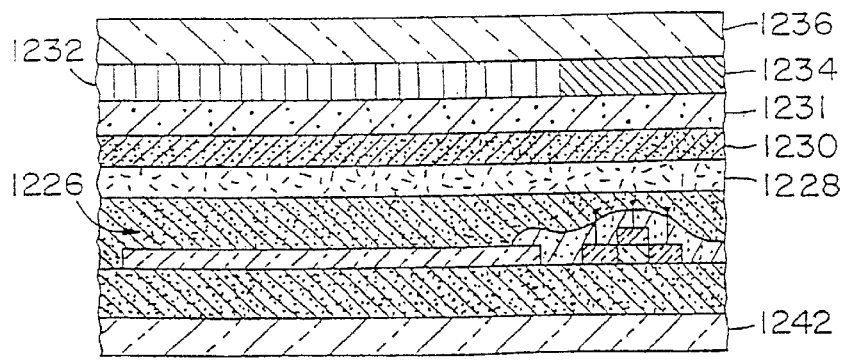
Figure 30:
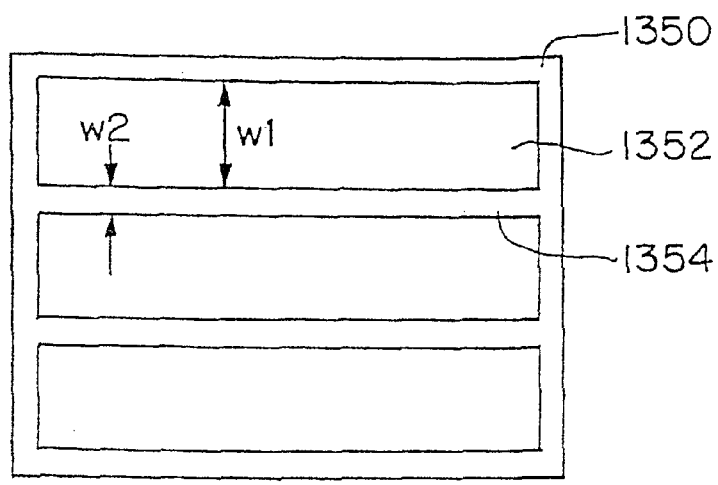
FIG. 30 is an illustration of a patterned pixel electrode element.

In another embodiment, the EL color display can be transferred to an optically transmissive substrate as illustrated in FIGS. 29A–29C. An EL display fabricated in accordance with any of the previously described methods is shown in FIG. 29A.

The structure is inverted and the initial substrate 1214 is removed (FIG. 29B). The structure is then transferred to an optically transmissive substrate 1242, such as glass or a curved surface of a visor, and the superstrate 1236 is optionally removed.

Another feature of the active matrix displays of the present invention is that an array of pixel electrode elements can be patterned in the single crystal silicon material. In one preferred embodiment, the individual pixel electrode elements are solid shaped elements formed of single crystal silicon or indium tin oxide (ITO). In another embodiment, the pixel electrodes can be selectively thinned to optimize transistor performance. Regions of the electrode can be thinned to about one-tenth the thickness of the 0.1 to 2.0 micron single crystal silicon layer.

Figure 50:
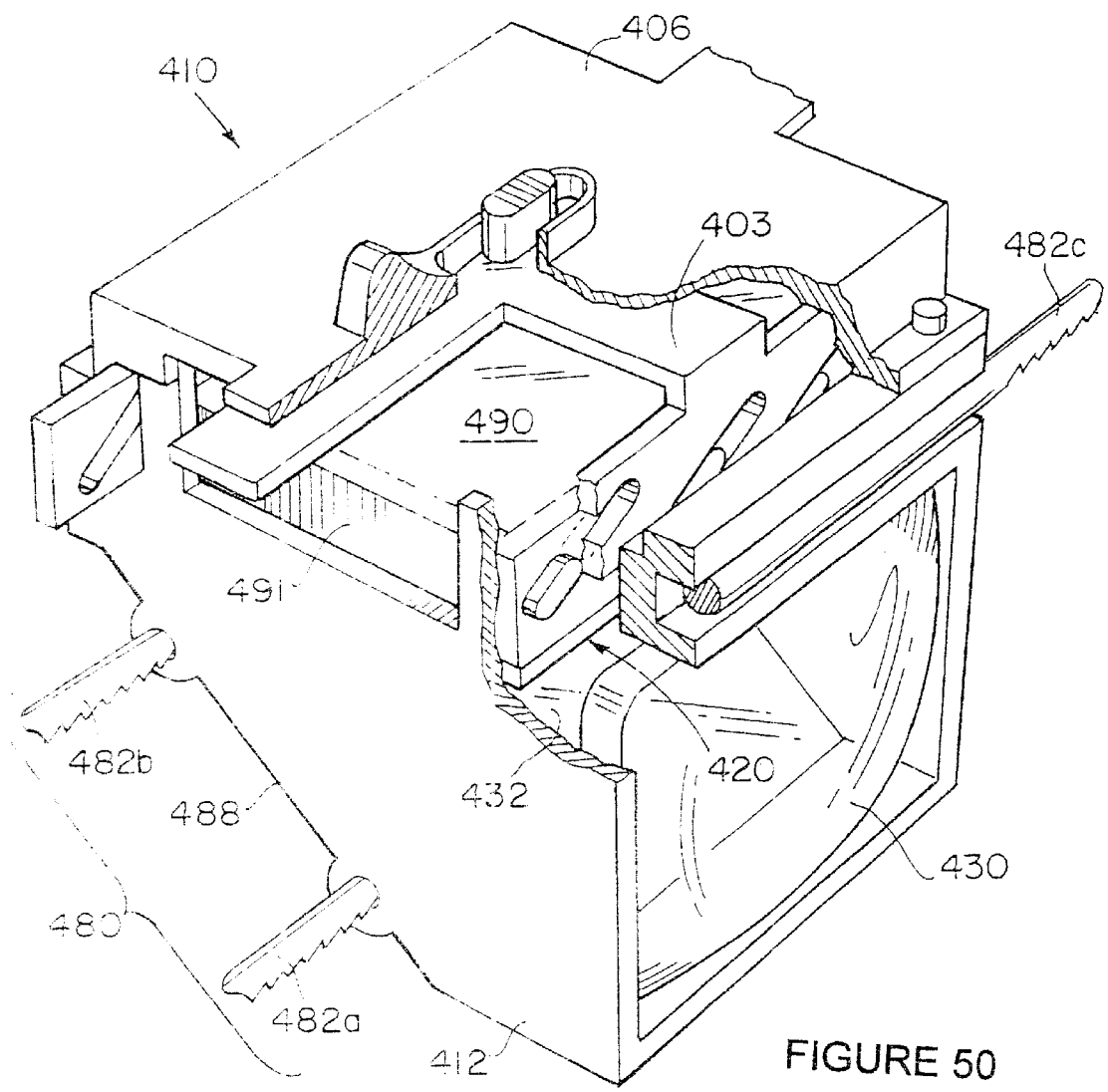
FIG. 50 is a perspective view of an optical module.

In yet another embodiment, the silicon material is patterned to form an array of pixel electrodes and each electrode is further patterned into a grid, serpentine, or other suitable geometry to reduce transmission loss through the pixel electrode. Referring to FIG. 50, an individual pixel electrode 1350 initially comprises a solid layer of single crystal silicon. However, the element is processed such that areas 1352 of silicon are removed and strips 1354 of silicon remain. As such, the resulting pixel electrode resembles a grid. The open areas 1352 have a width (W1) of about 3–5 microns and the strips 1354 have a width (W2) of about 1–2 microns. This provides an aperture through each pixel electrode that improves transmission of light by reducing interference effects and also reducing reflection, absorption and scattering caused by the pixel material. One advantage of the grid-shaped pixels is the increased light transmission through the active matrix which results in brighter displayed images. Another advantage is that the grid-shaped pixels minimize thickness variations in the single crystal silicon layer. These thickness variations cause light absorption and/or interference which reduces the light transmission through the active matrix. By minimizing thickness variations, brighter displayed images can be provided. An alternative embodiment includes further thinning of the pixel electrode material so that the switching circuits are within a thicker film than the pixel electrode.

Figure 31:
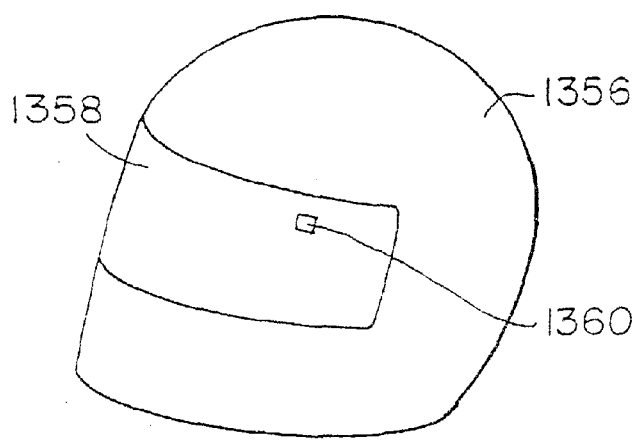
FIG. 31 is an illustration of a head-mounted active matrix display system.

Yet another feature of the active matrix displays described herein is that they may be mounted on a visor of a helmut to form a head-mounted display. Referring to FIG. 31, a visor 1358 formed of optically transmissive material is secured onto a helmut 1356. An active matrix display 1360 is positioned on the visor 1358. When activated by an electronics system (not shown), the display 1360 generates monochrome or multi-color images which are projected into the helmet 1356 for viewing by a subject. The display 1360 is substantially transparent when inactive.

The formation of the active matrix display and the above described uses are further described in U.S. patent application Ser. No. 07/944,207, Filed Sep. 11, 1992 now U.S. Pat. No. 5,444,547, which is incorporated in its entirety by reference.

Figure 32:
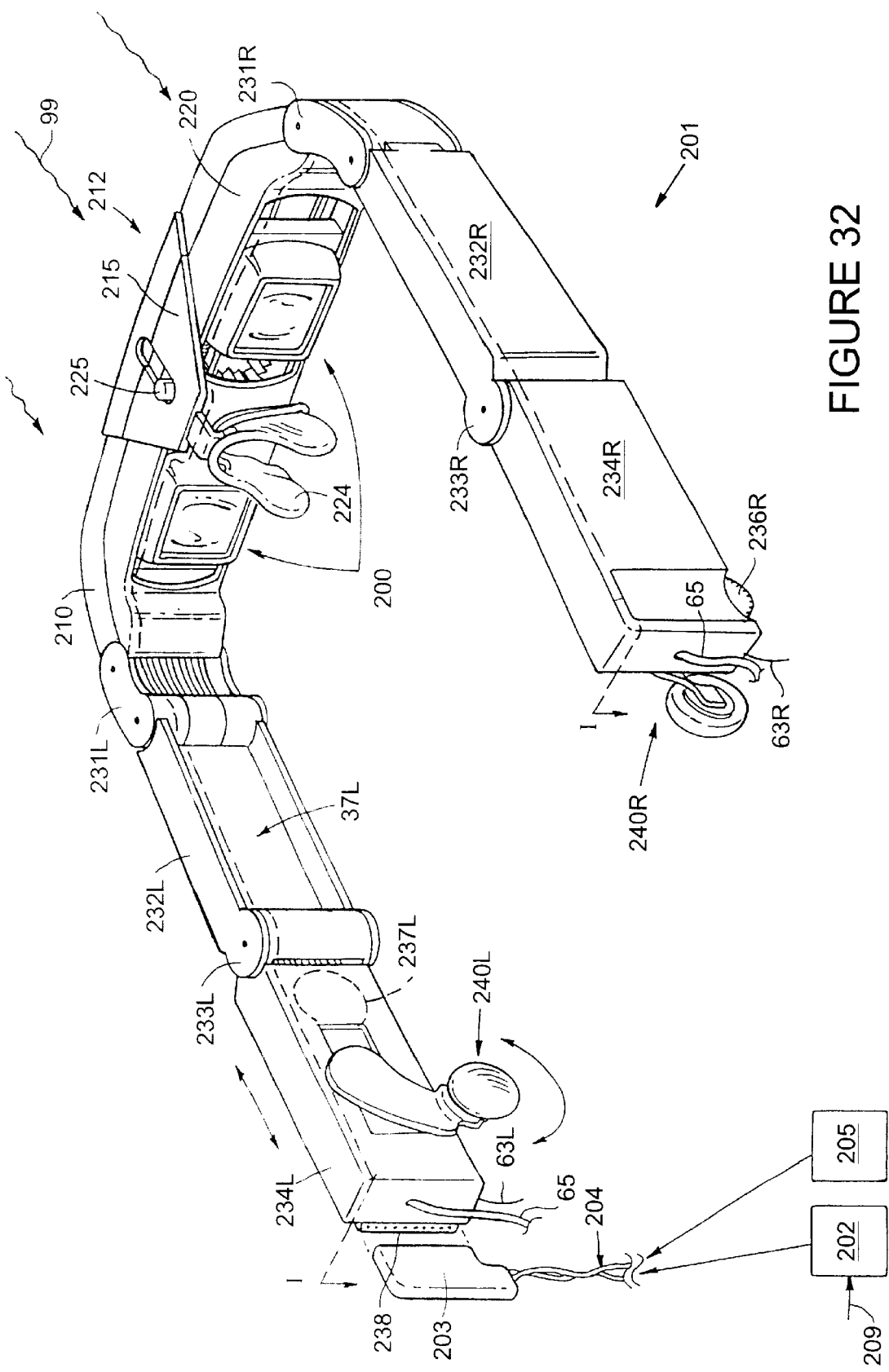
FIG. 32 is a rear perspective view of a preferred embodiment of the invention.

FIG. 32 is a rear perspective view of a preferred embodiment of a head mounted display 201. The head mounted display 201 is constructed of plastic or some other lightweight housing material and is adapted to be worn by a user to view video images via an optical assembly 200. The head mounted display exploits electronic digital imaging to form video images on a pair of light valve display panels, one of which is viewed through the user's left eye and the other of which is viewed through the user's right eye. Related discussions of head mounted display devices are provided in U.S. patent application Ser. No. 07/971,352, filed Nov. 4, 1992 and International Patent Publication WO 93/18428, filed Mar. 12, 1992, the teachings of which are both incorporated herein by reference.

The images are provided by a remote video source 202, which can be a camera, a computer, a receiver, a video cassette player, or any device that can transmit a video signal. The video source 202 may generate of video signal from data received over a link 209, such as fiber optic cable. In addition, supply voltage is provided to the head mounted display 201 from a power supply 205, which can provide the required supply voltage through the video source 202. The video source 207 can also provide an audio signal. In a particular preferred embodiment of the invention, the video source 202 and the power supply 205 are physically connected to the head mounted display 201 using a connector 203.

It should be understood that the head mounted display 1 can be self-contained such that no physical connection to the remote video source 202 or power supply 205 is required. For example, the head mounted display 201 can contain a receiver to receive transmitted video information and translate that received video information to control signals. Such an embodiment is particularly useful for receiving an over-the-air television broadcast. Similarly, the power supply for the head mounted display 201 can be provided by batteries or another power source (e.g., solar cells) that are integrated into the head mounted display 201.

The head mounted display 201 has a central housing body 212 that is formed from a front housing section 210 and a back housing section 220. The front section 210 is preferably formed from an opaque material such as plastic to block external light 299 from the user's eye's. The rear section 220 is also formed from an opaque material but is adapted to permit the user to adjust the optical assembly 200. The front section 210 is used to mount the optical assembly 200 FIG. 34). In addition to the optical assembly 200, the user can also adjust a nose bridge assembly 224. The nose bridge assembly 224 can be positioned between an extended position (as illustrated) and a retracted position using an actuating button 25. The user can select a position from a discrete number of detents. In a preferred embodiment of the invention, the actuating button 225 is fastened to one end of a member that slides within a channel of a support member 215. The opposite end of the member is fastened to the nose bridge assembly 224. When in a selected position, the button is registered to a respective detent. The actuating button 225 is pushed to release the button 225 from the detent so that the nose bridge 224 is retracted.

Attached to each side of the head mounted display body 212 is a stem 230 through a respective forward hinge 231. Each stem contains a forward stem section 232, which is coupled to the forward hinge 231 at the proximal end. In a particular preferred embodiment, the forward stem section 232 contains a rear hinge 233 at the distal end and an earphone storage compartment 237 into which earphones 40 are stowed when the stems are folded.

Rearward stem sections 234 are coupled to the forward stem section 232 joints 233 at their proximal ends. The rearward stem sections 234 are adapted to supply earphones for use by the user. The earphones 240 pivot down from a horizontally aligned position for use by the user. When stowed, the earphones 240 are returned to a horizontally aligned position for storage in the earphone storage compartment 237 of the forward stem section 232. The earphones also slide forward and rearward for adjustment by the user. The rear stem sections 234 also contain control knobs 236R, 236L for adjusting the audio and video features during the operation of the head mounted display 201. The control knobs 236R, 236L are thus coupled to electronic circuitry, which is also stored within the stem sections 230. In a particular preferred embodiment of the invention, the right rear stem section 234R contains a volume control 236R and the left rear stem section 234L contains a contrast control 236L. Also in a particular preferred embodiment of the invention, the left rear stem section 234L contains a female connector 238 for interfacing with the video source 202 through the male connector 203. Alternatively, an antenna can be provided to receive audio and video signals.

The head mounted display 201 can be used in numerous and varied applications including, but not limited to, commercial audio/video presentations (television, home video), computer and multimedia presentations, hospital operating room use (e.g. orthoscopic surgery), remote camera monitoring, or any other use where private or detailed viewing of a video image is desired. For certain applications, it is desirable that the body 212 of the head mounted display 201 pivot upward like a visor to permit the user to easily alternate viewing the video image and alive scene. An example of such an application is when the head mounted display 201 is worn by a surgeon during orthoscopic, or other, surgery.

Figure 33:
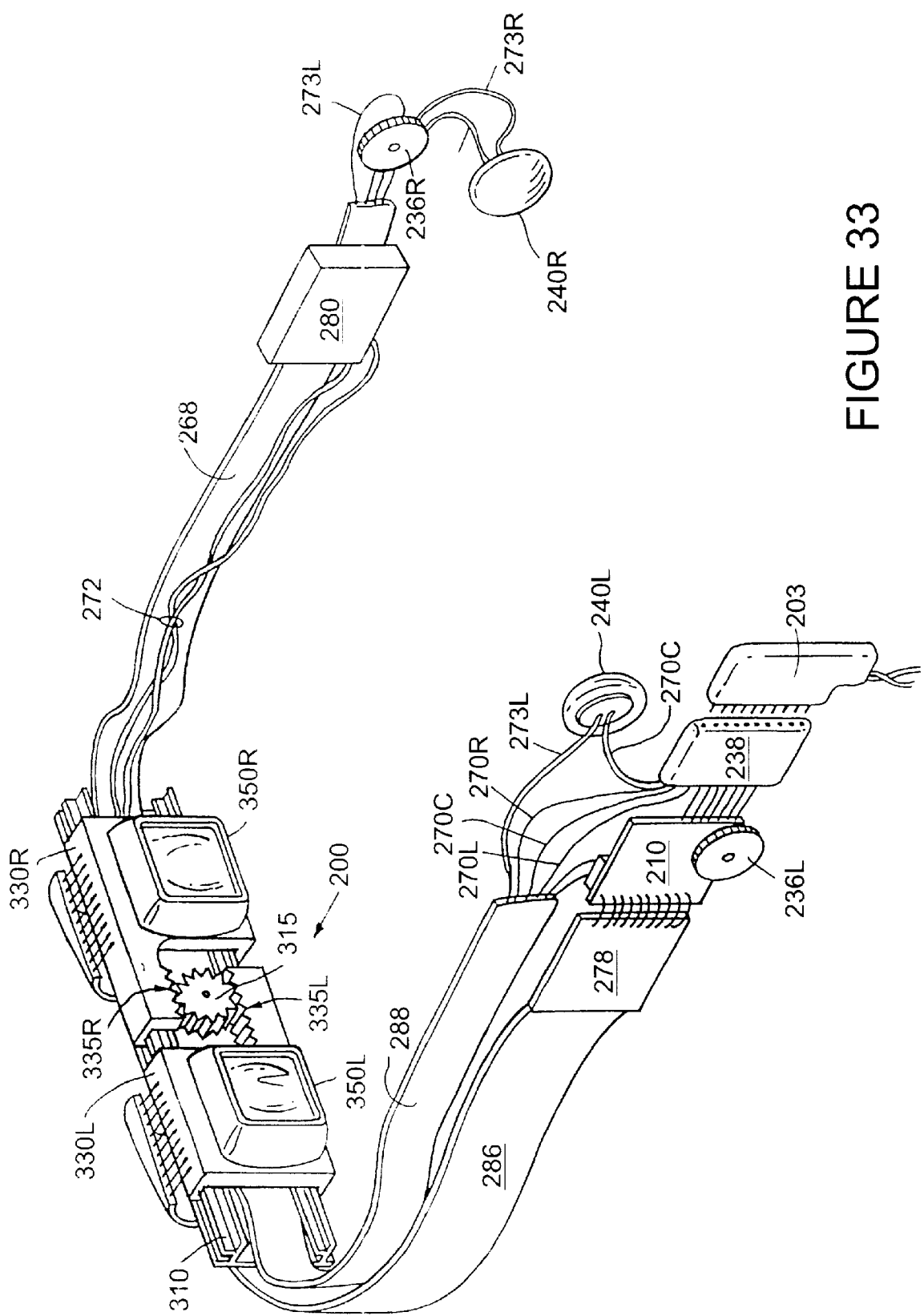
FIG. 33 is a perspective view of a preferred embodiment of a wiring harness.

FIG. 33 is a rear perspective illustration of the wiring harness enclosed by the head mounted display 201. In a particular preferred embodiment, audio and video information and supply power is provided via a 10-pin male connector 203. The male connector 203 registers to a 10-pin female connector 238. Of these ten pins, seven pins are provided for the display panel power and backlight power, and three pins are provided for audio signals. The seven video signals are provided to a first circuit 260. A contrast control 237 is coupled to the first circuit 260 to permit the user to adjust the contrast of the images displayed on the light valve display panels. In other preferred embodiments, other video controls (e.g., brightness, image alignment, color adjust, etc.) are provided and coupled to the first circuit 260. The first circuit 260 is coupled to a second circuit 262, which drives the light valve display panels via an N-conductor ribbon cable 264, where the number of conductors N is determined by the type of display panel.

The first circuit 260 also separates the blacklight power signals from the light valve display panel signals and provides those signals to a blacklight driver 266 over a 6-conductor ribbon cable 268. In addition to the two blacklight driver signals, the 6-conductor ribbon cable 268 carries four audio signals. A left channel signal $270_L$, a common signal $270_C$, and a right channel signal $270_R$ are provided on the 6-conductor ribbon cable 268 to a stereo volume control 236. In a particular preferred embodiment, the blacklight driver 266 and the stereo volume control 236 are disposed within the opposite stem 230 from the circuit 260.

The stereo volume control 236 permits the user to alter the gain of the signals in the right and left earphones 240. The adjusted right signal $270_R$ is provided to the right earphone 240R and the adjusted left channel signal $270_L$ is carried by the 6-conductor ribbon cable 268 back to the left earphone 240L. Both the left and right earphone are also provided with the common signal $270_C$. In other preferred embodiments, other audio controls (e.g., stereo balance, tone, etc.) are provided.

The second circuit 262 need not be a discrete device as illustrated. In another preferred embodiment, the second circuit 262 is fabricated with each display panel, such that each display panel is controlled by a respective control circuit.

The blacklight driver 266 provides high voltage signals to the optical assembly 200 over signal lines 272. The high voltage signals can be used to drive a blacklight for each display panel where a transmissive display panel is used. Similarly, the high voltage supply can be used to drive an emissive display panel. In a particular preferred embodiment of the invention, the display panels are of the active matrix liquid crystal display type, which require backlighting.

In a preferred embodiment the discrete circuiting 274, 276, 278, 280 are disposed near the rear of the head mounted display 201 to provide for more even weight distribution. A preferred control circuit for driving the active matrix display panel 213 is described in U.S. patent application Ser. No. 07/971,399, filed Nov. 4, 1992, the teachings of which are incorporated herein by reference. In another preferred embodiment, the display panels are of the passive matrix liquid crystal display type. A control circuit for driving the passive matrix display panel is described in U.S. patent application Ser. No. 07/971,326, filed Nov. 4, 1992, the teachings of which are incorporated herein by reference.

Figure 34:
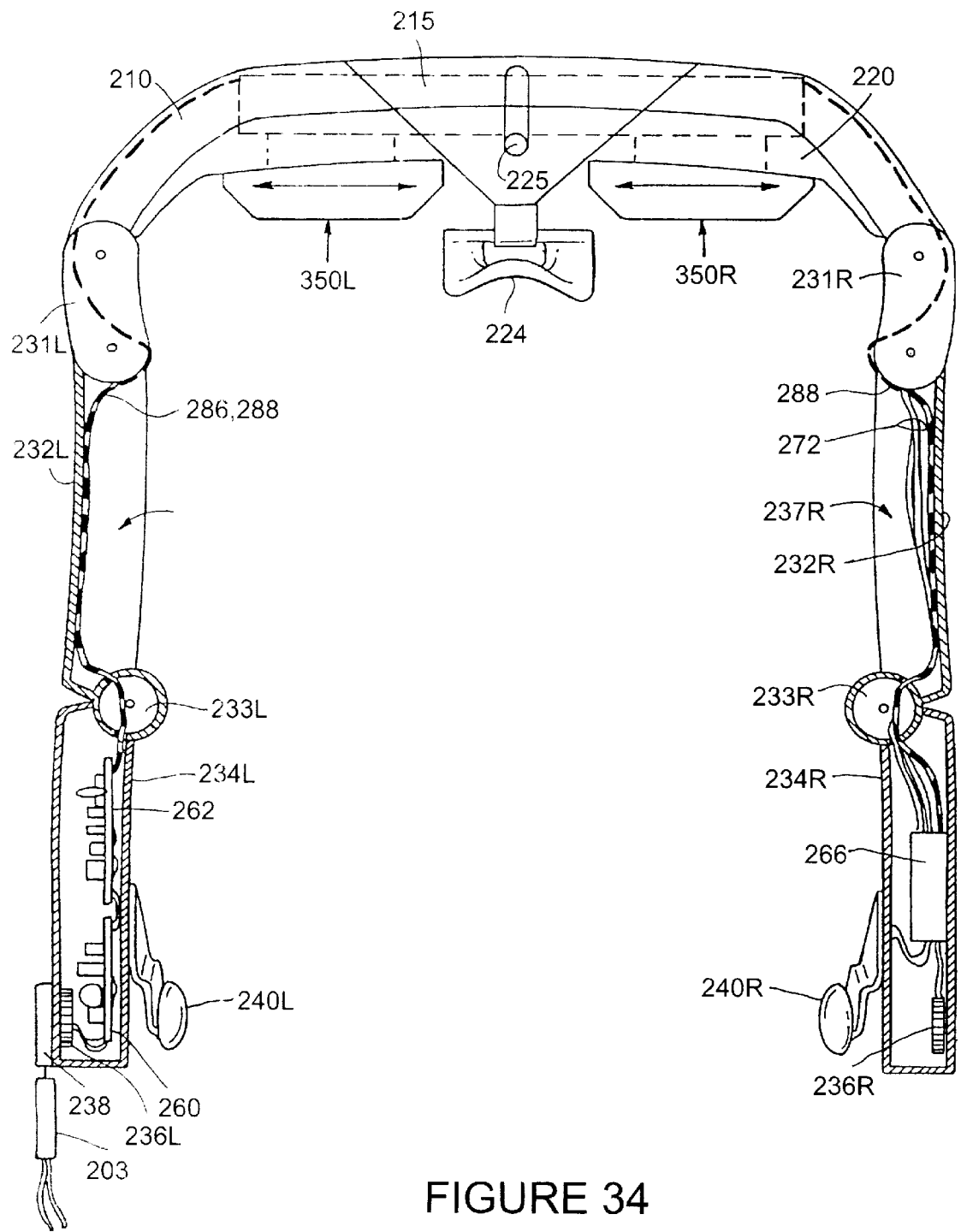
FIG. 34 is a top plan view of the preferred embodiment of FIG. 32 showing the placement of the wiring harness of FIG. 33.

FIG. 34 is a top plan view of the head mounted display 201 taken along section line I—I of FIG. 32. The positioning of the wiring harness 284 is illustrated in phantom. Note that the ribbon cables 286 and 288 are routed around the joints 231 and 233 to permit folding of the stems 230 into a compact unit for storage. In a preferred embodiment, the rear hinge 233 employs a split cylinder that rotates independent of the joint so the ribbon cable is not visible when the stems are opened or folded.

Figure 35:
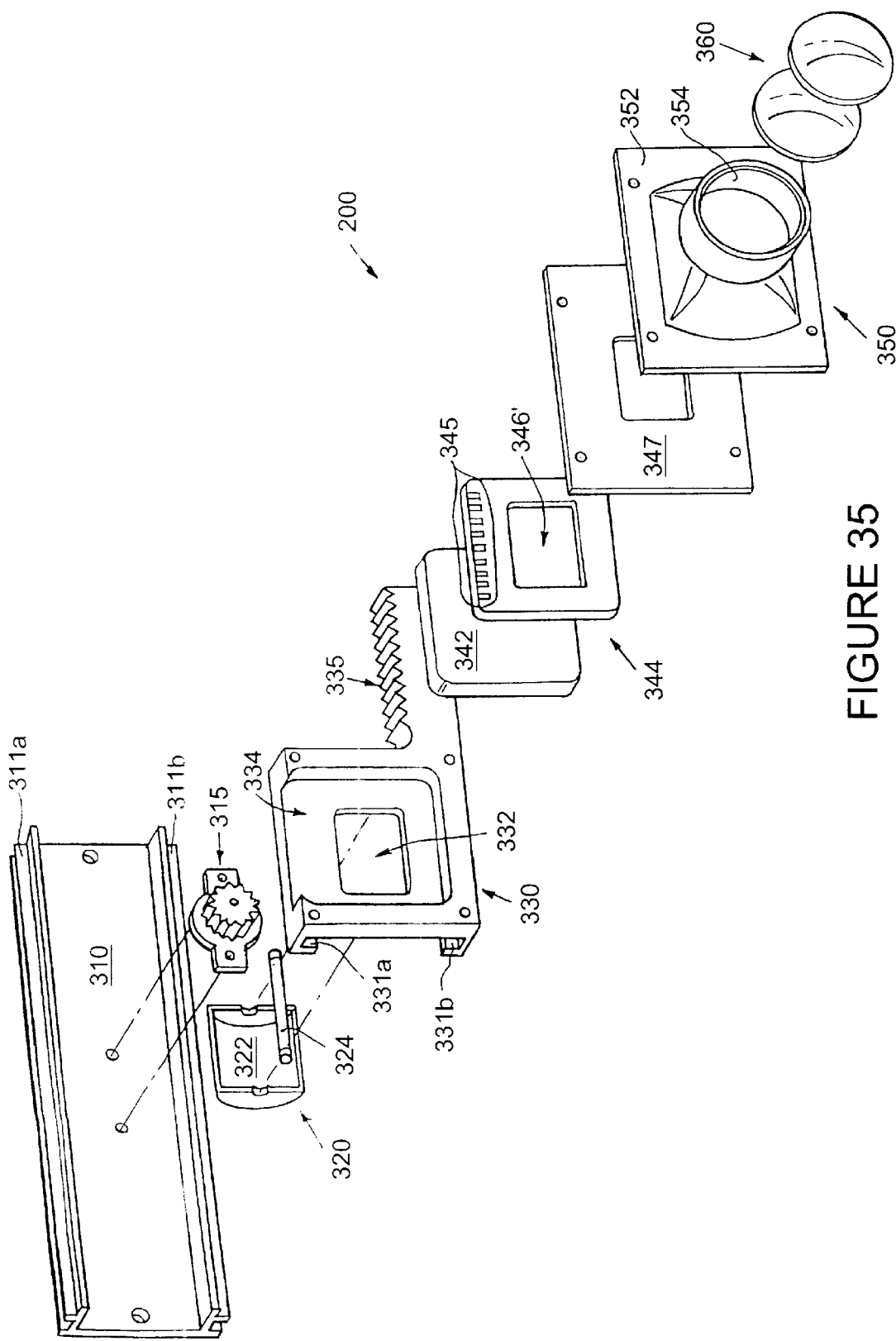
FIG. 35 is an exploded view of an optical assembly for use in a transmissive display system.

FIG. 35 is an exploded view of the optical assembly for the head mounted display 201. A mounting frame 310 is adapted to be mounted to the inner surface of the front section 310 of the head mounted display 201. The mounting frame 310 has first and second guide rails 311a, 311b to permit adjustment of the inter-pupil displacement of the light valve display panels. The adjustment of the inter-pupil displacement will be discussed in more detail below.

Mounted to the mounting frame is a backlighting assembly 320 for use in transmissive display systems. The backlighting assembly 320 contains a blacklight 324, which is preferably a cold cathode blacklight. The blacklight 324 is disposed in a white reflector 322, which reflects light from the blacklight 324 onto the display panel. In a transmissive color display, the backlighting can be provided by a multicolor sequential blacklight where there is a blacklight for each primary display color (e.g., red, green, blue) and the backlights are sequentially lit in timing with the switching of the light valve. In another preferred embodiment blacklight is provided by direct ambient light 99. Through a light transmissive front housing section 210 and mounting frame 310.

A display holder 330 is positioned on the mounting frame 110 such that the mounting frame rails 311a, 311b are disposed within respective display holder channels 331a, 331b. The display holder 330 contains a display area 334 and an aperture 332 through which light from the blacklight 324 passes. The display holder 330 also has a geared rack 335 for use in adjusting the inter-pupil displacement. A viscous damped gear assembly 315 meshes with the geared rack 335 such that rotational motion of the gear assembly 315 causes linear movement of the display holder 330 along the mounting frame 310. As illustrated, the user adjusts the inter-pupil displacement by sliding the left and right display holders 330 along the mounting frame 310. Alternatively, an axle can extend from the gear 315 to a knob or crank lever, preferably disposed on the forward face of the front section 210 of the display body 212. Indicator marking can also be provided to guide the user.

Although only the left portion of the optical assembly 200 is illustrated in FIG. 34, the right display holder is similar to the left display holder, except that the right display holder is rotated 180° relative to the left display holder. In that alignment, the left display holder gear rack 335L is positioned below the gear assembly 315 and the right display holder gear rack 335R is positioned above the gear assembly 315 as illustrated in FIG. 33. Consequently, the gear assembly simultaneously displaces both the left and right display holders when rotated. In a preferred embodiment of the invention, the inter-pupil displacement is adjustable by the user in a range from about 55 mm to 72 mm to provide an aligned left-right image to the user.

Returning to the optics assembly, a display assembly 340 is registered to the display chamber 334. The display assembly contains a translucent plastic light diffuser 342, a liquid crystal display panel 344, and a thin plastic matte black mask 347. The diffuser 342 diffuses light from the blacklight 324 that passes through the display holder aperture 332 to provide a light distribution that is sufficiently uniform across the display area 346. The liquid crystal display panel 344 has a display area that is 0.7 inch as measured diagonally. The liquid crystal display panel 344 is preferably fabricated in accordance with U.S. patent Ser. No. 07/815,684, filed Dec. 31, 1991, the teachings of which are incorporated herein by reference. The display panel 344 contains connectors to connect to the 20-conductor ribbon cable 286 (FIG. 33). The display assembly 340 is secured in the display holder chamber 334 by an optics holder 350, which is fastened to the display holder 330. The optics holder 350 contains a housing 352 that may be conformable to the users eye to block ambient light and surround a cover glass 354.

Optional lenses 360 are adaptable to the display holder 350 to, for example, correct the user's near vision.

Figure 36:
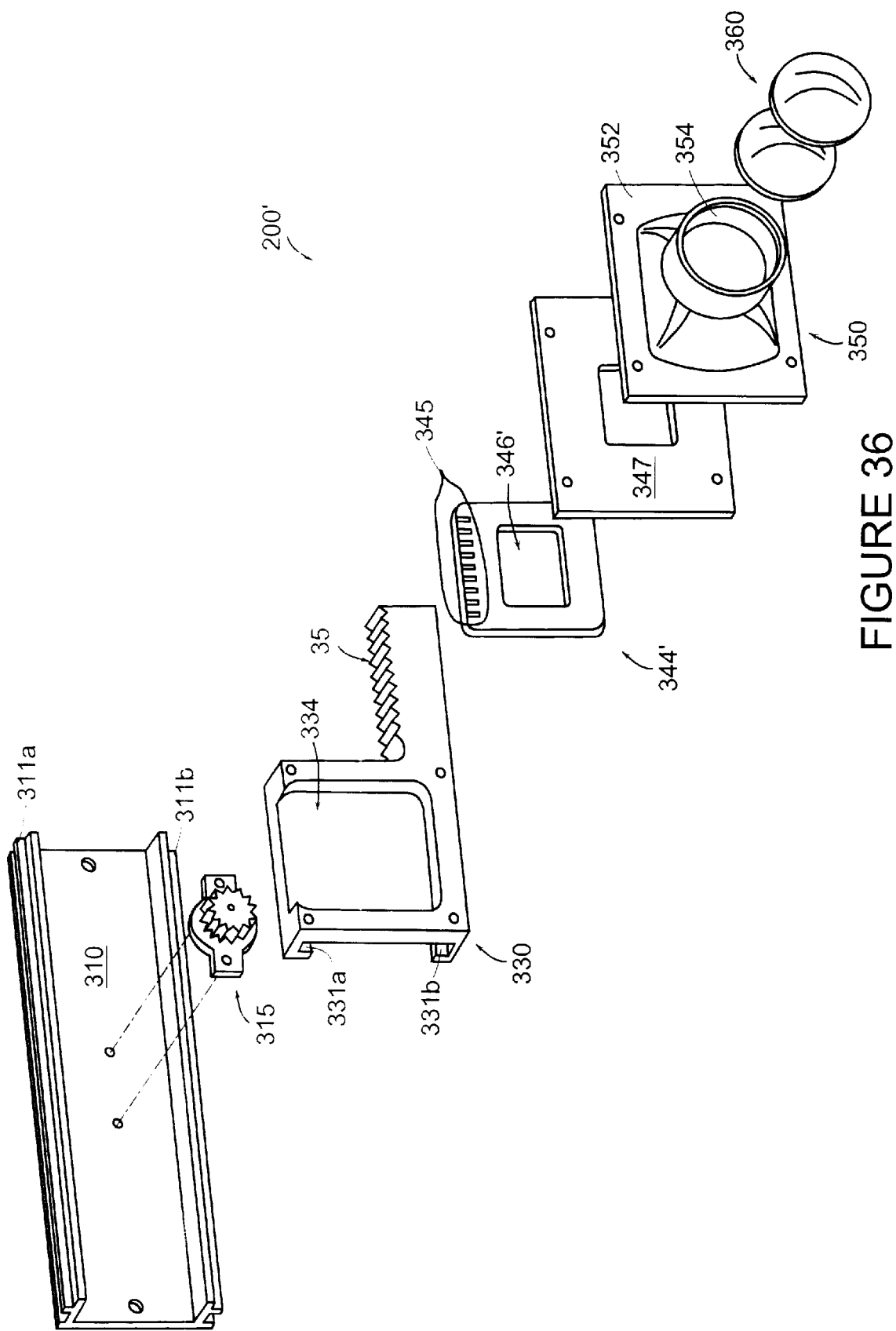
FIG. 36 is an exploded view of a preferred embodiment of an optical assembly for use in an emissive display system.

Although FIG. 35 illustrates a preferred embodiment employing a transmissive display panel, an optical assembly 200' can be adapted to receive an emissive display panel 344', as illustrated in FIG. 36. The emissive display optical assembly 200' differs from the transmissive display optical assembly 200 in the following respects. The emissive embodiment does not use a blacklight 320. Thus the display holder 330 does not require an aperture 332 or a light diffuser 342. Instead, the light is provided by emissive material on the display panel 344 that is activated by drive signals. The emissive display panel is preferably fabricated in accordance with U.S. patent application Ser. No. 07/643,552, the teachings of which are incorporated herein by reference.

Figure 37:
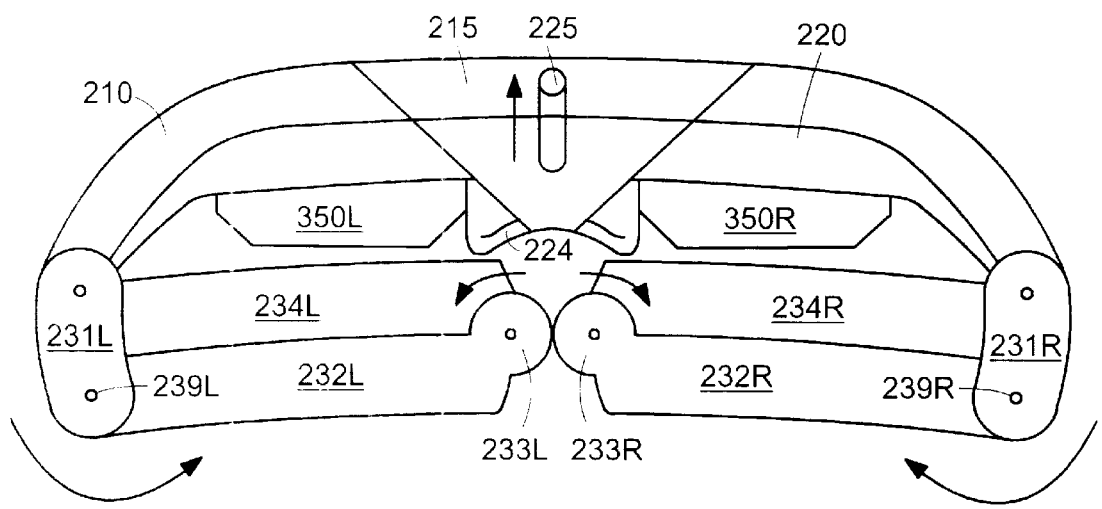
FIG. 37 is a top plan view showing the embodiment of FIG. 32 in a stowed position.

FIG. 37 is a top plan view of the head mounted display 201 in the folded configuration. In particular, note that the nose bridge assembly 224 has been positioned into the retracted position for storage. In the retracted position, the nose bridge assembly 224 does not interfere with the folding of the stems 230. The hinge points 239 on the forward joints 231 are spring tensioned to facilitate head rotation.

Figure 38:
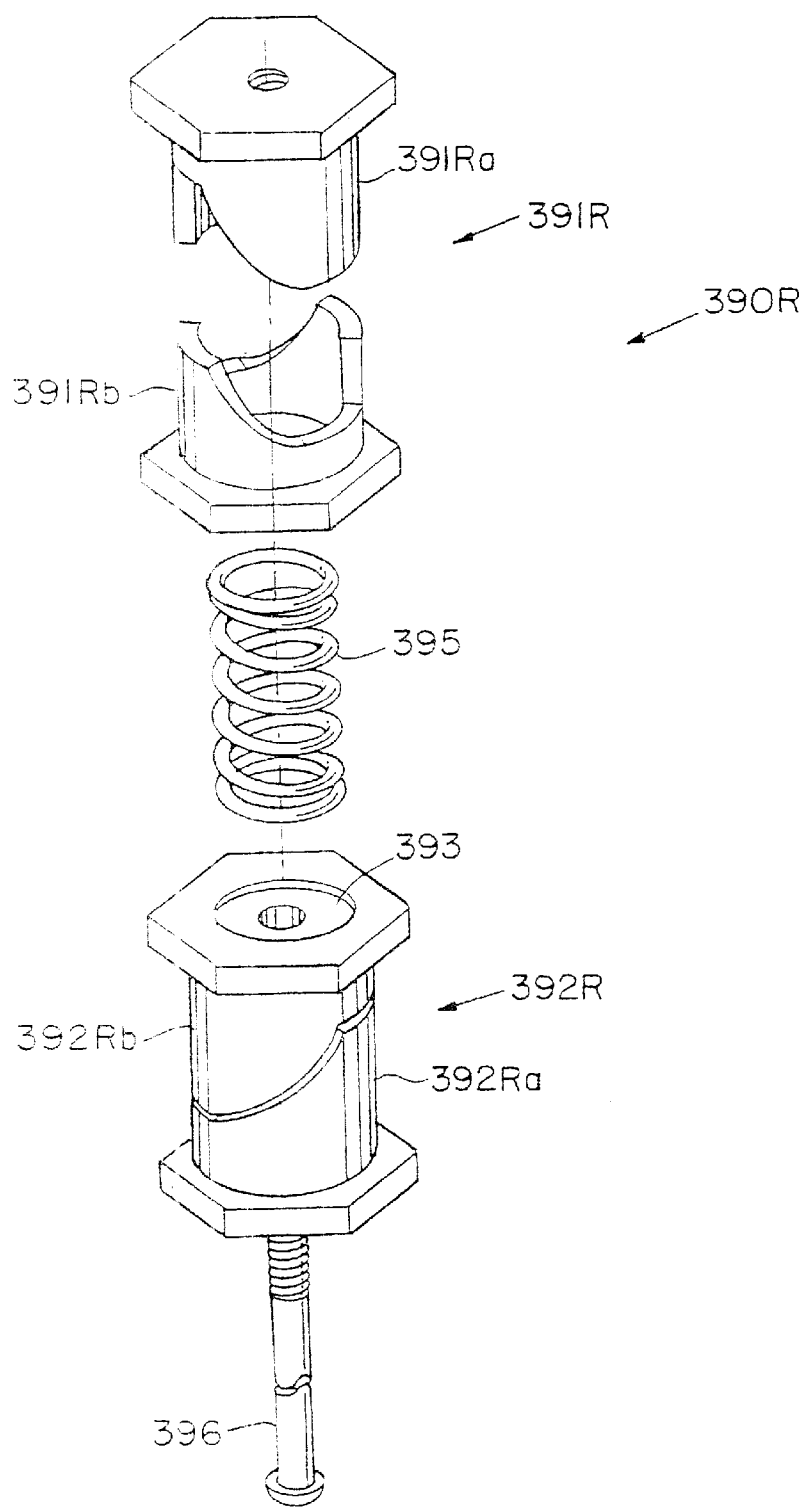
FIG. 38 is an exploded perspective view of a preferred embodiment of cam assembly for the pivot point 39 of FIG. 37.

FIG. 38 is an exploded view of a preferred spring cam assembly, 390R that is used at the hinge port 239R on the right forward joints 231R. The cam assembly 390R comprises a first cam 391R and a mirror image second cam 392R. The cams 391R, 392R contain an outer section 391Ra, 392Ra that registers to a respective receptacle on the body 212 and an inner section 391Rb, 392Rb that registers to a respective receptacle on the forward stem 32R. the inner cams 391Rb, 392Rb each include a landing 393 that allows for free play before engagement. A compression spring 395 is disposed between spring landings. The cams 391R, 392R compress the spring 395 when rotated together. For the right stem 30R, free play is exhibited for an angular displacement from the folded position, thereafter a variable return force is extended by the spring 395, which tends to secure the head mounted display 201 to the user's head. The compression can be adjusted by an adjustment bolt 396 that meshes with a threaded opening on the outer sections 391a, 392b.

Figure 39A:
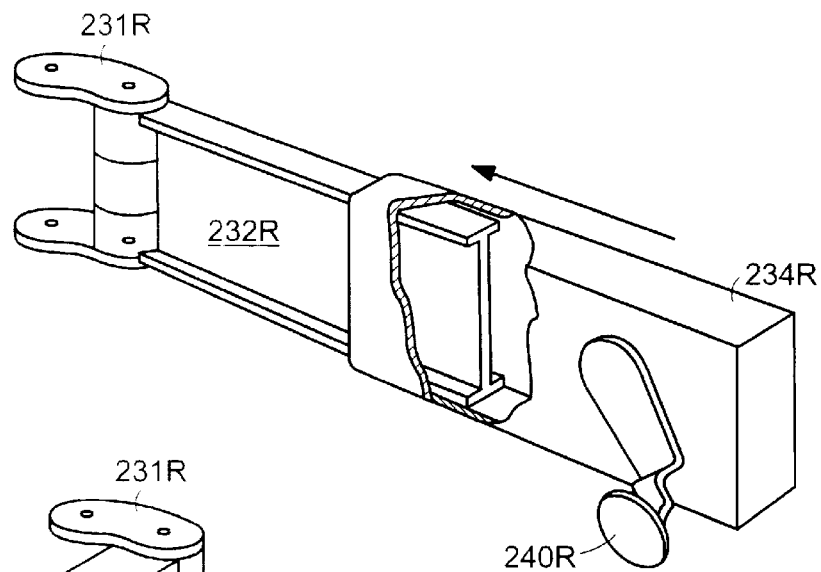
FIGS. 39A–39B are partial perspective views of another preferred embodiment for storing the stems 30 of FIG. 32.
Figure 39B:
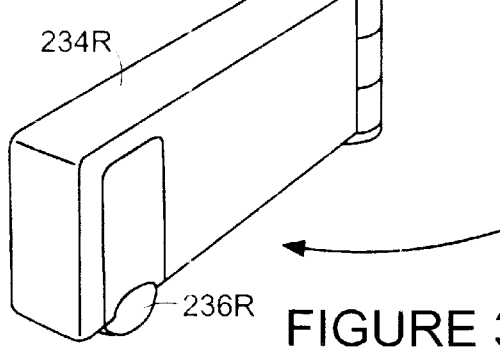

FIGS. 39A–39B are partial views of another preferred stem storage embodiment. The forward stem section 332 is a skeleton frame on which the rear stem section 334 slides for storage. (FIG. 39B). Alternatively, the forward stem section 332' can encapsulate the rear stem section 334' when stored.

Other preferred embodiments employ other devices to secure the head mounted display, to the user's head. Such devices include an inflatable bladder 251 (shown in phantom in FIG. 32), with an associated pump assembly, that is disposed over the user's temple, and a headband 252, and ear loops 253.

In a preferred embodiment, the head mounted display 201 is formed from injection molded plastic. Particular components, such as the nose bridge support member 215, are rigid glass filtered molded plastic or a composite laminate.

FIG. 40 is a front perspective view of another preferred embodiment of a heat mounted display unit 201'. The head mounted display unit 201' comprises a visor 50 and a headband 560 coupled together by a pair of pivot assemblies 570a, 570b. The right side pivot assembly 570a is a mirror image of the left side pivot assembly 570b. The pivot assemblies 570a, 570b are adjustable and flex such that the head mounted display unit 201' can be secured to a user's head. The display unit 201' also includes a right speaker assembly 580a and a left speaker assembly 580b that can be positioned over the user's ears. Each of these components will be discussed below in further detail.

The visor 550 includes a face plate 552 having a right side 552a and left side 552b. In a preferred embodiment, transmissive display panels use a dedicated blacklight as illustrated in FIG. 35. In another preferred embodiment, emissive display panels are used in the visor 550. The visor further includes a back section 554, which will be discussed in further detail below.

Figure 41:
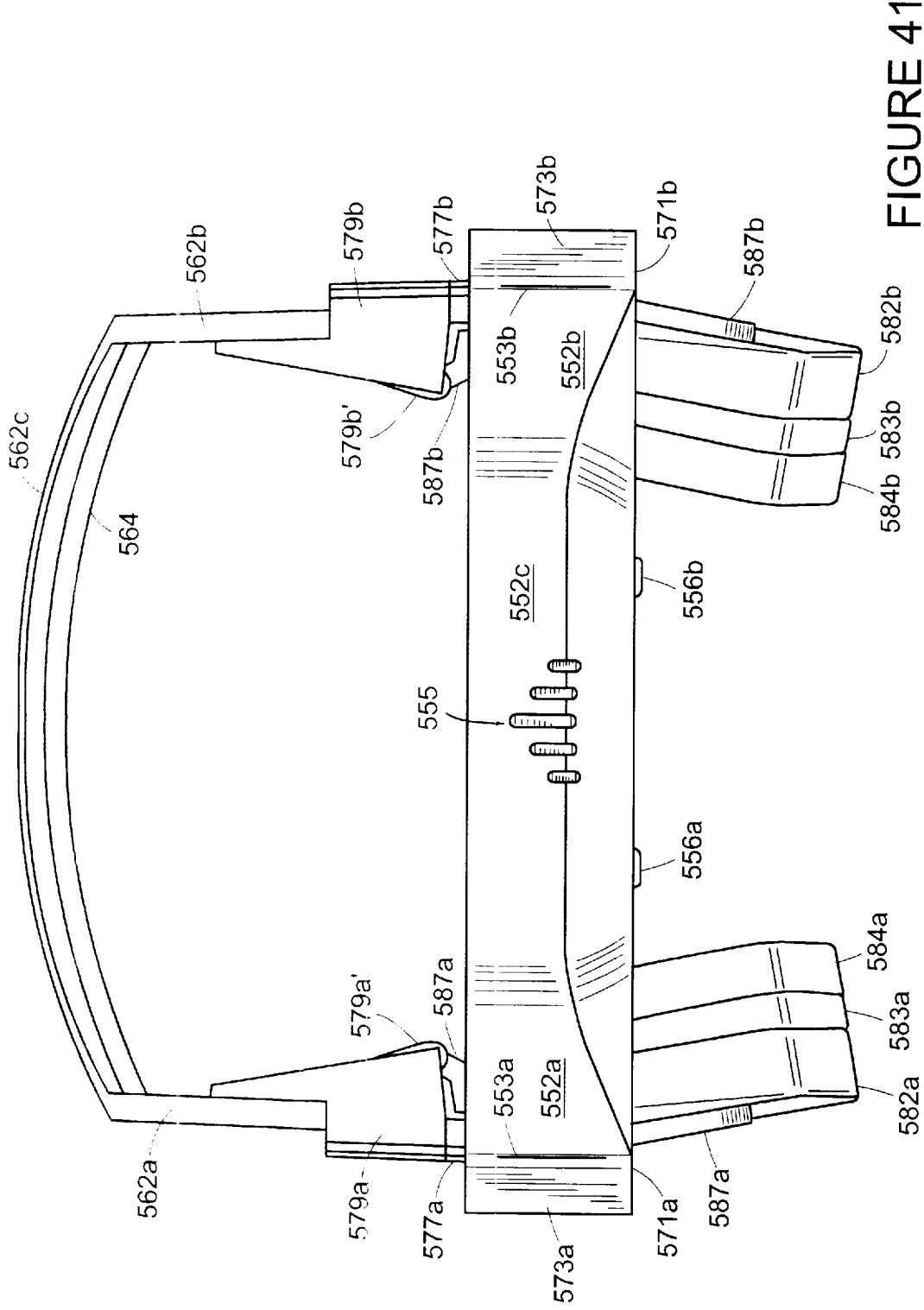
FIG. 41 is a front view of an alternative embodiment of the invention.

The visor is connected to the right pivot assembly 570a by a right visor hinge 553a and to the left pivot assembly 570b by a left visor hinge 553b (FIG. 41). The visor hinges 553a, 553b allow the respective pivot assembly 570a, 570b to flex laterally relative to the line of sight of the user. This flexion, for example, permits the user to separate the distance between the speaker assemblies 580a, 580b so as to fit the display unit 201' over the user's head.

The pivot assemblies 570a, 570b each contain components to displace the visor 550 from the earphones 580a, 580b longitudinally relative to the user's line of sight. This permits the user to properly adjust the visor for a snug fit. More particularly, longitudinal motion is accomplished by cooperation between a front hinge 571 and a center pivot 575. The front hinge 571 is mated to a respective visor hinge 553 by a pin 571'. The front hinge includes a rail section 572 and the center pivot 575 includes a rail section 574. A center coupler 573 permits the rails 572 and 574 to slide relative to one another. As illustrated in FIG. 40, the display unit 201' is shown fully extended in the longitudinal direction. Within the center coupler 573 is a wheel 576 to facilitate relative motion between the opposed rails 572 and 574.

The headband 560 is preferably formed of rigid plastic and includes a headpiece 562 having a right side 562a and a left side 562b. In each side of the headpiece 562, are a series of spaced detents 568 to couple to a respective pivot assembly 570a, 570b. Optionally, the headband 560 can include a pad 564, preferably made of a pliable rubber foam to provide a comfortable fit over the user's head.

The pivot assemblies 570a and 570b cooperate to permit the headband 562 to rotate about the center pivots 575a and 575b. In a preferred embodiment of the invention, the headband 560 pivots 360° traverse to the plane of the user's line of sight. As illustrated, the headband 560 is positioned at 90°.

A lateral pivot joint 577 is coupled to the respective pivot joint 575 such that when the headband 560 is positioned at the 90° position, a pivot point (not shown) is positioned parallel to the visor hinges 553 such that the speaker assemblies 580a and 580b can flex laterally. A supporting member 579 is coupled to the lateral hinge 577 via the pivot. The supporting element 579 includes a rail 578, which is mated to the series of detents 568 by a catch 579. The headband 560 can be fixed to positions defined by the detent 568 by moving the headpiece 562 along the rails 578.

The speaker assemblies 580 are also coupled to the respective pivot assemblies 570a and 570b. A lobe member 587 is coupled to the supporting element 579 of the pivot assembly 570 by a hinge 579'. Each headphone 580 includes a mounting frame 582 which is connected to the lobe member 587. A speaker component 583 is fixed to the speaker frame 582. A foam pad 584 rests against the user's ear such that the user hears sound from the speaker component 583 through an aperture 585 in the foam padding 584.

FIG. 41 is a front view of the head mounted display unit 201' of FIG. 40. The front view more clearly illustrates the capability of swiveling the earpiece 580a and 580b about the respective pivot points 579a' and 579b'. Also illustrated are slide tabs 556a and 556b for aligning the display panels (not shown) within the visor 550. More particularly, the slide tabs 556 permit adjustment of the inter-pupillary displacement of the display panels. Furthermore, the slide tabs 556 preferably operate independently of each other such that each display panel can be positioned relative to the respective eye to compensate for off-center vision.

Figure 42:
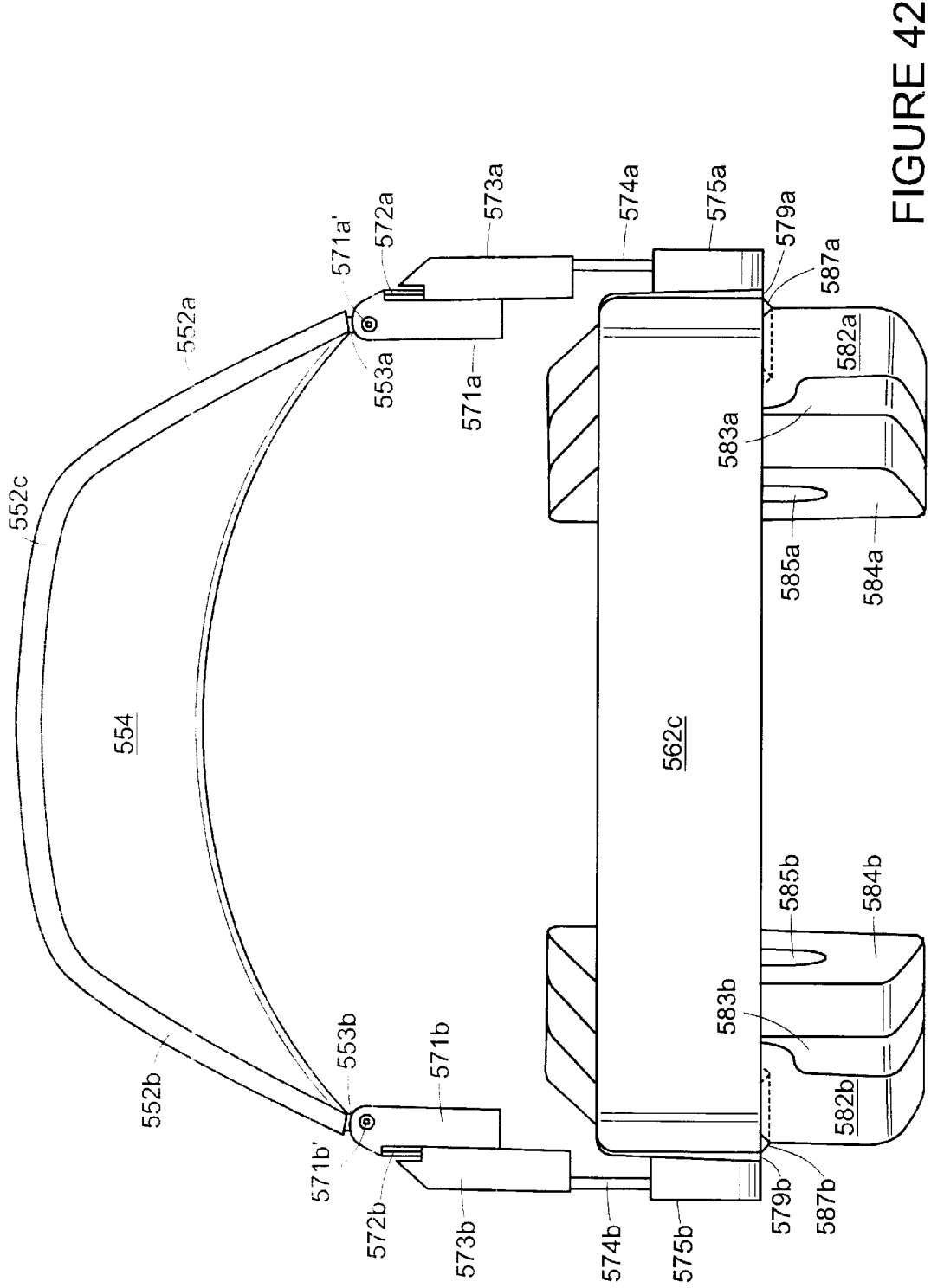
FIG. 42 is a top view of an alternative embodiment of the invention.

FIG. 42 is a top view of the head mounted display unit 201' of FIG. 40. In particular, the lateral motion about hinge pairs 553–571 and 577–579 are illustrated.

Figure 43:
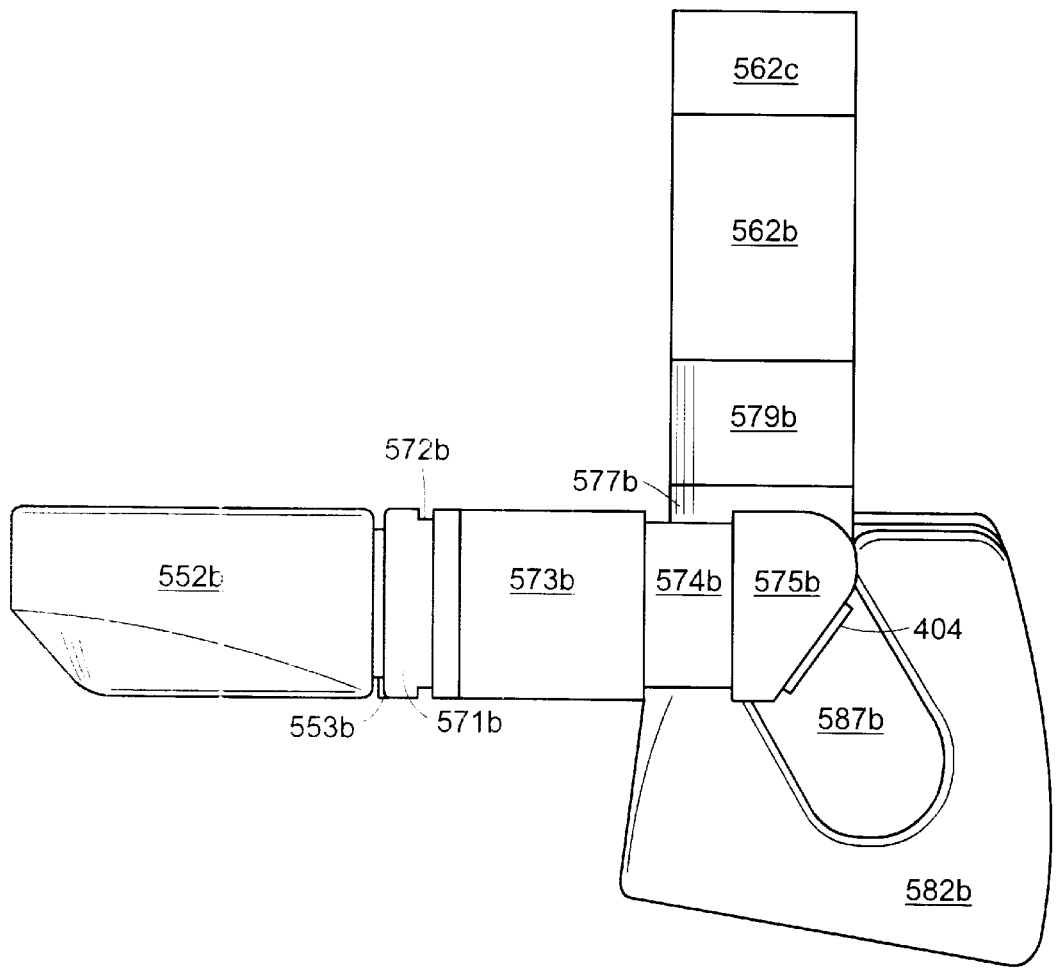
FIG. 43 is a side view of an alternative embodiment of the invention.

FIG. 43 is a left side view of the head mounted display device 201' of FIG. 40. As illustrated, the headpiece 562 is fully retracted. In addition, the visor 550 is partially retracted. A pin connector 404 is mounted in element 575b to provide video and audio connections to the device. Alternatively, two pin connectors can be used, one on 575b, the second on 575a.

Figure 44:
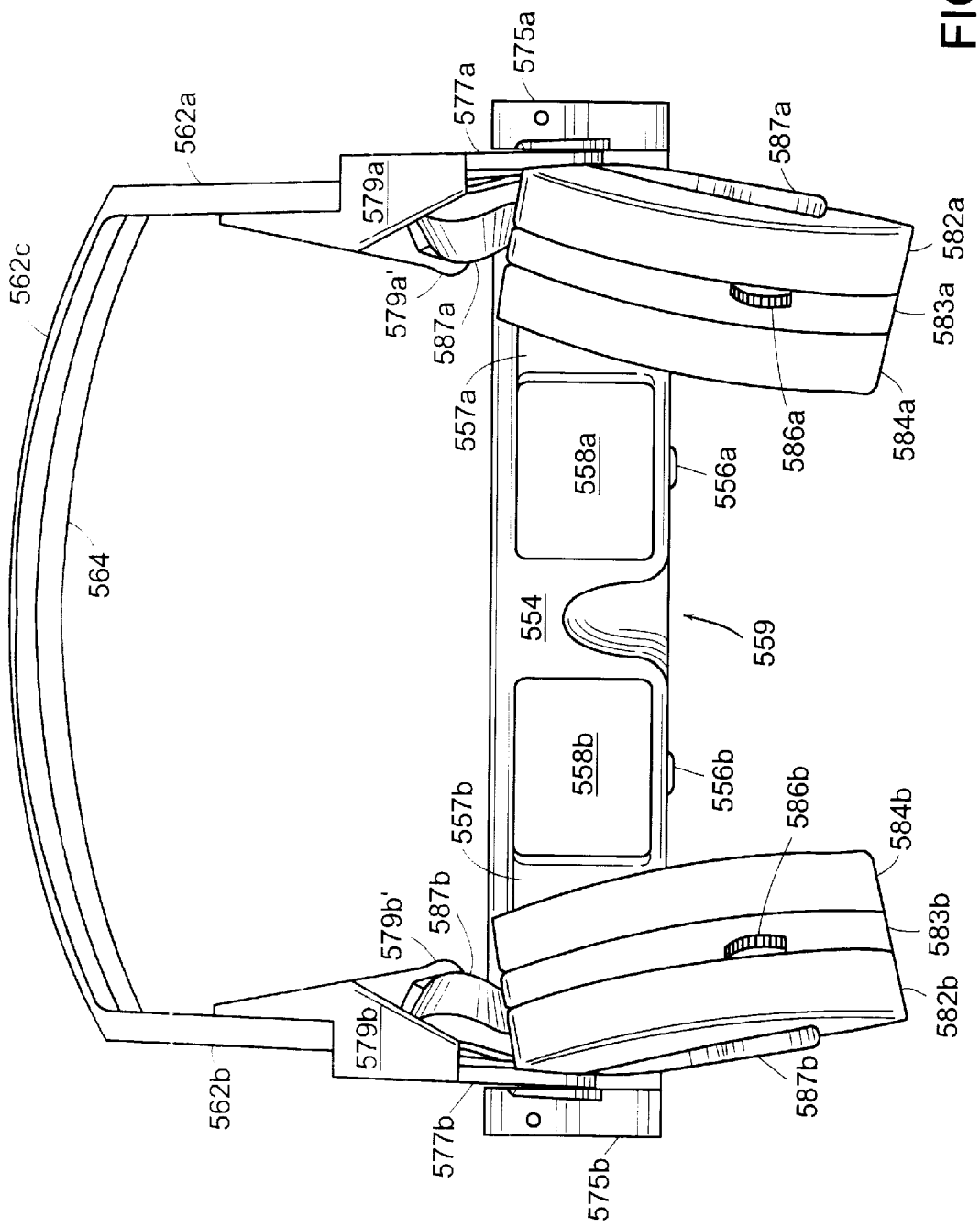
FIG. 44 is a back view of an alternative embodiment of the invention.

FIG. 44 is a rear view of the head mounted display device 201' of FIG. 1. Illustrated are ball joints 575a' and 575b' of the respective center pivot 575a and 575b. As illustrated, each back section 554 of the visor 550 includes a right viewer 558a and a left viewer 558b. Each viewer permits the user to view images formed on respective display panels (not shown) disposed within the visor 550. Preferably, the viewers 558a and 558b are positioned within respective recessed cavities 557a and 557b of the back section 554 of the visor 550. The recessed cavities 57a, 57b make the display device 201' eyeglasses compatible. Also illustrated is a nose bridge 559, which is preferably molded into the back section 554. Also shown in the Figure are control knobs 586a and 586b protruding through the respective speaker assemblies 580a and 580b. In a particular preferred embodiment, the right control knob 86a controls contrast on the display panels and the left control knob 86b controls speaker volume.

Figure 45:
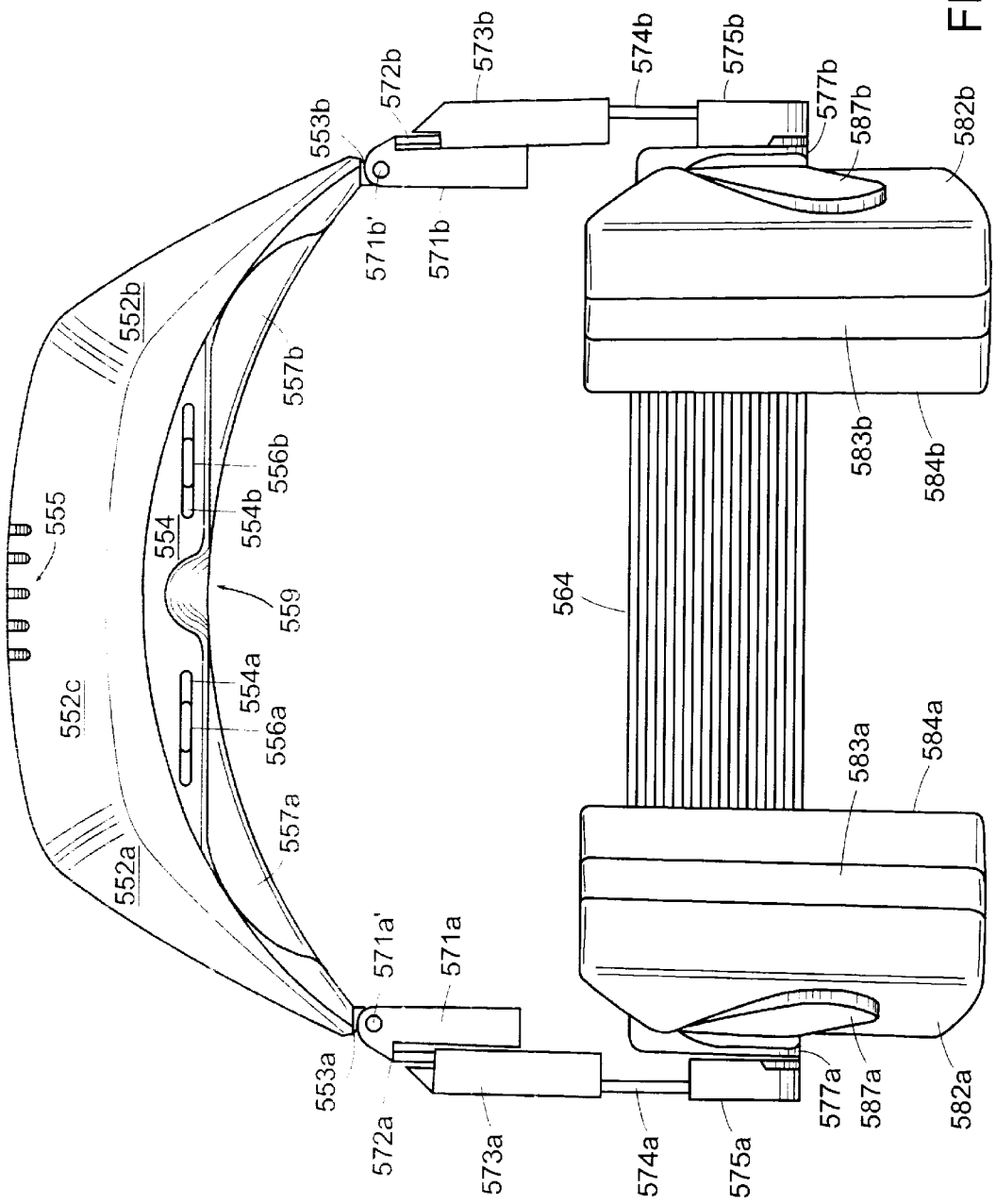
FIG. 45 is a bottom view of an alternative embodiment of the invention.

FIG. 45 is a bottom view of the head mounted display unit 201' of FIG. 40. More clearly illustrated are the recessed cavities 557a and 557b of the back section 554 of the visor 550. Furthermore, the configuration of the slide tabs 556a and 556b in a respective slide channel 554a and 554a of the back section 554 is illustrated. Furthermore, the head pad 564 is illustrated as having longitudinal ribs to help maintain the headpiece 564 in place. The hinge between 552a and 571a, and the second hinge between 552b and 571b can be "hidden" as shown in FIG. 45.

Between the closed position and the 90° position there can be a discrete number of a detent for positioning the headband 560. In a particular preferred embodiment, a detent is provided at the 45° position. Alternatively, a friction bearing surface can be used to rotate the visor relative to the headband to hold the visor in a partially raised position.

Figure 46:
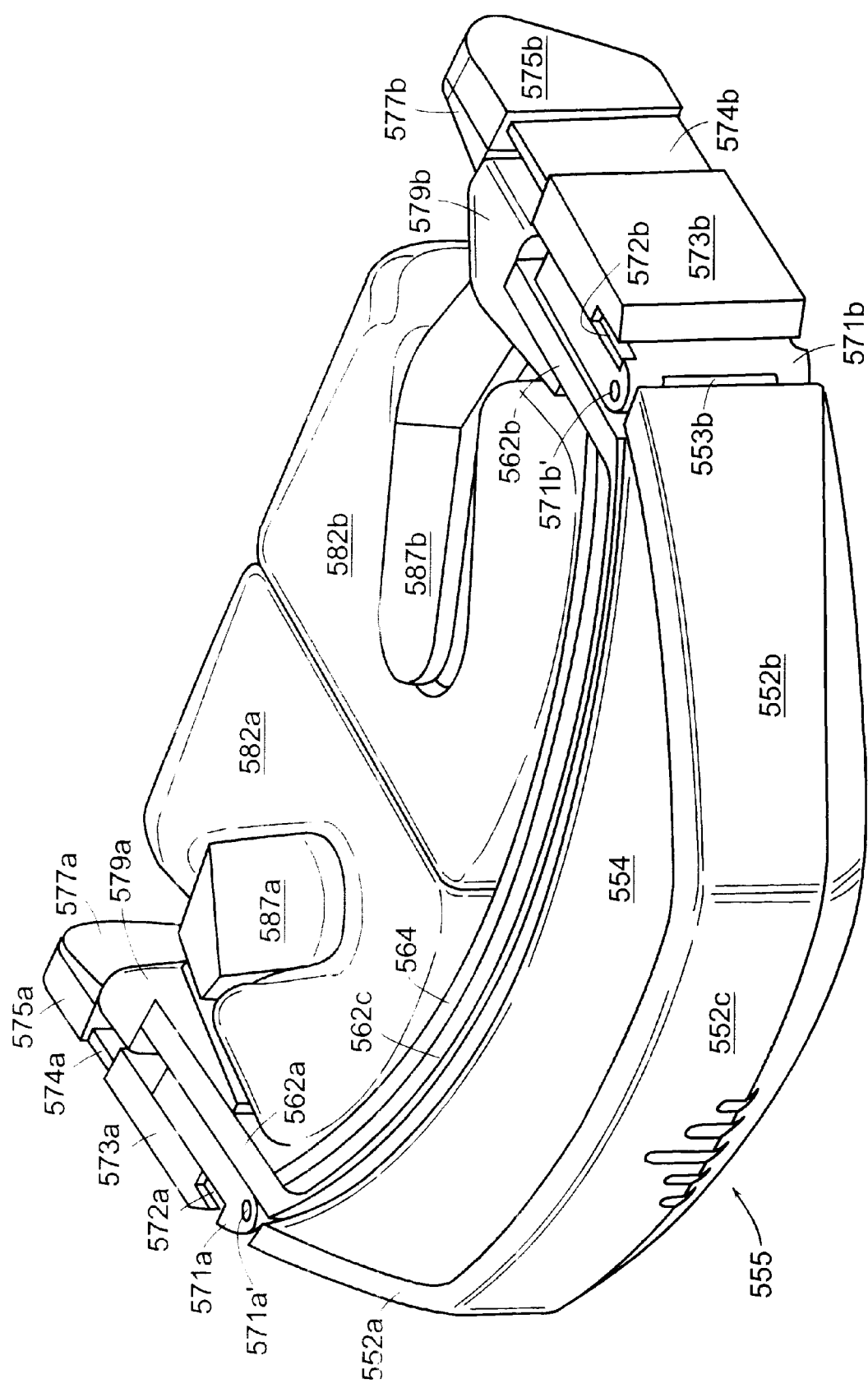
FIG. 46 is a top perspective view of the alternative embodiment in a closed position.
Figure 47:
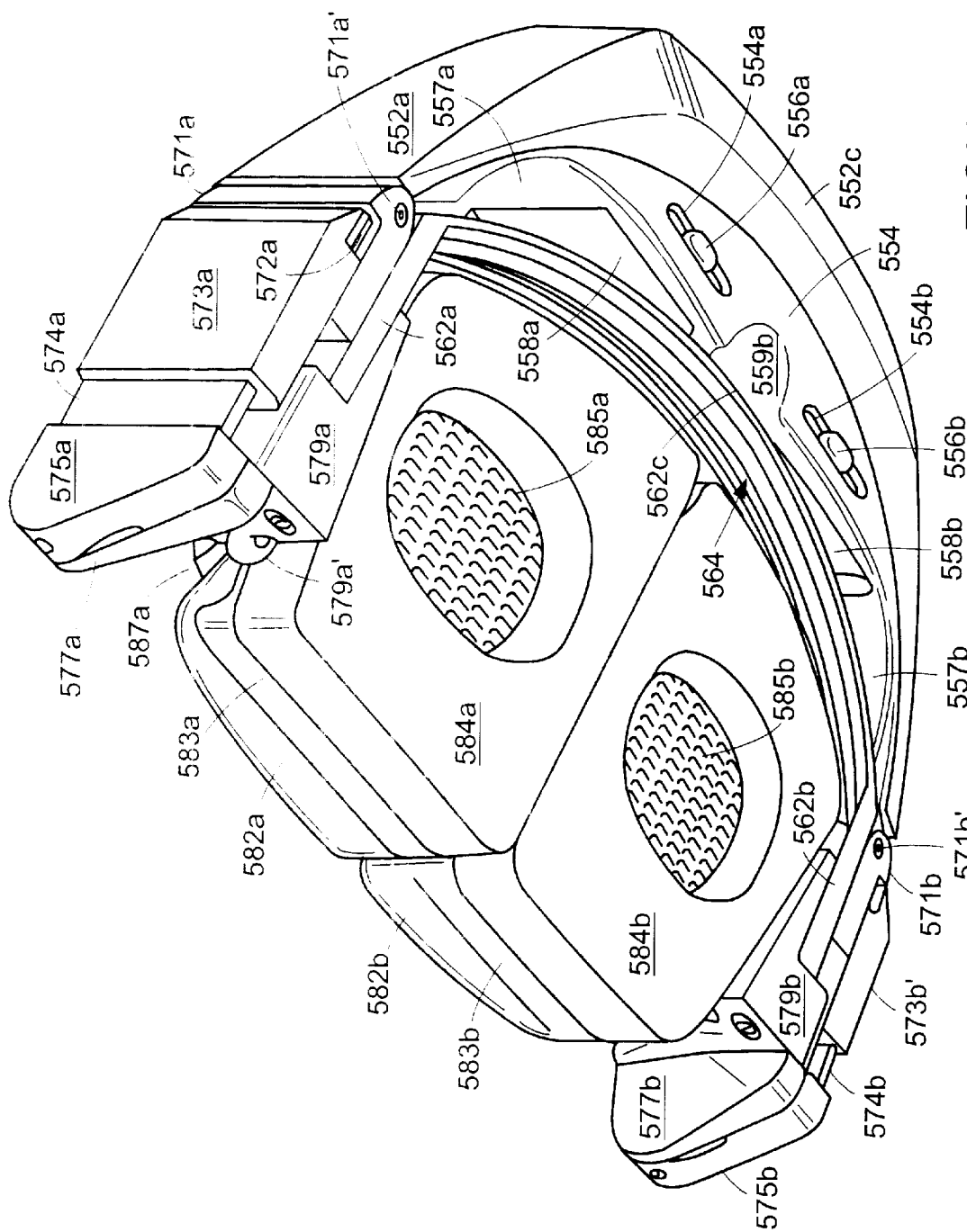
FIG. 47 is a bottom perspective view of the closed position.

FIG. 46 is a front perspective view of the head mounted display device 201' of FIG. 40 in a folded position. FIG. 47 is a bottom perspective view of the display unit 201' of FIG. 46. The unique and novel pivot assemblies 570a and 570b cooperate to allow the display unit 201' to be folded into a compact package. The headpiece 560 is rotated about the center pivots 575a and 575b to the 0° position. The earpiece 580a and 580b are then folded behind the headpiece 560, where the earpiece 580a and 580b lie flat. In a particular preferred embodiment, the supporting elements 579a and 579b contain a spring-loaded pin 579a' and 579b' to aid the folding of the earpiece 580a and 580b. The pins 579a' and 579b' can be similar to the cam assembly of FIG. 38. The visor is then retracted toward the center pivots 575a and 575b until the display unit 201' is securely packed. From this folded position, the head mounted display unit 201' can be easily packed, carried or otherwise transported. FIG. 46 also shows manual focus adjust elements 400 located on the top of the visor which are described in greater detail below.

Figure 48B:
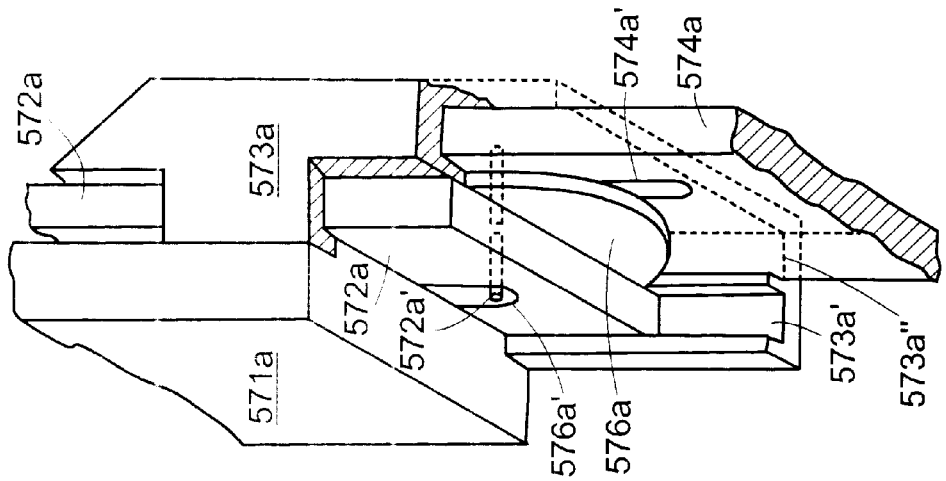
FIGS. 48A–48B are detailed views of the sliding assembly.
Figure 48A:
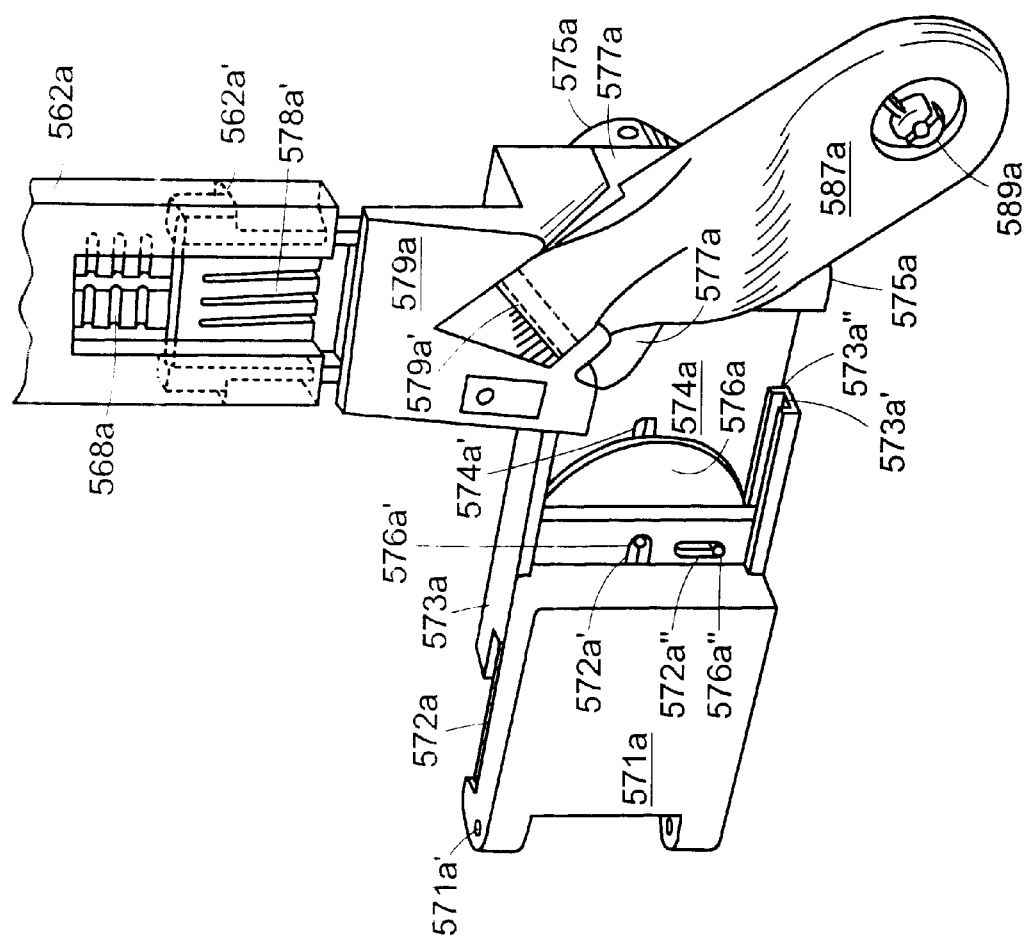

FIGS. 48A–48B are detailed views of the light pivot assembly 570a. As illustrated, the rails 572a and 574a lie in tracks 573a' and 573a' of a respective center coupler 573a. A wheel 576a having a pin 576a' through its central axis and fixed at one end to the center coupler 573 is disposed between the opposing rails 72a, 74a. Each opposing rail 572a and 574a has a respective slot 572a' and 574a' through which the wheel pin 576a' extends. The wheel 576a is held between slots and contains cable guides as described below. Also illustrated is a connector 589a on the lobe member 587a for connecting the speaker assembly 580a to the assembly. The connector 589a is an electrical connector carrying audio signals.

Figure 49A:
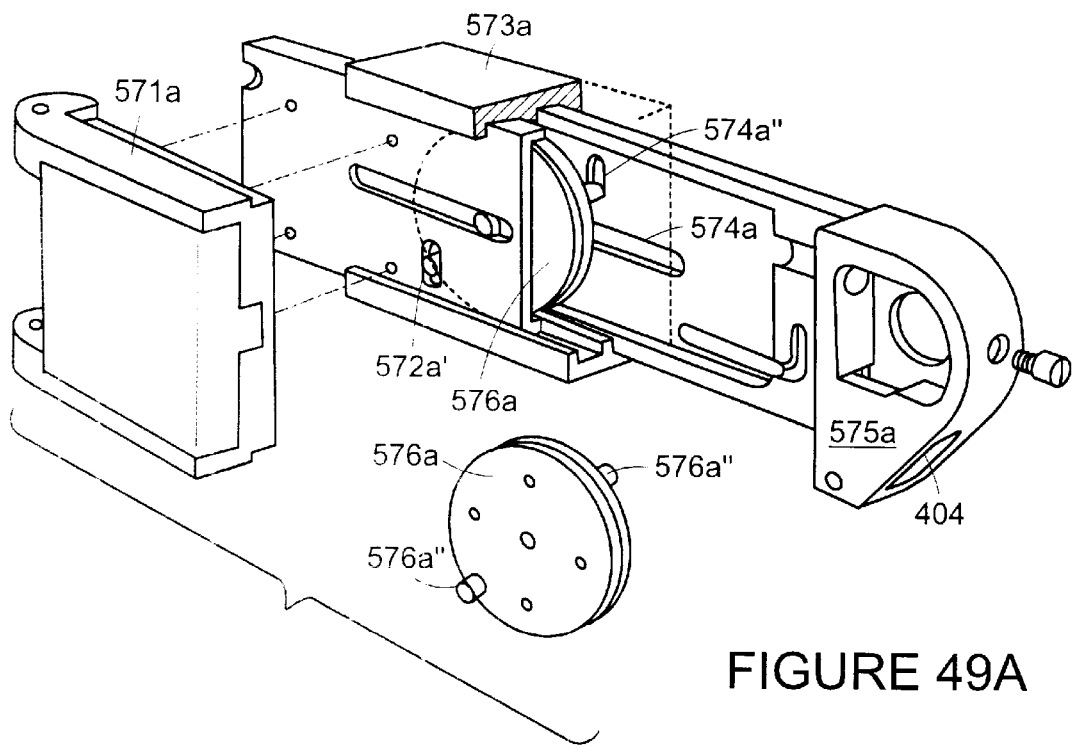
FIG. 49A–49B are further detailed views of the spool assembly and cable management system.

The wiring of the device is as follows: The signals and power enter through the back of 575b via a connector. The audio portion then passes through to the earcups with one extending through the headband. The video goes forward through the temple slides via the "spool" or wheel 576a. The pin 576a is the center axle that allows it to rotate in the hole in 573. The pin is secured to the wheel. FIG. 49A shows pin 576a". The wheel has two of these, on opposite sides, 180° apart. These are what ride in the slots 572a" and 574a" (shown in FIG. 49A). The wheel circumference is not in contact with the rails. As shown in the detailed view of FIG. 49A which shows the wheel held between slots 572a'.

Figure 49B:
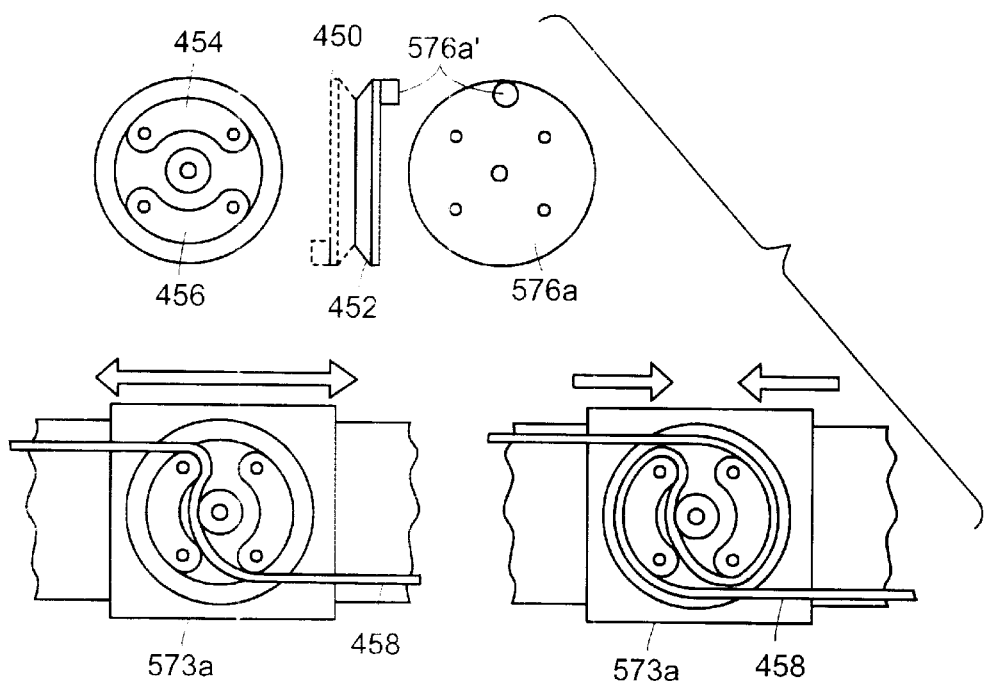

FIG. 49B shows the wheel is also a spool. It serves to control the cable length as the rails are moved fore and aft. The spool 576a is designed to be an assembly using two identical pieces 450, 452. The kidney shapes act as cable guides 454, 456 which control the motion of 10 conductor cable 458 as the rails are moved.

FIG. 50 shows the optics module sub-assembly. Two of these modules 410 are mounted to a triangulated rail system 480 and comprises an optics assembly.

Figure 52:
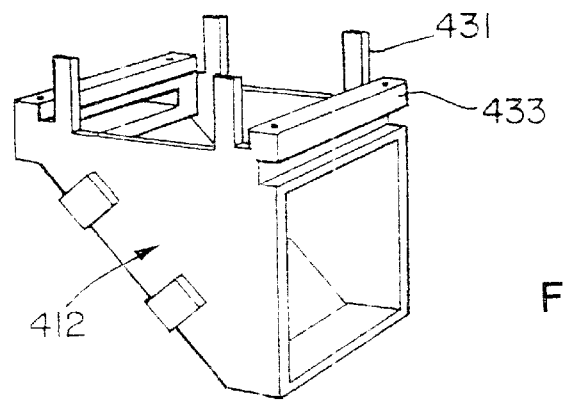
FIG. 52 is a perspective view of the optics housing.
Figure 51:
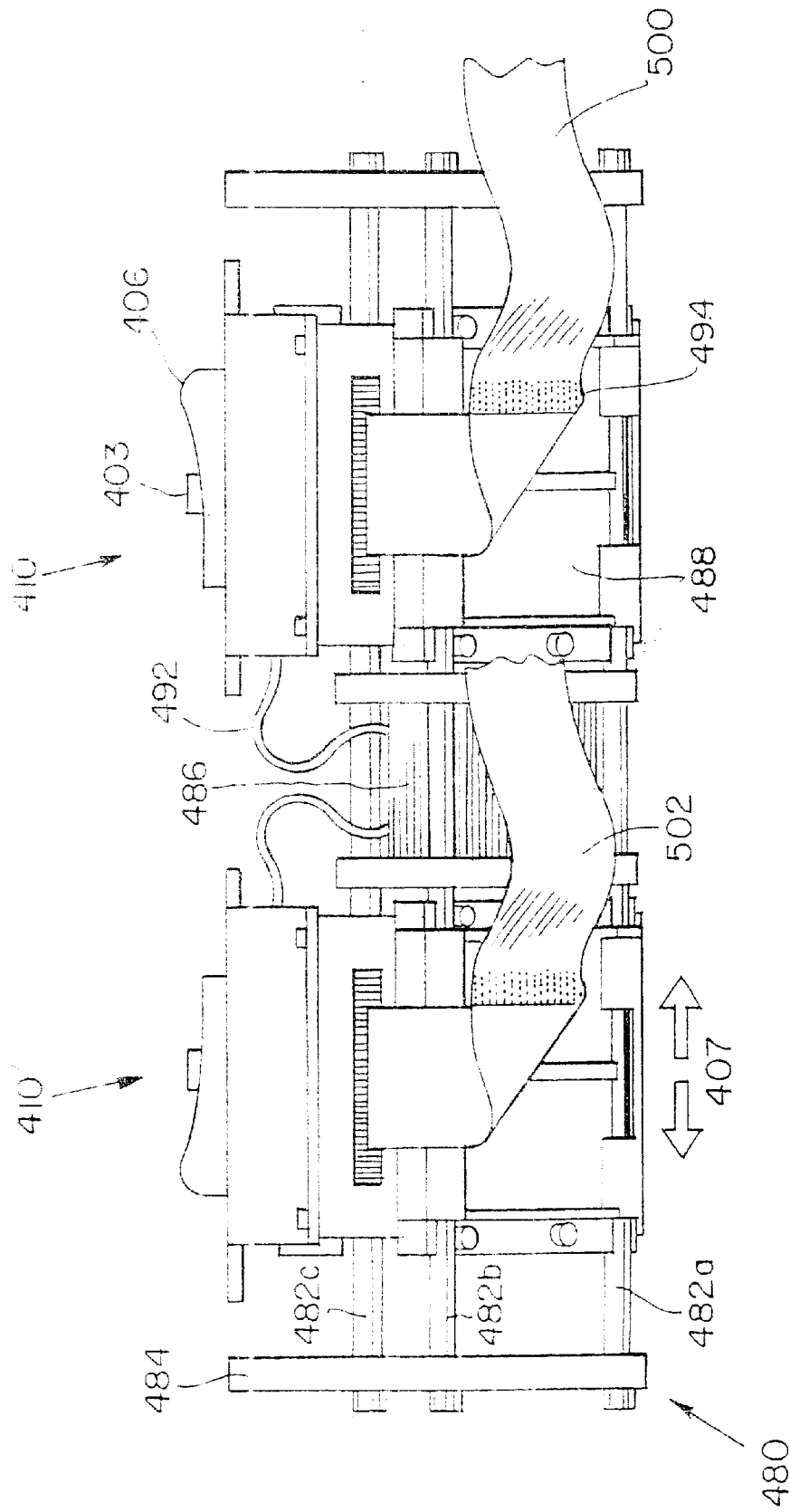
FIG. 51 shows two modules mounted on a rail assembly.
Figure 55:
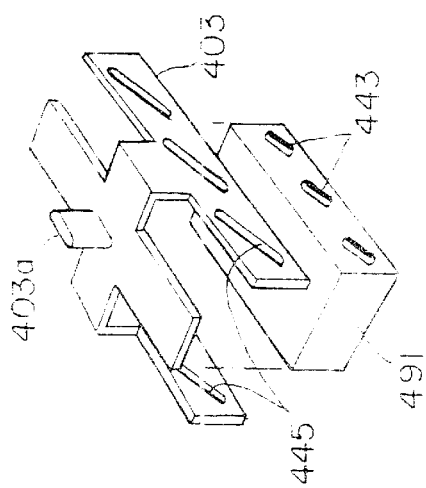
FIG. 55 shows the focus slide and backlight housing.
Figure 53:
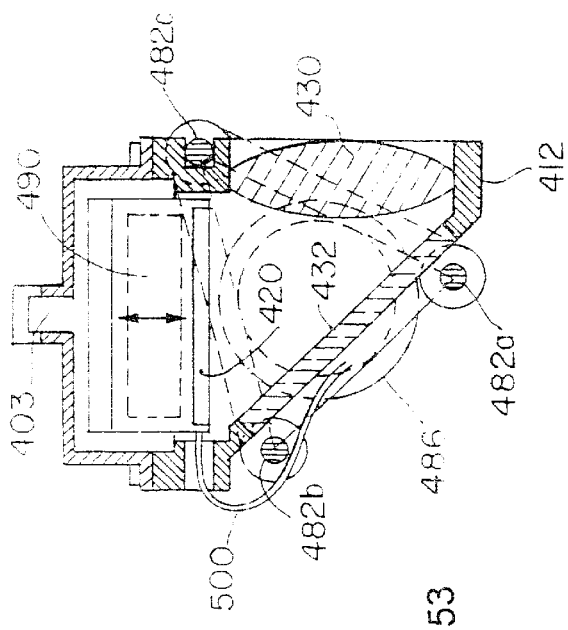
FIG. 53 is a cross-sectional side view of the optics.
Figure 54:
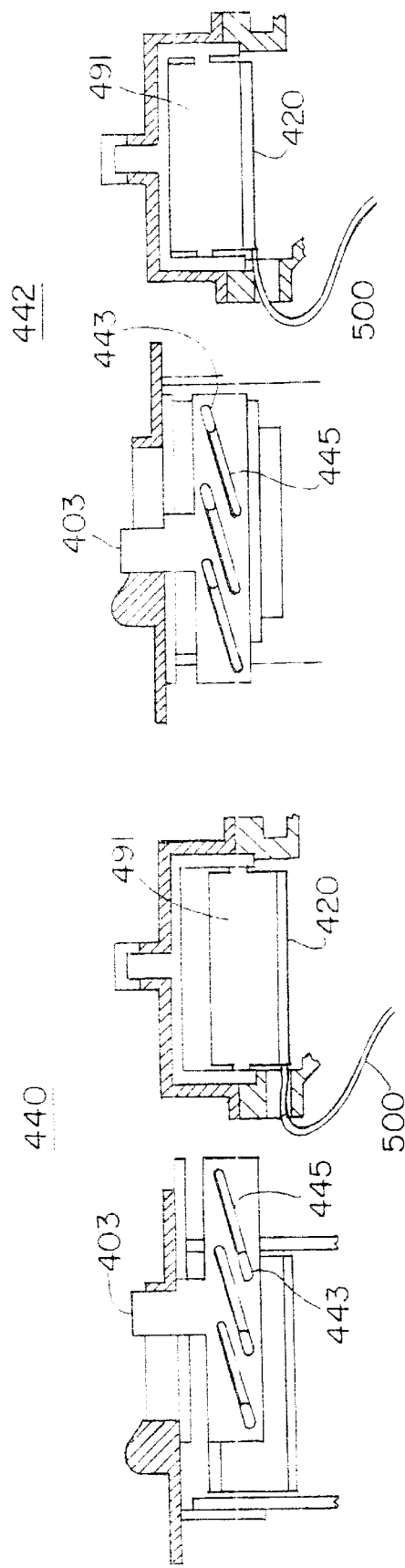
FIG. 54 illustrates the full down and full up position of the focus adjusting system.

Each optics module consists of the following: A display 420; a blacklight 490; a lens 430; a mirror 432; an optic housing 412a; a focus adjust slide 403; a IPD adjust/cover 406; and a rail slide 488. As shown in FIG. 51 the two modules 410, 415 are mounted on rail system 480. FIG. 52 is a perspective view of an optic housing 412. FIG. 53 is a side cross sectional view of the optical system with lens 430, mirror 432, the backlight 490 and display 420. Focus is accomplished via sliding ramp system, shown in FIGS. 54 and 55, which are incorporated into the focus adjust slide and the backlight housing. Tabs protruding from the backlight housing are engaged in slots incorporated in to focus slide. As the focus slide button is moved horizontally, the backlight housing (along with the attached display) move vertically. Multiple tabs ensure positive alignment throughout the motion range. The vertical tabs extending from the optic housing keep the backlight/display assembly centered horizontally left to right as well as acting as vertical slide surfaces. The IPD button serves as the top of the assembly capturing the top on the focus slide.

Figure 56:
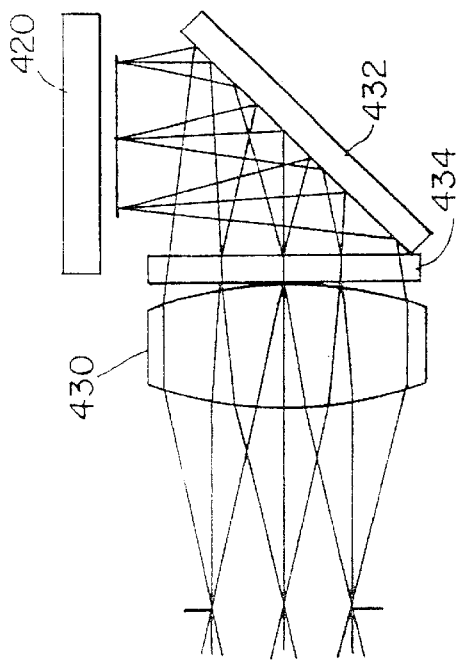
FIG. 56 is an alternative embodiment of the optical system for a high resolution display.

FIG. 56 shows the display placed at the focal length of the lens, thus producing an image of the display at an apparent distance of infinity to the viewer. The lens has a small focal length, preferable about 1 inch. The flat optical element is present to correct for lateral color separation in the lens. This element consists of a diffractive optic 434 designed to compensate for the lateral color in the lens. The mirror serves to fold the optical path to minimize the depth of the head mounted device while extending its height. the mirror is optional to the system and is present for desired form factor. Two such setups make up on binocular head mounted display system: one for each eye. The distance that the displays appear to the viewer can be adjusted for personal comfort, generally between 15 feet and infinity. The magnification of the system is about 10. Other lens systems can be sued and are available from Kaiser Electro-Optics, Inc. of Carlsbad, Calif.

Equivalents

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

We claim:

1. A head mounted display device comprising:
    a first matrix display assembly and a second matrix display assembly, each matrix display assembly including a light source, a matrix display element having a display area with a diagonal length no greater than 1.654 inches, the display element generating an image along a first optical path, only one mirror to reflect the image from the respective matrix display element from the first optical path to a second optical path and a viewing lens positioned along the second optical path in a line of sight of a viewer, the first optical path being vertically aligned with the second optical path such that the mirror transposes the image between the first and second optical paths;

a housing for holding the first matrix display assembly and the second matrix display assembly relative to the head of a display user, the housing having a first aperture through which the user can view the transposed image from the matrix display element of the first matrix display assembly and a second aperture through which the user can view the transposed image from the matrix display element of the second matrix display assembly;

a mounting frame on which the first matrix display assembly and the second matrix display assembly are mounted such that each matrix display assembly can slide along the mounting frame;

a headband on which the mounting frame is mounted with a hinge such that the mounting frame can be rotated relative to the headband, and the headband having a sizing mechanism to expand or contract the size of the headband;

a mechanism coupled to the sizing mechanism for controlling the length of a cable within the headband during expansion or contraction of the headband; and a focus adjust mechanism that controls a distance between each matrix display element and the respective lens by varying the length of the optical paths and maintaining the first optical path of the first matrix display assembly parallel to the first optical path of the second matrix display.

2. The head mounted display device of claim 1 further comprising a second hinge mounted support to mount a pair of audio transducers to the headband.

3. The head mounted display device of claim 1 wherein the matrix display elements are both active matrix liquid crystal displays.

4. The head mounted display device of claim 1 wherein the matrix display elements both comprise active matrix electroluminescent displays.

5. The head mounted display device of claim 1 further comprising a pair of audio transducers.

6. The head mounted display device of claim 1 further comprising a moveable nose bridge mounted to the housing.

7. The head mounted display device of claim 1 wherein the matrix display elements are both passive matrix displays.

8. The head mounted display device of claim 1 further comprising a video control circuit mounted within the display device, the video control circuit transposing a received signal representing a video image.

9. The head mounted display device of claim 8 further comprising a manually adjustable controller mounted on the display device to adjust a control signal delivered by the video control circuit to the matrix display elements.

10. The head mounted display device of claim 1 further comprising a display controller for adjusting a distance between the first and second apertures.

11. The head mounted display device of claim 1 wherein the matrix display is an active matrix liquid crystal display.

12. The head mounted display device of claim 1 wherein the sizing mechanism comprises a first rail and a second rail wherein the first rail and the second rail are moveable relative to each other to expand or contract the size of the headband.

13. The head mounted display of claim 1 wherein the mechanism comprises a rotating member.

14. A head mounted display device comprising:

a matrix display assembly including a light source, a matrix display element having a display area with a diagonal length no grater than 1.654 inches, the display element forming images of a first orientation, only one mirror and a lens, the mirror reflecting the formed images through the lens such that the lens magnifies a reflected image from the display element;

a housing for holding the matrix display assembly relative to the head of a display user, the housing having an aperture through which the user can view images in a second orientation;

a mounting frame on which the matrix display assembly is mounted such that the matrix display assembly can slide along a first axis across the user's field of view relative to the mounting frame;

a hinge that connects the housing to a headband such that the matrix display assembly can be rotated about a second axis, the second axis being parallel to the first axis, the headband having a sizing mechanism to expand or contract the size of the headband; and a mechanism coupled to the sizing mechanism for controlling the length of a cable within the headband during expansion or contraction of the headband.

15. The head mounted display device of claim 14 wherein the matrix display element comprises an active matrix liquid crystal display.

16. The head mounted display device of claim 14 wherein the matrix display element comprises an active matrix electroluminescent display.

17. The head mounted display device of claim 14 further comprising a pair of audio transducers.

18. The head mounted display device of claim 14 further comprising a moveable nose bridge mounted on the housing.

19. The head mounted display device of claim 14 wherein the matrix display element is a passive matrix display.

20. The head mounted display device of claim 14 further comprising a video control circuit mounted within the display device, the video control circuit converting a video image to the first orientation.

21. The head mounted display device of claim 14 wherein the sizing mechanism comprises a first rail and a second rail wherein the first rail and the second rail are moveable relative to each other to expand or contract the size of the headband.

22. The head mounted display of claim 14 wherein the mechanism comprises a rotating member.

23. A head mounted display device comprising:

a matrix display assembly including a light source, a horizontally oriented matrix display element having a display area with a diagonal length no greater than 1.654 inches, only one mirror to reflect light from the display element from a first optical path to a second optical path and a lens positioned along the second optical path, the first optical path being vertically oriented relative to an eye of a user and the second optical path being oriented along the optical axis of the eye of the user such that the lens magnifies a reflected image from the display element;

a housing for holding the matrix display assembly relative to the head of the user, the housing having an aperture through which the user can view the matrix display element;

a mounting frame on which the matrix display assembly is mounted such that the matrix display assembly can slide along the mounting frame;

a headband on which the mounting frame is mounted with a hinge such that the mounting frame can be rotated relative to the headband, the headband having a sizing mechanism to expand or contract the size of the headband;

a mechanism coupled to the sizing mechanism for controlling the length of a cable within the headband during expansion or contraction of the headband; and a focus adjust mechanism that controls a distance between the matrix display element and the lens by movement of the matrix display element in the vertical direction.

24. The head mounted display device of claim 23 wherein the focus adjust mechanism moves the matrix display element in the vertical direction.

25. The head mounted display device of claim 23 wherein the mounting frame includes three longitudinal members to which the matrix display assembly is coupled.

26. The head mount display device of claim 23 wherein the matrix display assembly further includes a diffractive optic element.

27. The head mounted display device of claim 23 wherein the lens has a focal length of about one inch.

28. The head mounted display device of claim 23 wherein matrix display element has an apparent distance from the user of at least about fifteen feet.

29. The head mounted display device of claim 28 wherein the apparent distance is adjustable by the user.

30. The head mounted display device of claim 23 wherein the sizing mechanism comprises a first rail and a second rail wherein the first rail and the second rail are moveable relative to each other to expand or contract the size of the headband.

31. The head mounted display of claim 23 wherein the mechanism comprises a rotating member.

32. A head mounted display device comprising:

a matrix display assembly including a light source, a matrix display element having a diagonal length no greater than 1.654 inches, the display element forming images of a first orientation, only one mirror and a lens, the mirror reflecting the formed images through the lens such that the lens magnifies a reflected image from the display element;

a housing for holding the matrix display assembly relative to the head of a display user, the housing having an aperture through which the user can view images in a second orientation;

a mounting frame on which the matrix display assembly is mounted such that the matrix display assembly can slide along a first axis across the user's field of view relative to the mounting frame;

a headband on which the mounting frame is mounted, the headband having a sizing mechanism to expand or contract the size of the headband; and a mechanism coupled to the sizing mechanism for controlling the length of a cable within the headband during expansion or contraction of the headband.

33. The head mounted display device of claim 32 wherein the matrix display element comprises an active matrix liquid crystal display having an active area with a diagonal of 0.820 inches or less.

34. The head mounted display device of claim 32 wherein the matrix display element comprises an active matrix electroluminescent display.

35. The head mounted display device of claim 32 further comprising a pair of audio transducers.

36. The head mounted display device of claim 32 further comprising a moveable nose bridge mounted on the housing.

37. The head mounted display device of claim 32 wherein the matrix display element is a passive matrix display.

38. The head mounted display device of claim 32 further comprising a video control circuit mounted within the display device, the video control circuit converting a video image to the first orientation.

39. The head mounted display device of claim 32 wherein the sizing mechanism comprises a first rail and a second rail wherein the first rail and the second rail are moveable relative to each other to expand or contract the size of the headband.

40. The head mounted display of claim 32 wherein the mechanism comprises a rotating member.

* * * * *